US012564794B2

(12) United States Patent
Takahashi et al.

(10) Patent No.: US 12,564,794 B2
(45) Date of Patent: Mar. 3, 2026

(54) AUTONOMOUS MOBILE BODY AND INFORMATION PROCESSING METHOD

(71) Applicant: SONY GROUP CORPORATION, Tokyo (JP)

(72) Inventors: Kei Takahashi, Tokyo (JP); Yoshihide Fujimoto, Tokyo (JP); Junichi Nagahara, Tokyo (JP); Daisuke Mochizuki, Tokyo (JP); Yuka Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 73 days.

(21) Appl. No.: 18/685,927

(22) PCT Filed: Mar. 10, 2022

(86) PCT No.: PCT/JP2022/010493
§ 371 (c)(1),
(2) Date: Feb. 23, 2024

(87) PCT Pub. No.: WO2023/037609
PCT Pub. Date: Mar. 16, 2023

(65) Prior Publication Data
US 2024/0367066 A1 Nov. 7, 2024

(30) Foreign Application Priority Data
Sep. 10, 2021 (JP) ................................. 2021-147498

(51) Int. Cl.
*A63H 3/28* (2006.01)
*A63H 11/20* (2006.01)
*B25J 11/00* (2006.01)

(52) U.S. Cl.
CPC .............. *A63H 3/28* (2013.01); *A63H 11/20* (2013.01); *B25J 11/001* (2013.01); *A63H 2200/00* (2013.01)

(58) Field of Classification Search
None
See application file for complete search history.

(56) References Cited

U.S. PATENT DOCUMENTS 9,712,914 B1 * 7/2017 Hoops ...................... H04R 3/00
2020/0269421 A1 * 8/2020 Koyama ................. G10L 15/22

FOREIGN PATENT DOCUMENTS

JP 2002-205291 A 7/2002
JP 2002-268699 A 9/2002
(Continued)

OTHER PUBLICATIONS

International Search Report and Written Opinion of PCT Application No. PCT/JP2022/010493, issued on May 31, 2022, 12 pages of ISRWO.

*Primary Examiner* — Jeffrey D Carlson
(74) *Attorney, Agent, or Firm* — CHIP LAW GROUP

(57) ABSTRACT

The present technology relates to an autonomous mobile body, an information processing method, and a program enabling improvement in ability of expression by audio of an autonomous mobile body. An autonomous mobile body includes an operation control unit that controls an operation of the autonomous mobile body, a recognition unit that recognizes a state of the autonomous mobile body in operation, and an audio control unit that generates or processes audio data corresponding to audio to be output in accordance with the operation of the autonomous mobile body on the basis of a recognition result of the state of the autonomous mobile body, and controls a characteristic and an output
(Continued)

timing of the audio. The present technology can be applied to, for example, a pet-type robot.

19 Claims, 34 Drawing Sheets

(56)                    References Cited

FOREIGN PATENT DOCUMENTS

| | | | |
|----|----|----|----|
| JP | 2002-304187 | A | 10/2002 |
| JP | 2003-071763 | A | 3/2003 |
| JP | 2003-305677 | A | 10/2003 |
| JP | 2015-023989 | A | 2/2015 |
| JP | 2020-089929 | A | 6/2020 |
| WO | 2006/030531 | A1 | 3/2006 |
| WO | 2017/212723 | A1 | 12/2017 |
| WO | 2018/012219 | A1 | 1/2018 |
| WO | 2018/016461 | A1 | 1/2018 |
| WO | 2018/47426 | A1 | 3/2018 |
| WO | 2019/087484 | A1 | 5/2019 |
| WO | 2020/203425 | A1 | 10/2020 |
| WO | 2021/005878 | A1 | 1/2021 |
| WO | 2021/149516 | A1 | 7/2021 |

* cited by examiner

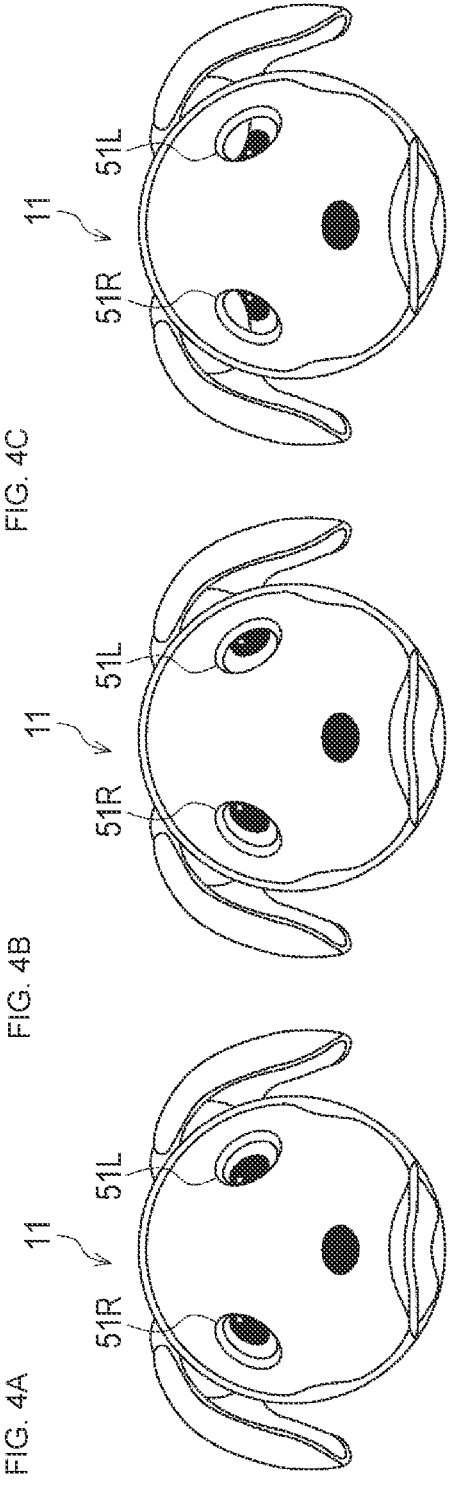

*FIG. 8*

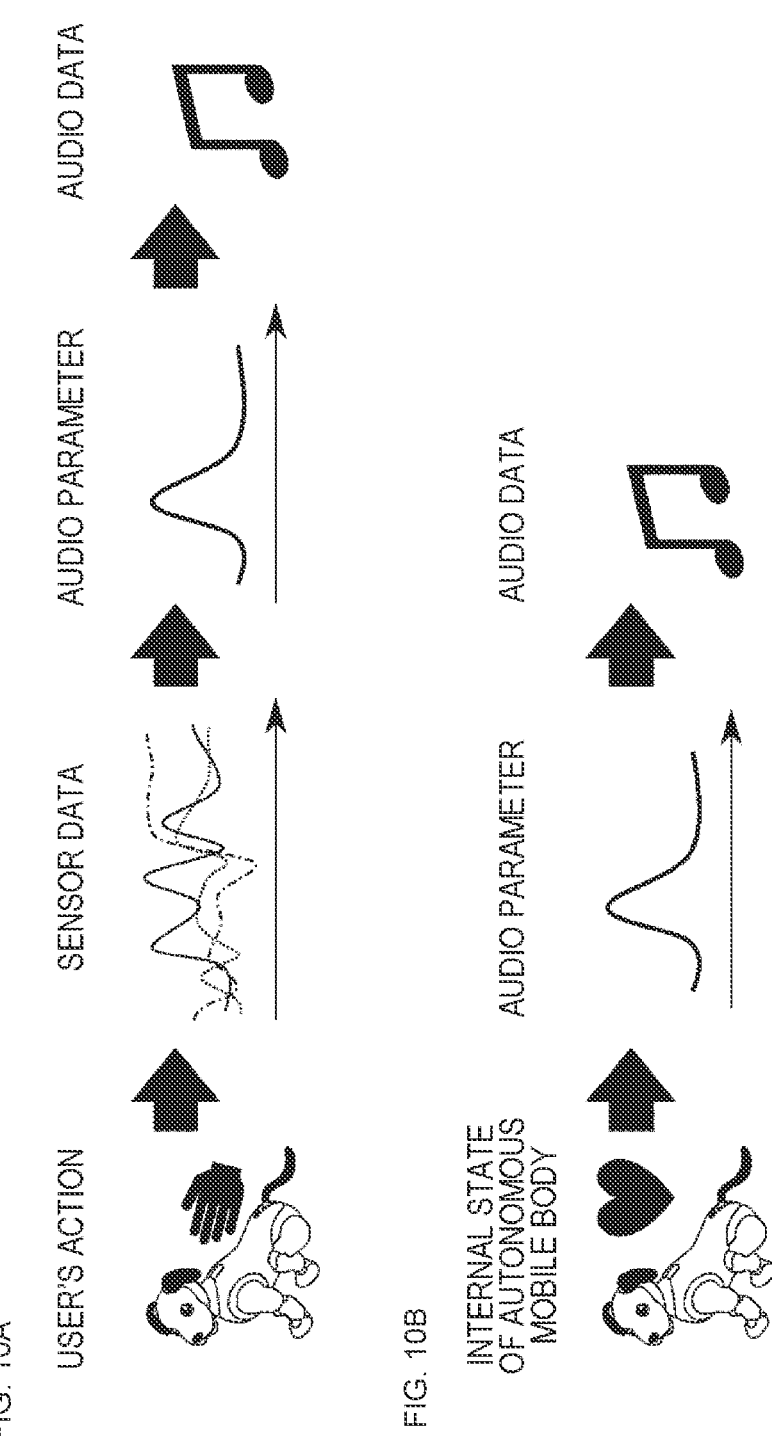

| PARAMETER | VALUE | MEANING |
|---|---|---|
| individual_voice_param | 0.0-1.0 | PARAMETER OF INDIVIDUAL DIFFERENCE IN VOICE QUALITY |
| chin_weight | 0.0-1.0 | DEGREE OF PREFERENCE TO TOUCH ON CHIN |
| head_weight | 0.0-1.0 | DEGREE OF PREFERENCE TO TOUCH ON HEAD |
| body_foward_weight | 0.0-1.0 | DEGREE OF PREFERENCE TO TOUCH ON BODY FRONT |
| body_backward_weight | 0.0-1.0 | DEGREE OF PREFERENCE TO TOUCH ON BODY BACK |

FIG. 36

AUTONOMOUS MOBILE BODY AND INFORMATION PROCESSING METHOD

CROSS REFERENCE TO RELATED APPLICATIONS

This application is a U.S. National Phase of International Patent Application No. PCT/JP2022/010493 filed on Mar. 10, 2022, which claims priority benefit of Japanese Patent Application No. JP 2021-147498 filed in the Japan Patent Office on Sep. 10, 2021. Each of the above-referenced applications is hereby incorporated herein by reference in its entirety.

TECHNICAL FIELD

The present technology relates to an autonomous mobile body, an information processing method, and a program, and particularly relates to an autonomous mobile body, an information processing method, and a program capable of communicating with a user.

BACKGROUND ART

Conventionally, electronic devices that recognize a gesture of a user and can be operated by the gesture have been widely used (refer to, for example, Patent Document 1).

Furthermore, in recent years, the spread of a pet-type robot capable of recognizing the gesture and the like of the user and performing communication with the user has progressed.

CITATION LIST

Patent Document

Patent Document 1: WO 2020/203425

SUMMARY OF THE INVENTION

Problems to be Solved by the Invention

For example, the pet-type robot executes not only a movement necessary for an operation of the robot but also a movement or a performance expressing its intention or feeling to the user. At that time, it is desired to improve ability of expression of the pet-type robot by an operation sound, a sound effect and the like.

The present technology has been achieved in view of such a situation, and an object thereof is to improve ability in expression of the autonomous mobile body such as a pet-type robot.

Solutions to Problems

An autonomous mobile body according to an aspect of the present technology is an autonomous mobile body that autonomously moves including an operation control unit that controls an operation of the autonomous mobile body, a recognition unit that recognizes a state of the autonomous mobile body in operation, and an audio control unit that generates or processes audio data corresponding to audio to be output in accordance with the operation of the autonomous mobile body on the basis of a recognition result of the state of the autonomous mobile body, and controls a characteristic and an output timing of the audio.

An information processing method according to an aspect of the present technology controls an operation of an autonomous mobile body, recognizes a state of the autonomous mobile body in operation, and generates or processes audio data corresponding to audio to be output in accordance with the operation of the autonomous mobile body on the basis of a recognition result of the state of the autonomous mobile body, and controlling a characteristic and an output timing of the audio.

A program according to an aspect of the present technology causes a computer to execute processing of controlling an operation of an autonomous mobile body, recognizing a state of the autonomous mobile body in operation, and generating or processing audio data corresponding to audio to be output in accordance with the operation of the autonomous mobile body on the basis of a recognition result of the state of the autonomous mobile body, and controlling a characteristic and an output timing of the audio.

According to an aspect of the present technology, an operation of an autonomous mobile body is controlled, a state of the autonomous mobile body in operation is recognized, and audio data corresponding to audio to be output in accordance with the operation of the autonomous mobile body is generated or processed on the basis of a recognition result of the state of the autonomous mobile body, and a characteristic and an output timing of the audio is controlled.

BRIEF DESCRIPTION OF DRAWINGS

FIGS. 4A, 4B, and 4C are views for explaining a function of a display included in the autonomous mobile body.

FIG. 8 is a diagram for explaining an example of a method of outputting audio of a conventional autonomous mobile body.

FIGS. 10A and 10B are diagrams for explaining an example of a method of outputting the audio of the autonomous mobile body.

FIGS. 28A and 28B are diagrams illustrating an example of a manner of increasing a pitch of the cry.

FIG. 29 is a diagram illustrating an example of parameters used for setting a favorite place and the like.

FIG. 36 is a diagram illustrating a configuration example of a computer.

MODE FOR CARRYING OUT THE INVENTION

Hereinafter, modes for carrying out the present technology will be described. The description will be given in the following order.

1. Embodiments
2. Variation
3. Others

1. Embodiments

Embodiment of the present technology will be described with reference to FIGS. 1, 2, 3, 4A, 4B, 4C, 5A, 5B, 6, 7, 8,

9A, 9B, 10A, 10B, 11, 12, 13, 14, 15, 16, 17, 18, 19, 20, 21, 22A, 22B, 23A, 23B, 24A, 24B, 25, 26, 27, 28A, 28B, 29, 30, 31, 32, 33, 34 and 35.

<Configuration Example of Information Processing System 1>

Figure 1:
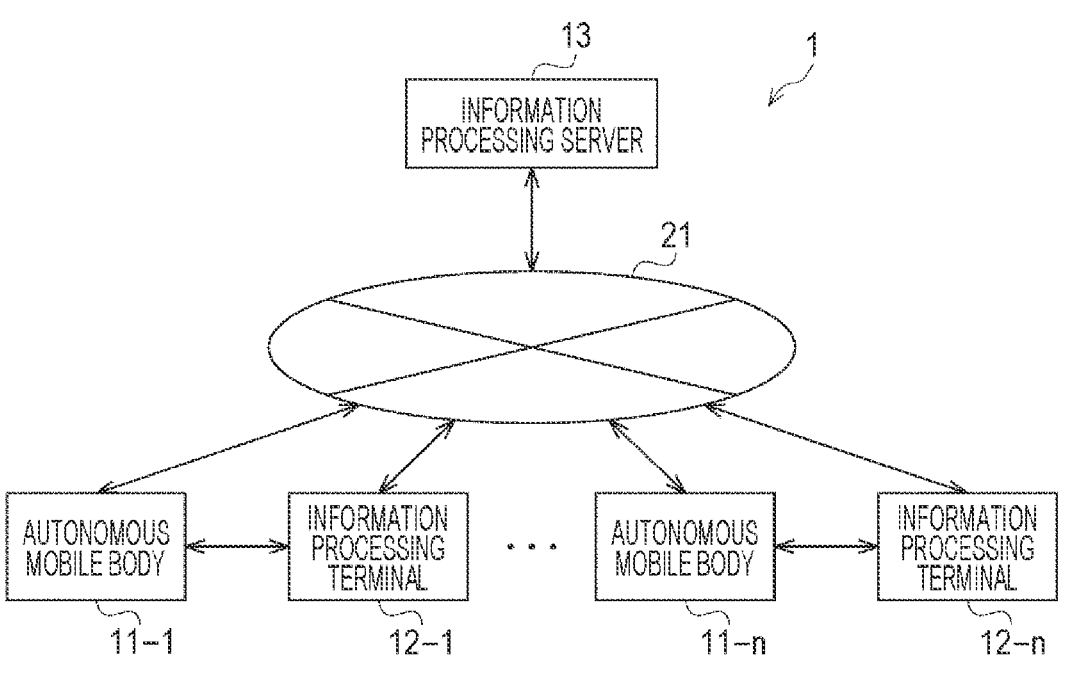
FIG. 1 is a block diagram illustrating an embodiment of an information processing system to which the present technology is applied.

FIG. 1 is a block diagram illustrating an embodiment of an information processing system 1 to which the present technology is applied.

The information processing system 1 includes autonomous mobile bodies 11-1 to 11-$n$, information processing terminals 12-1 to 12-$n$, and an information processing server 13.

Note that, hereinafter, the autonomous mobile bodies 11-1 to 11-$n$ are simply referred to as an autonomous mobile body 11 in a case where it is not necessary to individually distinguish them from each other. Hereinafter, the information processing terminals 12-1 to 12-$n$ are simply referred to as an information processing terminal 12 in a case where it is not necessary to individually distinguish them from each other.

Between each autonomous mobile body 11 and the information processing server 13, between each information processing terminal 12 and the information processing server 13, between each autonomous mobile body 11 and each information processing terminal 12, between the autonomous mobile bodies 11, and between the information processing terminals 12, communication via a network 21 may be performed. Furthermore, direct communication between each autonomous mobile body 11 and each information processing terminal 12, between the autonomous mobile bodies 11, and between the information processing terminals 12 without using the network 21 may be performed.

The autonomous mobile body 11 is an information processing apparatus that recognizes a situation of the autonomous mobile body 11 itself and its surroundings on the basis of collected sensor data and the like, and autonomously selects to execute various operations according to the situation. One of features of the autonomous mobile body 11 is to autonomously execute an appropriate operation according to the situation, unlike a robot that simply performs an operation in response to a user's instruction.

The autonomous mobile body 11 can execute, for example, user recognition, object recognition and the like based on a captured image, and perform various autonomous behaviors according to the recognized user, object and the like. Furthermore, the autonomous mobile body 11 can execute, for example, audio recognition based on a user's utterance, and perform a behavior based on the user's instruction and the like.

Moreover, the autonomous mobile body 11 performs pattern recognition learning in order to acquire ability of the user recognition and object recognition. At that time, the autonomous mobile body 11 can dynamically collect learning data on the basis of teaching by the user and the like in addition to teacher learning based on given learning data, and can perform the pattern recognition learning regarding an object and the like.

Furthermore, the autonomous mobile body 11 can be trained by the user. Here, training of the autonomous mobile body 11 is, for example, wider than general training of teaching and causing to memorize rules and prohibited matters, and means that a change felt by the user appears in the autonomous mobile body 11 as the user involves in the autonomous mobile body 11.

A shape, an ability, and a level of desire and the like of the autonomous mobile body 11 can be appropriately designed according to a purpose and a role. For example, the autonomous mobile body 11 includes an autonomous mobile robot that autonomously moves in a space and executes various operations. Specifically, for example, the autonomous mobile body 11 includes an autonomous mobile robot having a shape and an operation ability imitating a human or an animal such as a dog. Furthermore, for example, the autonomous mobile body 11 includes a vehicle or other device having a communication ability with the user.

The information processing terminal 12 includes, for example, a smartphone, a tablet terminal, a personal computer (PC) and the like, and is used by the user of the autonomous mobile body 11. The information processing terminal 12 implements various functions by executing a predetermined application program (hereinafter, simply referred to as an application). For example, the information processing terminal 12 performs management, customization and the like of the autonomous mobile body 11 by executing a predetermined application.

For example, the information processing terminal 12 communicates with the information processing server 13 via the network 21 or directly communicates with the autonomous mobile body 11 to collect various data regarding the autonomous mobile body 11, presents the same to the user, and gives an instruction to the autonomous mobile body 11.

For example, the information processing server 13 collects various data from each autonomous mobile body 11 and each information processing terminal 12, provides various data to each autonomous mobile body 11 and each information processing terminal 12, and controls an operation of each autonomous mobile body 11. Furthermore, for example, similarly to the autonomous mobile body 11, the information processing server 13 can perform processing corresponding to the pattern recognition learning and training by the user on the basis of the data collected from each autonomous mobile body 11 and each information processing terminal 12. Moreover, for example, the information processing server 13 supplies the above-described application and various data regarding each autonomous mobile body 11 to each information processing terminal 12.

The network 21 includes, for example, some of a public line network such as the Internet, a telephone line network, and a satellite communication network, various local area networks (LANs) including Ethernet (registered trademark), a wide area network (WAN) and the like. Furthermore, the network 21 may include a dedicated line network such as an Internet protocol-virtual private network (IP-VPN). Furthermore, the network 21 may include a wireless communication network such as Wi-Fi (registered trademark) or Bluetooth (registered trademark).

Note that, the configuration of the information processing system 1 can be flexibly changed in accordance with specifications, operations and the like. For example, the autonomous mobile body 11 may further perform information communication with various external devices in addition to the information processing terminal 12 and the information processing server 13. The external devices described above may include, for example, a server that transmits weather, news, and other service information, various home appliances owned by the user and the like.

Furthermore, for example, the autonomous mobile body 11 and the information processing terminal 12 do not necessarily have a one-to-one relationship, and may have a many-to-many, many-to-one, or one-to-many relationship. For example, one user can check data regarding a plurality of autonomous mobile bodies 11 by using one information processing terminal 12, or can check data regarding one autonomous mobile body 11 by using a plurality of information processing terminals.

<Hardware Configuration Example of Autonomous Mobile Body 11>

Next, a hardware configuration example of the autonomous mobile body 11 will be described. Note that, hereinafter, a description is given to an example of a case where the autonomous mobile body 11 is a dog-shaped quadruped walking robot.

Figure 2:
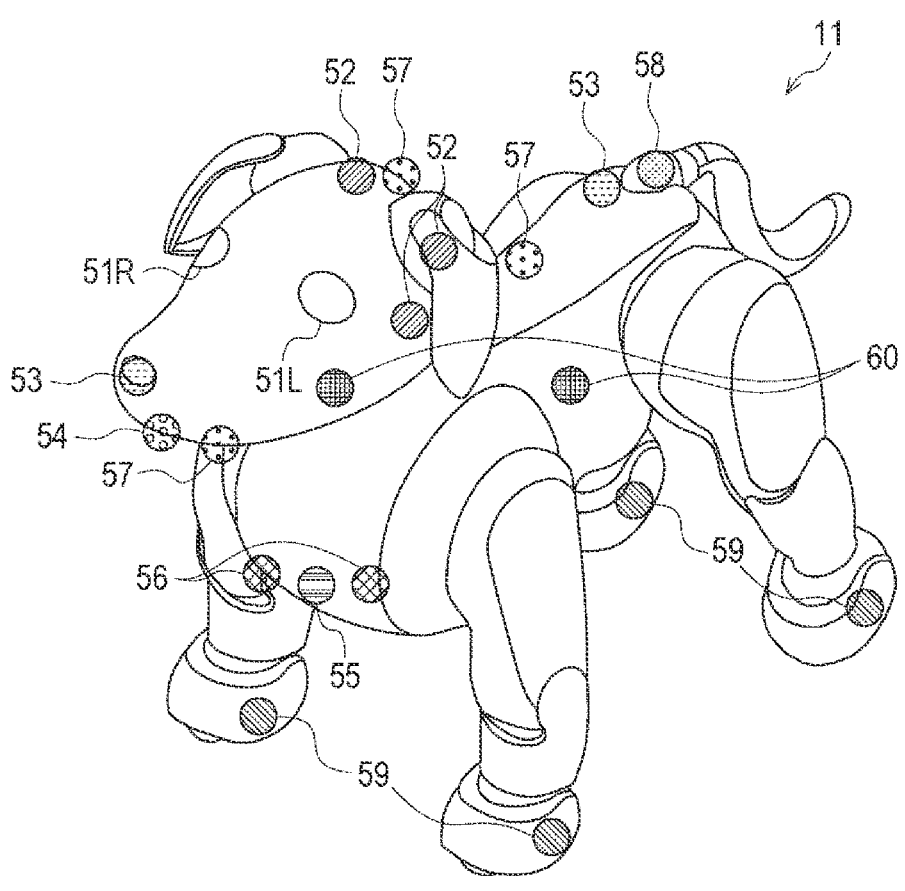
FIG. 2 is a view illustrating a hardware configuration example of an autonomous mobile body.

FIG. 2 is a view illustrating the hardware configuration example of the autonomous mobile body 11. The autonomous mobile body 11 is the dog-shaped quadruped walking robot including a head, a body, four legs, and a tail.

The autonomous mobile body 11 includes two displays 51L and 51R on the head. Note that, hereinafter, the display 51L and the display 51R are simply referred to as a display 51 in a case where it is not necessary to individually distinguish them from each other.

Furthermore, the autonomous mobile body 11 includes various sensors. The autonomous mobile body 11 includes, for example, a microphone 52, a camera 53, a time of flight (ToF) sensor 54, a human sensor 55, a ranging sensor 56, a touch sensor 57, an illuminance sensor 58, a foot sole button 59, and an inertial sensor 60.

The autonomous mobile body 11 includes, for example, four microphones 52 on the head. Each microphone 52 collects, for example, ambient sounds including the user's utterance and surrounding environmental sounds. Furthermore, providing a plurality of microphones 52 makes it possible to collect sounds generated in the surroundings with high sensitivity, and enables localization of a sound source.

The autonomous mobile body 11 includes, for example, two wide-angle cameras 53 at a nose tip and a waist, and captures images around the autonomous mobile body 11. For example, the camera 53 arranged on the nose tip captures an image of a front visual field of the autonomous mobile body 11 (that is, a visual field of the dog). The camera 53 arranged on the waist captures an image of the surroundings centered on a space above the autonomous mobile body 11. The autonomous mobile body 11 can extract a feature point of the ceiling and the like on the basis of the image captured by the camera 53 arranged on the waist, for example, and implement simultaneous localization and mapping (SLAM).

The ToF sensor 54 is provided at the nose tip, for example, and detects a distance to an object present in front of the head. The autonomous mobile body 11 can detect distances to various objects by the ToF sensor 54 with high accuracy, and can implement an operation according to a relative position with respect to a target object including the user, an obstacle and the like.

The human sensor 55 is arranged on the chest, for example, and detects locations of the user, a pet raised by the user and the like. The autonomous mobile body 11 can implement various operations on a moving object, for example, operations according to feelings such as interest, fear, and surprise, by detecting the moving object present in front by the human sensor 55.

The ranging sensor 56 is arranged on the chest, for example, and detects a situation of a floor surface in front of the autonomous mobile body 11. The autonomous mobile body 11 can detect a distance to an object present on the floor surface in front of the same by the ranging sensor 56 with high accuracy, and can implement an operation according to a relative position with respect to the object.

The touch sensor 57 is arranged, for example, on a site on which the user is likely to touch the autonomous mobile body 11, such as the top of the head, under the chin, or the back, and detects contact (touch) by the user. The touch sensor 57 includes, for example, an electrostatic capacitive or pressure-sensitive touch sensor. The autonomous mobile body 11 can detect a contact action such as touching, stroking, hitting, or pushing by the user by the touch sensor 57, and can perform an operation according to the contact action. Furthermore, for example, by arranging the touch sensors 57 in a linear or planar shape in each site, it is possible to detect a touched position in each site.

The illuminance sensor 58 is arranged, for example, on a base of the tail on a back side of the head and the like, and detects illuminance of a space in which the autonomous mobile body 11 is located. The autonomous mobile body 11 can detect brightness of the surroundings by the illuminance sensor 58, and execute an operation according to the brightness.

The foot sole button 59 is arranged, for example, at each of sites corresponding to paws of the four legs, and detects whether or not a leg bottom surface of the autonomous mobile body 11 is in contact with the floor. The autonomous mobile body 11 can detect contact or non-contact with the floor surface by the foot sole button 59, and can grasp, for example, that the autonomous mobile body 11 is held and lifted by the user and the like.

The inertial sensor 60 is arranged on each of the head and the body, for example, and detects physical quantities such as a speed, an acceleration, and rotation of the head and the body. For example, the inertial sensor 60 includes a six-axis sensor that detects an acceleration and an angular velocity on an X-axis, a Y-axis, and a Z-axis. The autonomous mobile body 11 can detect movement of the head and the body with high accuracy with the inertial sensor 60, and can implement operation control according to a situation.

Note that, a configuration of the sensor included in the autonomous mobile body 11 can be flexibly changed in accordance with specifications, operations and the like. For example, in addition to the configuration described above, the autonomous mobile body 11 may further include, for example, various communication devices including a temperature sensor, a geomagnetic sensor, and a global navigation satellite system (GNSS) signal receiver and the like.

Figure 3:
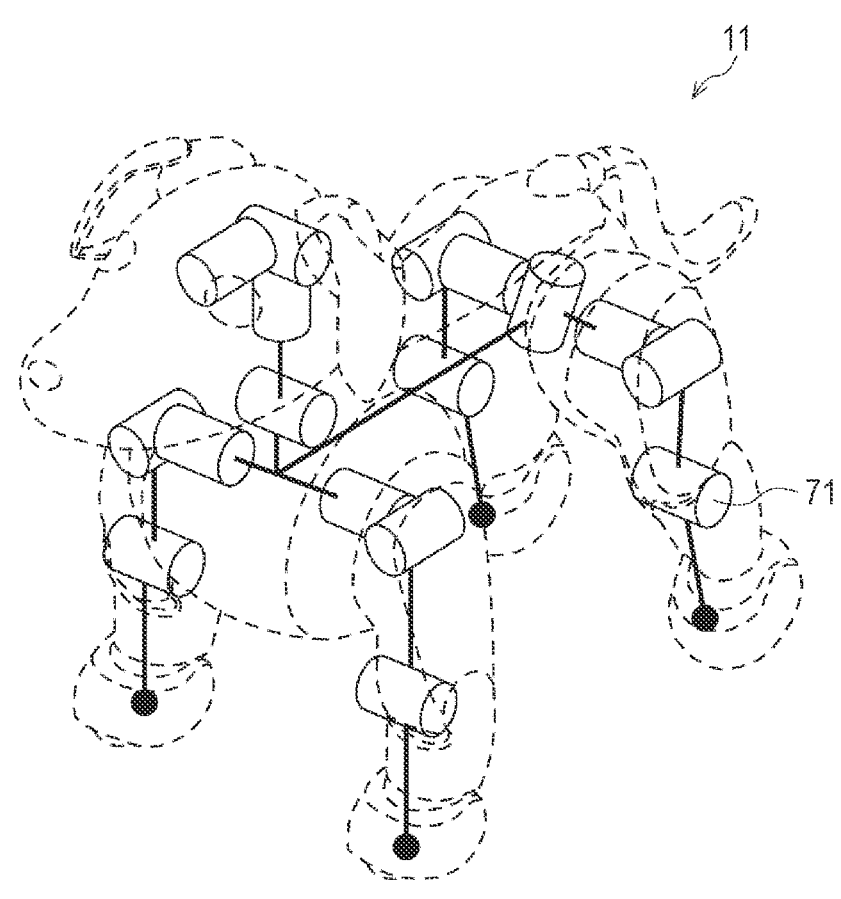
FIG. 3 is a configuration example of an actuator included in the autonomous mobile body.

Next, with reference to FIG. 3, a configuration example of joints of the autonomous mobile body 11 will be described. FIG. 3 illustrates a configuration example of an actuator 71 included in the autonomous mobile body 11. The autonomous mobile body 11 has a total of 22 degrees of freedom of rotation; two for each of the ear and the tail, and one for the mouth in addition to the rotating sites illustrated in FIG. 3.

For example, the autonomous mobile body 11 has three degrees of freedom on the head and can achieve both nodding and a head tilting operation. Furthermore, the autonomous mobile body 11 can implement a natural and flexible operation closer to that of a real dog, by reproducing a swing operation of the waist by the actuator 71 provided on the waist.

Note that, the autonomous mobile body 11 may implement the above-described 22 degrees of freedom of rotation by combining, for example, a one-axis actuator and a two-axis actuator. For example, the one-axis actuator may be employed for each of elbows and knees in the legs, and the two-axis actuator may be employed for each of shoulders and thigh joints.

Next, with reference to FIGS. 4A, 4B, and 4C, a function of the display 51 included in the autonomous mobile body 11 will be described.

The autonomous mobile body 11 includes the two displays 51R and 51L corresponding to right and left eyes, respectively. Each display 51 has a function of visually expressing eye movement and feelings of the autonomous mobile body 11. For example, each display 51 can produce a natural operation close to that of a real animal such as a dog by expressing a motion of an eyeball, a pupil, and an eyelid according to the feeling and operation, and can express a line-of-sight and the feeling of the autonomous mobile body 11 with high accuracy and flexibility. Furthermore, the user can intuitively grasp a state of the autonomous mobile body 11 from the motion of the eyeball displayed on the display 51.

Furthermore, each display 51 is implemented by, for example, two independent organic light emitting diodes (OLEDs). By using the OLED, it is possible to reproduce a curved surface of the eyeball. As a result, it is possible to implement a more natural exterior as compared with a case of expressing a pair of eyeballs with one flat display, or a case of individually expressing two eyeballs with two independent flat displays.

According to the configuration described above, as illustrated in FIGS. 5A and 5B, the autonomous mobile body 11 can reproduce an operation and feeling expression closer to those of a real living body by controlling motions of the joints and the eyeballs with high accuracy and flexibility.

Figures 5A, 5B:
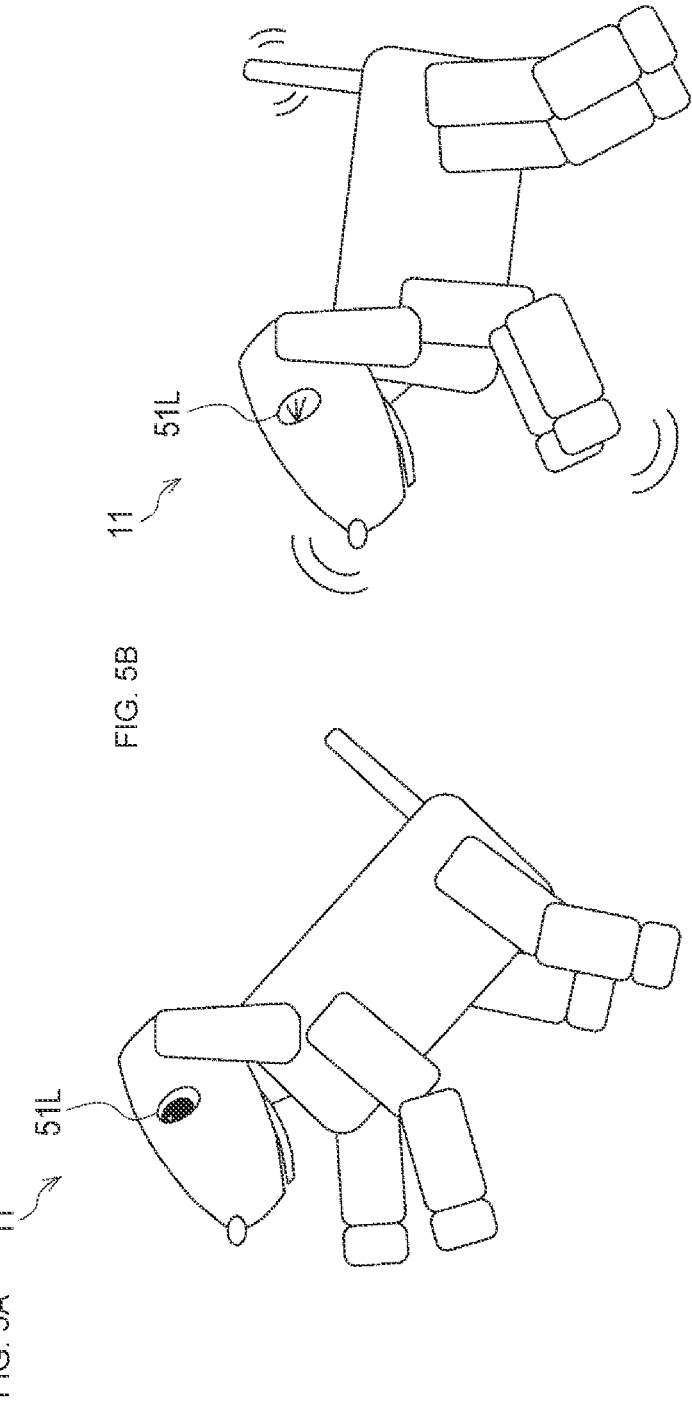
FIGS. 5A and 5B are diagrams illustrating an operation example of the autonomous mobile body.

Note that, FIGS. 5A and 5B are diagrams illustrating an operation example of the autonomous mobile body 11, but FIGS. 5A and 5B illustrate an external structure of the autonomous mobile body 11 in a simplified manner in order to describe while focusing on motions of the joints and the eyeballs of the autonomous mobile body 11.

<Functional Configuration Example of Autonomous Mobile Body 11>

Next, with reference to FIG. 6, a functional configuration example of the autonomous mobile body 11 will be described. The autonomous mobile body 11 includes an input unit 101, a communication unit 102, an information processing unit 103, a drive unit 104, an output unit 105, and a storage unit 106.

The input unit 101 includes the microphone 52, the camera 53, the ToF sensor 54, the human sensor 55, the ranging sensor 56, the touch sensor 57, the illuminance sensor 58, the foot sole button 59, and the inertial sensor 60 described above, and has a function of collecting various sensor data regarding the user and the surrounding situation. Furthermore, the input unit 101 includes, for example, an input device 121 such as a switch and a button. The input unit 101 supplies the collected sensor data and input data input via the input device to the information processing unit 103.

The communication unit 102 communicates with another autonomous mobile body 11, the information processing terminal 12, and the information processing server 13 via the network 21 or without intervention of the network 21, and transmits and receives various data. The communication unit 102 supplies the received data to the information processing unit 103, and acquires data to be transmitted from the information processing unit 103.

Note that, a communication system of the communication unit 102 is not especially limited, and can be flexibly changed in accordance with specifications and operations.

The information processing unit 103 includes, for example, a processor and the like such as a central processing unit (CPU), and performs various pieces of information processing and controls each portion of the autonomous mobile body 11.

The drive unit 104 bends and stretches a plurality of joints included in the autonomous mobile body 11 on the basis of control by the information processing unit 103. More specifically, the drive unit 104 drives the actuator 71 included in each joint on the basis of the control by the information processing unit 103. Furthermore, the drive unit 104 supplies drive data indicating an operation angle and the like of each actuator to the information processing unit 103.

The output unit 105 includes, for example, the display 51, a speaker, a haptic device and the like, and outputs visual information, auditory information, tactile information and the like on the basis of the control by the information processing unit 103.

The storage unit 106 includes, for example, a nonvolatile memory and a volatile memory, and stores various programs and data.

Note that, hereinafter, the description of "via the communication unit 102 and the network 21" in a case where each portion of the autonomous mobile body 11 communicates with the information processing server 13 and the like via the communication unit 102 and the network 21 will be appropriately omitted. For example, in a case where the recognition unit 151 communicates with the information processing server 13 via the communication unit 102 and the network 21, it is simply described that the recognition unit 151 communicates with the information processing server 13.

<Configuration Example of Information Processing Unit 103>

Figure 6:
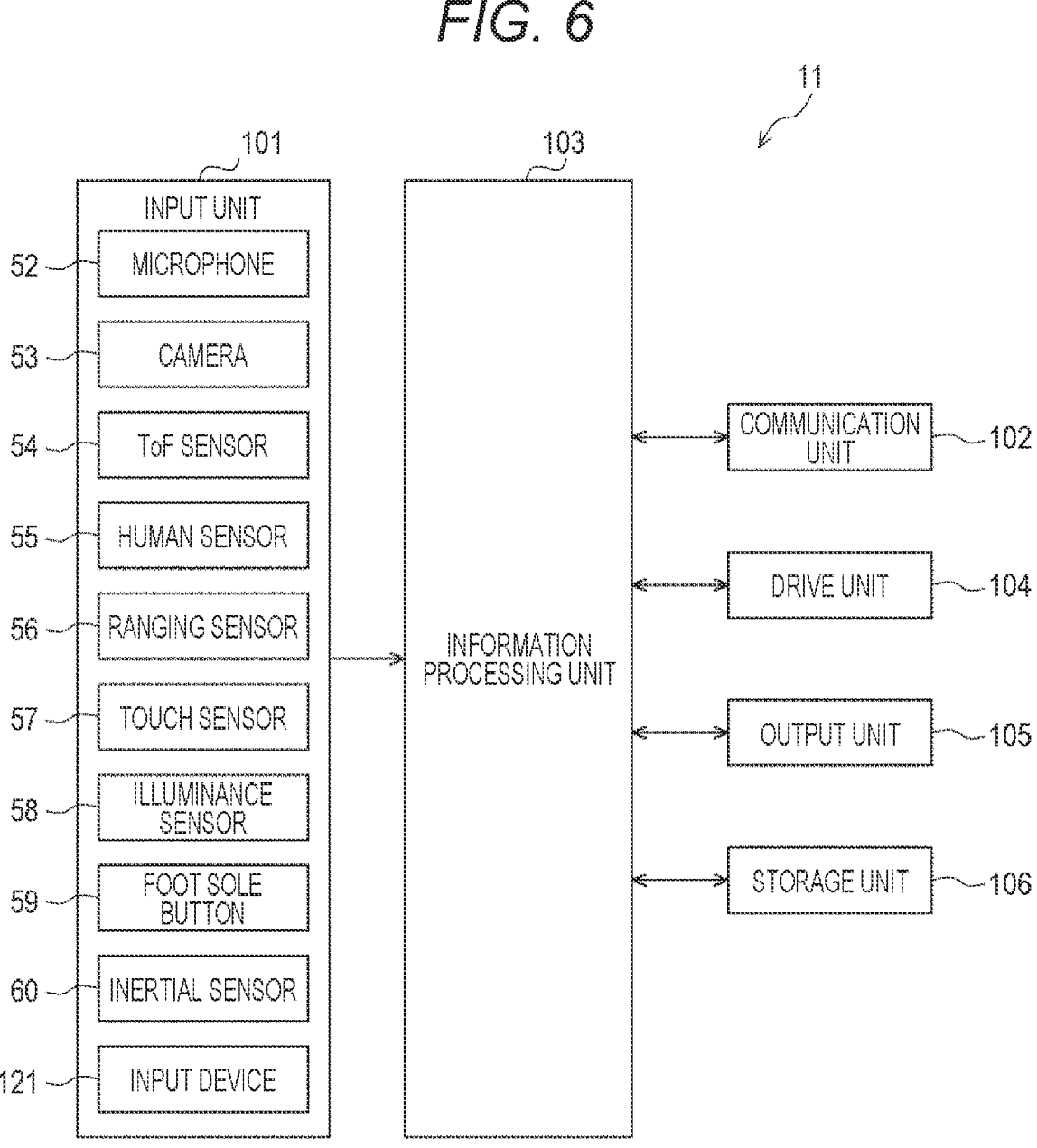
FIG. 6 is a block diagram illustrating a functional configuration example of the autonomous mobile body.
Figure 7:
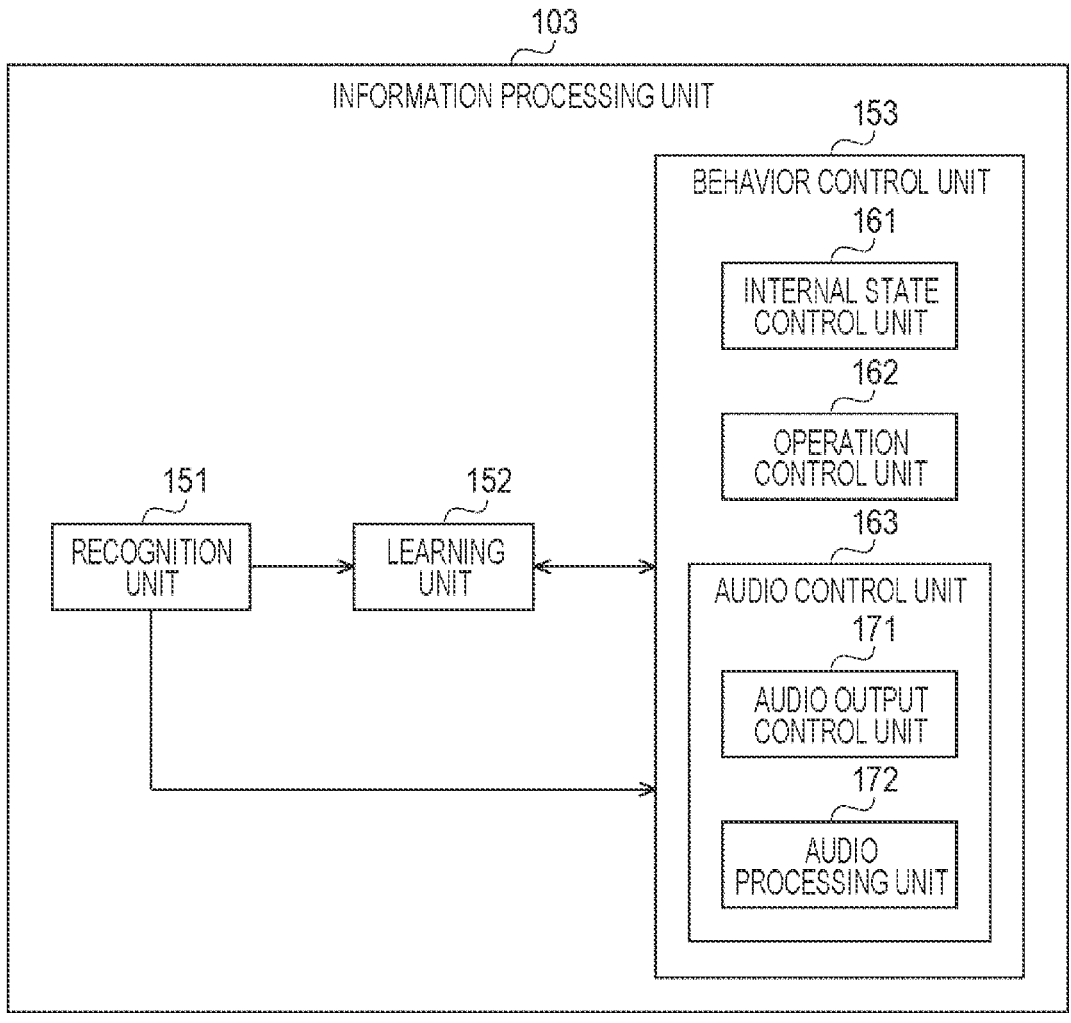
FIG. 7 is a block diagram illustrating a functional configuration example of an information processing unit of the autonomous mobile body.

FIG. 7 illustrates a functional configuration example of the information processing unit 103 in FIG. 6. The information processing unit 103 includes the recognition unit 151, a learning unit 152, and a behavior control unit 153.

The recognition unit 151 recognizes a situation in which the autonomous mobile body 11 is placed on the basis of the sensor data and the input data supplied from the input unit 101, reception data supplied from the communication unit 102, and drive data supplied from the drive unit 104.

The situation in which the autonomous mobile body 11 is placed includes, for example, a situation of the autonomous mobile body 11 itself and its surroundings. The situation of the autonomous mobile body 11 itself includes, for example, a state and a movement of the autonomous mobile body 11. The situation of the surroundings includes, for example, a state, a movement, and an instruction of a surrounding person such as the user, a state and a movement of a surrounding living body such as a pet, a state and a movement of a surrounding object, a time, a place, a surrounding environment and the like. The surrounding object includes, for example, another autonomous mobile body. Furthermore, in order to recognize the situation, the recognition unit 151 performs, for example, person identification, recognition of facial expression or line-of-sight, feeling recognition, object recognition, operation recognition, spatial region recognition, color recognition, shape recognition, marker recognition, obstacle recognition, step recognition, brightness recognition, temperature recognition, audio recognition, word understanding, position estimation, posture estimation and the like.

Furthermore, the recognition unit 151 has a function of estimating and understanding a situation on the basis of various pieces of recognized information. For example, the recognition unit 151 recognizes a stimulus externally given to the autonomous mobile body 11 and a partner who gives the stimulus. Examples of the stimulus to be recognized include, for example, a visual stimulus, an auditory stimulus, and a tactile stimulus. At that time, the recognition unit 151 may comprehensively estimate the situation by using knowledge stored in advance.

The recognition unit 151 supplies data indicating a recognition result or an estimation result of the situation (hereinafter, referred to as situation data) to the learning unit 152 and the behavior control unit 153. Furthermore, the recognition unit 151 registers the situation data in behavior history data stored in the storage unit 106.

The behavior history data is data indicating a history of behaviors of the autonomous mobile body 11. The behavior history data includes items of, for example, a date and time when the behavior is started, a date and time when the behavior ends, a trigger for executing the behavior, a place where an instruction of the behavior is issued (note that, in a case where an instruction of a location is issued), a situation at the time of the behavior, and whether or not the behavior is completed (whether or not the behavior is executed to the end).

As the trigger for executing the behavior, for example, in a case where the behavior is executed with the user's instruction as the trigger, a content of the instruction is registered. Furthermore, for example, in a case where the behavior is executed with a predetermined situation as the trigger, a content of the situation is registered. Moreover, for example, in a case where the behavior is executed with an object instructed by the user or a recognized object as the trigger, a type of the object is registered.

The learning unit 152 learns a situation and a behavior, and an effect of the behavior on the environment on the basis of one or more of the sensor data and the input data supplied from the input unit 101, the reception data supplied from the communication unit 102, the drive data supplied from the drive unit 104, the situation data supplied from the recognition unit 151, and data regarding the behavior of the autonomous mobile body 11 supplied from the behavior control unit 153. For example, the learning unit 152 performs the pattern recognition learning described above and learns a behavior pattern corresponding to the training by the user.

For example, the learning unit 152 implements the learning described above by using a machine learning algorithm such as deep learning. Note that, the learning algorithm employed by the learning unit 152 is not limited to the example described above, and can be designed as appropriate.

The learning unit 152 supplies data indicating a learning result (hereinafter, referred to as learning result data) to the behavior control unit 153 or causes the storage unit 106 to store the data.

The behavior control unit 153 controls the behavior of the autonomous mobile body 11 on the basis of a recognized or estimated situation and the learning result data. The behavior control unit 153 supplies the data regarding the behavior of the autonomous mobile body 11 to the learning unit 152 or registers the data in the behavior history data stored in the storage unit 106. The behavior control unit 153 includes an internal state control unit 161, an operation control unit 162, and an audio control unit 163.

The internal state control unit 161 controls an internal state of the autonomous mobile body 11 on the basis of the recognized or estimated situation and the learning result data. For example, the internal state control unit 161 controls state transition of the internal state of the autonomous mobile body 11.

The internal state of the autonomous mobile body 11 is an inner state that does not appear out of the autonomous mobile body 11, and is set on the basis of, for example, at least one or more of the behavior, physical condition, feeling, age, remaining battery level or the like of the autonomous mobile body 11. The physical condition of the autonomous mobile body 11 includes, for example, a degree of hunger. The degree of hunger is set on the basis of, for example, an elapsed time after the autonomous mobile body 11 performs an operation of eating food. The age of the autonomous mobile body 11 is set on the basis of, for example, the purchase date of the autonomous mobile body 11, an elapsed time from the date on which the power is first turned on, or the total operating time of the autonomous mobile body 11.

The operation control unit 162 controls the drive unit 104 and the output unit 105 on the basis of at least one of the recognized or estimated situation, learning result data, or the internal state of the autonomous mobile body 11, thereby executing the control of the operation necessary for the autonomous mobile body 11 to perform various behaviors. For example, the operation control unit 162 executes rotation control of the actuator 71, display control of the display 51 and the like.

Note that, the operation of the autonomous mobile body 11 includes, for example, an operation of expressing an intention or feeling to the user and performance in addition to the operation necessary for the operation of the autonomous mobile body 11. Hereinafter, the latter operation is referred to as motion.

Data for implementing the motion (hereinafter, referred to as motion data) is created in advance using an authoring tool, for example, and is stored in the storage unit 106 at the time of manufacturing the autonomous mobile body 11. Alternatively, for example, the motion data is downloaded from the information processing terminal 12 or the information processing server 13 to the autonomous mobile body 11.

The operation control unit 162 allows the autonomous mobile body 11 to execute the motion by controlling the drive unit 104 and the output unit 105 on the basis of the motion data.

The audio control unit 163 executes generation and processing of audio data corresponding to audio output from the autonomous mobile body 11, and control of characteristic and output timing of the audio.

Here, the characteristic of the audio to be controlled includes, for example, a type of audio (for example, a cry, a conversation sound and the like), contents, features (for example, a pitch, loudness, a tone color and the like), and a sound quality. For example, in a case of the conversation sound, the content of the audio includes the content of the conversation. The control of the output timing of the audio also includes control of presence or absence of the audio output.

The audio control unit 163 includes an audio output control unit 171 and an audio processing unit 172.

The audio output control unit 171 controls generation and processing of the audio data by the audio processing unit 172. For example, the audio output control unit 171 controls transition of a sound production mode of the audio processing unit 172 on the basis of at least one of the behavior of the autonomous mobile body 11, the state of the autonomous mobile body 11, the partner who gives the stimulus, the surrounding situation, or the content of the stimulus.

The sound production mode is, for example, a mode for switching an algorithm and a parameter used by the audio processing unit 172 for generating or processing the audio data. By switching the algorithm and the parameter used for generating the audio data, for example, the characteristic and output timing of the audio based on the audio data generated by the audio processing unit 172 change.

The audio output control unit 171 performs output control of the audio from the output unit 105 on the basis of one or more of the recognized or estimated situation, the learning result data, or the internal state set by the internal state control unit 161. For example, the audio output control unit 171 supplies the audio data generated or processed by the audio processing unit 172 to the speaker included in the output unit 105, and performs output control of the audio from the speaker.

The audio processing unit 172 holds, for example, a program or a control script for generating or processing the audio data. The audio processing unit 172 generates or processes the audio data corresponding to the audio output from the autonomous mobile body 11 on the basis of one or more of the recognized or estimated situation, the learning result data, or the internal state of the autonomous mobile body 11, thereby controlling the characteristic of the audio.

The audio output from the autonomous mobile body 11 includes, for example, the audio of the autonomous mobile body 11 to communicate with the user or express a state or feeling, an operation sound accompanying the operation of the autonomous mobile body 11, and a performance sound for enhancing performance of the autonomous mobile body 11. The audio for the autonomous mobile body 11 to communicate with the user or to express the state or feeling includes, for example, a cry, a conversation sound, talk in sleep and the like. The operation sound includes, for example, a cry, a foot sound and the like. The performance sound includes, for example, a sound effect, music and the like.

Furthermore, the audio output by the autonomous mobile body 11 includes, for example, the audio that is output or changes while reacting to an external stimulus (hereinafter, referred to as a stimulus reaction sound), and the audio that is output or changes in accordance with (in conjunction with) the operation of the autonomous mobile body 11. The stimulus reaction sound includes, for example, the cry, conversation sound, talk in sleep and the like. The audio that is output or changes in accordance with the operation of the autonomous mobile body 11 includes, for example, the operation sound and performance sound.

Hereinafter, out of the audio that is output or changes in accordance with the operation of the autonomous mobile body 11, the audio that is output or changes in accordance with the motion is referred to as a motion sound.

<Example of Method of Outputting Audio>

Next, an example of a method of outputting the audio of the autonomous mobile body 11 is described with reference to FIGS. 8, 9A, 9B, 10A, 10B, 11, 12, 13, and 14.

Figure 8:
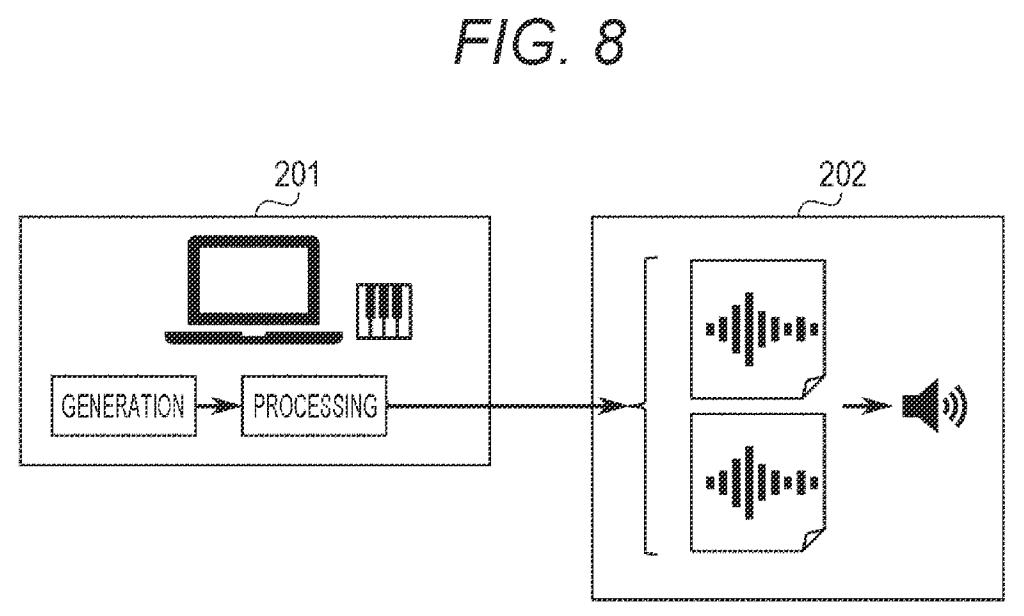

First, an example of a method of outputting audio of a conventional autonomous mobile body is described with reference to FIG. 8.

For example, in an external computer 201, audio data corresponding to audio of an autonomous mobile body 202 is generated and processed to be stored in the autonomous mobile body 202. Then, the autonomous mobile body 202 outputs the audio on the basis of the stored audio data.

Therefore, the autonomous mobile body 202 can output only audio corresponding to the audio data stored in advance. Therefore, in order to increase the number of types of audio that can be output and enhance ability in expression of the autonomous mobile body 11, it is necessary to generate a large number of types of audio data in advance and store the generated audio data in the autonomous mobile body 11.

Next, the example of the method of outputting the audio of the autonomous mobile body 11 is described with reference to FIGS. 9A and 9B.

Figures 9A, 9B:
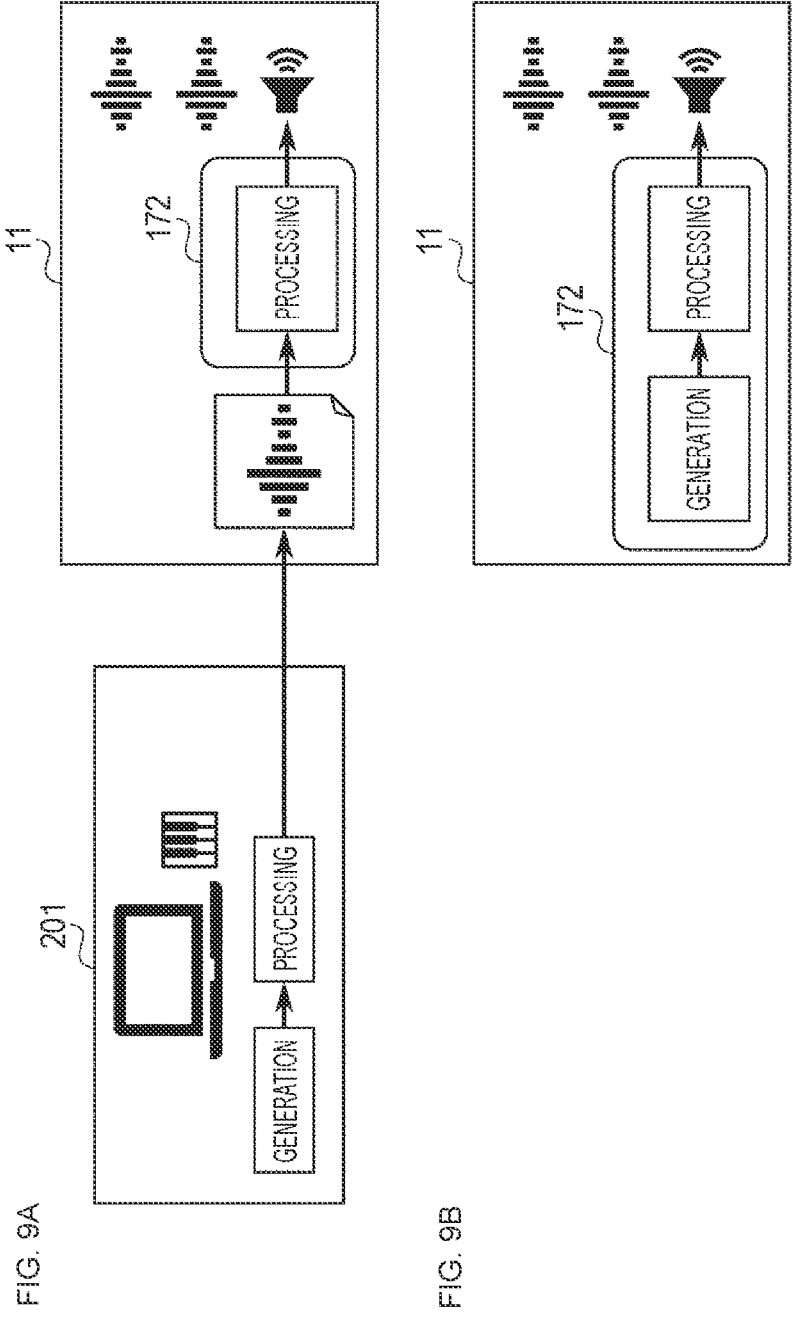
FIGS. 9A and 9B are diagrams for explaining an example of a method of outputting audio of the autonomous mobile body.

For example, as illustrated in FIGS. 9A and 9B, there are two types of methods for outputting the audio of the autonomous mobile body 11.

For example, as illustrated in A of FIG. 9A, in the external computer 201, audio data corresponding to the audio of the autonomous mobile body 202 is generated and processed to be stored in the storage unit 106 of the autonomous mobile body 11. The audio processing unit 172 processes the audio data stored in the storage unit 106 as necessary (for example, modulates the audio data). The audio output control unit 171 causes the output unit 105 to output the audio based on the audio data processed by the audio processing unit 172.

Furthermore, for example, as illustrated in FIG. 9B, the audio processing unit 172 of the autonomous mobile body 11 generates and processes the audio data corresponding to the audio to be output (for example, performs numerical operation of the audio data). The audio output control unit 171 causes the output unit 105 to output the audio based on the audio data generated or processed by the audio processing unit 172.

Therefore, the autonomous mobile body 11 can output various types of audio according to the situation without preparing many types of audio data in advance.

For example, as illustrated in FIG. 10A, the autonomous mobile body 11 can generate and output the audio reacting to a user's action (for example, stroking the autonomous mobile body 11 and the like).

Specifically, for example, the input unit 101 of the autonomous mobile body 11 supplies the sensor data corresponding to the user's action to the recognition unit 151. The recognition unit 151 recognizes the user's action on the basis of the sensor data. For example, the recognition unit 151 recognizes a manner of stroking the autonomous mobile body 11 by the user on the basis of the sensor data from the touch sensor 57.

Here, an example of a method of recognizing the manner of stroking of the autonomous mobile body 11 is described with reference to FIGS. 11 and 12.

Figure 11:
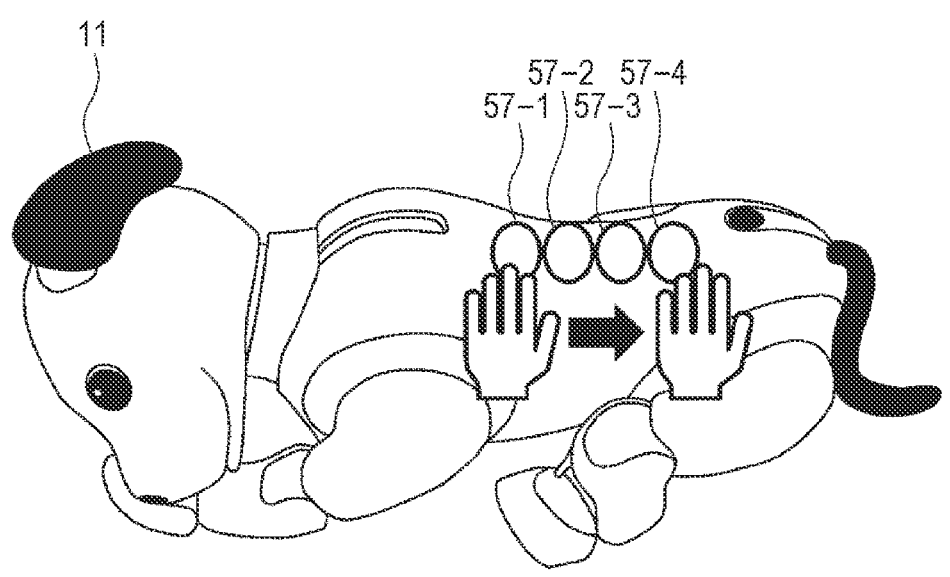
FIG. 11 is a view for explaining an example of a method of recognizing a manner of stroking the autonomous mobile body.

For example, as illustrated in FIG. 11, touch sensors 57-1 to 57-4 are provided on the back of the autonomous mobile body 11 so as to be arranged in a front-rear direction. The touch sensor 57-1 is arranged on the foremost position, and the touch sensor 57-4 is arranged on the rearmost position.

Figure 12:
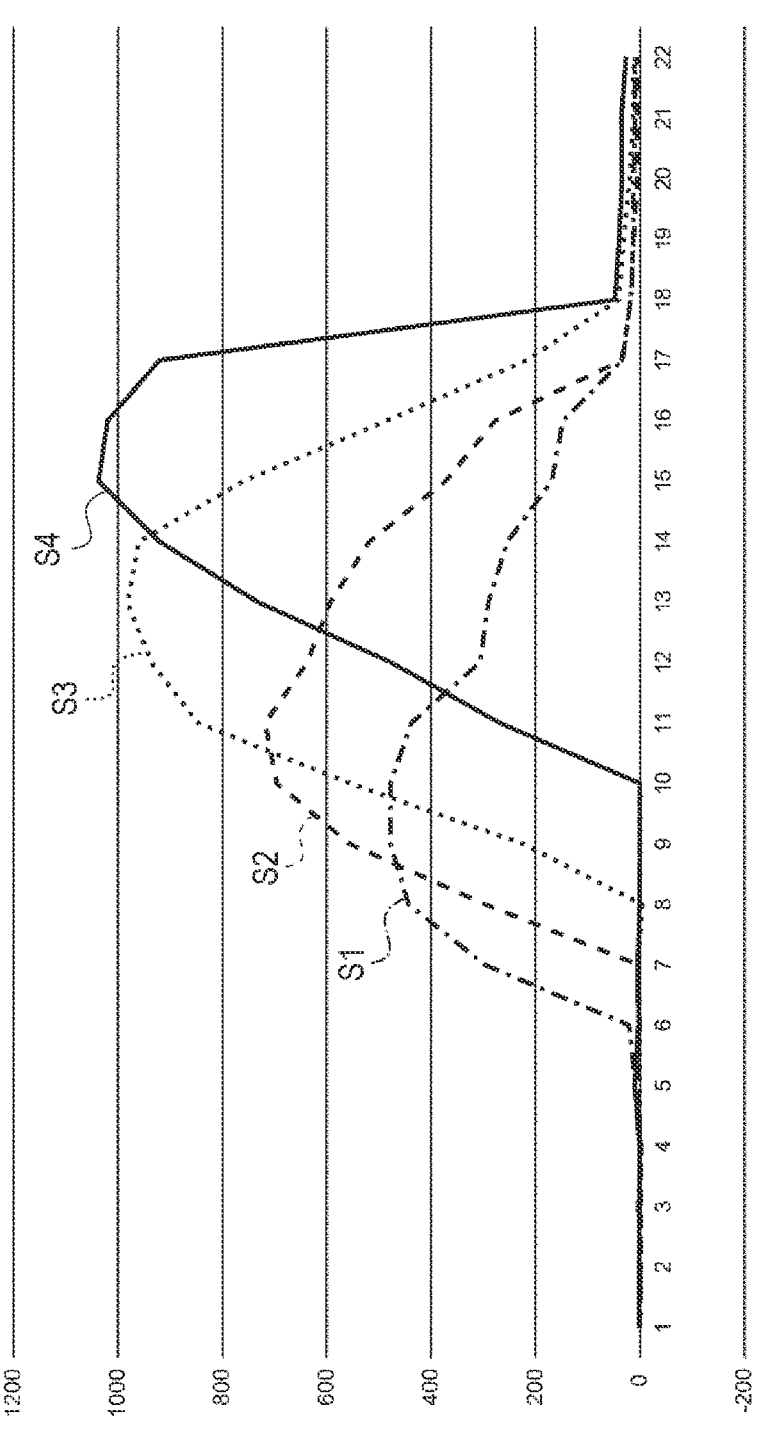
FIG. 12 is a diagram for explaining an example of a method of recognizing a manner of stroking the autonomous mobile body.

FIG. 12 illustrates an example of waveforms of sensor data S1 to S4 output from the touch sensors 57-1 to 57-4, respectively, in a case where the user strokes the back of the autonomous mobile body 11 from the front to the rear as illustrated in FIG. 11. Time is plotted along the abscissa and a value of the sensor data is plotted along the ordinate of a graph in FIG. 12.

As illustrated in this example, the foremost touch sensor 57-1 first reacts and the sensor data S1 changes. Next, the second touch sensor 57-2 from the front reacts, and the sensor data S2 changes. Next, the third touch sensor 57-3 from the front reacts, and the sensor data S3 changes. Next, the rearmost touch sensor 57-4 reacts, and the sensor data S4 changes.

The recognition unit 151 can recognize a position, intensity, speed, direction and the like of the stroke by analyzing a change in sensor data of each touch sensor 57. For example, the recognition unit 151 can recognize a pattern (manner of stroke) such as fast stroke, slow stroke, light stroke, firm stroke and the like.

Then, the recognition unit 151 supplies situation data including the recognition result of the action to the behavior control unit 153.

The audio processing unit 172 calculates an audio parameter used to control the audio to be output on the basis of the recognized action.

The audio parameter is a parameter used to control the characteristic of the audio. Specifically, for example, a frequency, a volume, a modulation degree, an overtone component, an application degree (degree of application) of a low-pass filter, an application degree (degree of application) of an effector and the like are used as the audio parameters.

The audio processing unit 172 can generate (the audio data corresponding to) the various types of audio according to the recognized action by controlling each audio parameter.

For example, a cry of a dog (bow) is reproduced by increasing and then decreasing the frequency of the audio. For example, the tone of the cry changes depending on a fundamental frequency. For example, a large cry of a dog is expressed by decreasing the fundamental frequency of the cry. For example, a small cry of a dog is expressed by increasing the fundamental frequency of the cry. For example, excited feeling is expressed by increasing the fundamental frequency of the cry. For example, by increasing a change rate (change amount per unit time) of the frequency of the cry, vigorous up and down of feeling is expressed.

For example, a vowel sound included in the audio is controlled by the application degree of the low-pass filter. Specifically, depending on the application degree of the low-pass filter, a sound close to a (a) pronounced in a case where the mouth is opened wide and a sound close to u (u) pronounced in a case where the mouth is opened small are reproduced.

Note that, each audio parameter includes a direction in which a strong reaction is expressed and a direction in which a weak reaction is expressed to an external stimulus and the like. For example, as the volume increases, a stronger reaction is expressed, and as the volume decreases, a weaker reaction is expressed. For example, as the frequency increases, a stronger reaction is expressed, and as the frequency decreases, a weaker reaction is expressed.

The audio processing unit 172 generates the audio data on the basis of the calculated audio parameter. The audio output control unit 171 controls an output timing of the audio from the output unit 105 on the basis of the recognized action.

Note that, for example, in a case where the autonomous mobile body 11 controls the output timing and the audio parameter directly on the basis of the sensor data, for example, there is a possibility that the audio is output at an unnatural timing or the audio reacting to a noise component of the sensor data is output. In contrast, since the autonomous mobile body 11 controls the output timing and the audio parameter on the basis of the action recognized on the basis of the sensor data, it is possible to output appropriate audio at an appropriate timing.

Furthermore, for example, as illustrated in FIG. 10B, the autonomous mobile body 11 can generate and output the audio corresponding to the internal state of the autonomous mobile body 11.

For example, the internal state control unit 161 sets the internal state of the autonomous mobile body 11 on the basis of the situation recognized or estimated by the recognition unit 151. The audio processing unit 172 calculates the audio parameter used to control the audio to be output on the basis of the internal state of the autonomous mobile body 11 set by the internal state control unit 161. The audio processing unit 172 generates the audio data on the basis of the calculated audio parameter. The audio output control unit 171 controls the output timing of the audio from the output unit 105 on the basis of the internal state of the autonomous mobile body 11 set by the internal state control unit 161.

Therefore, the autonomous mobile body 11 can output the appropriate audio at the appropriate timing on the basis of the internal state.

<Example of Control Algorithm of Audio Parameter>

Figure 13:
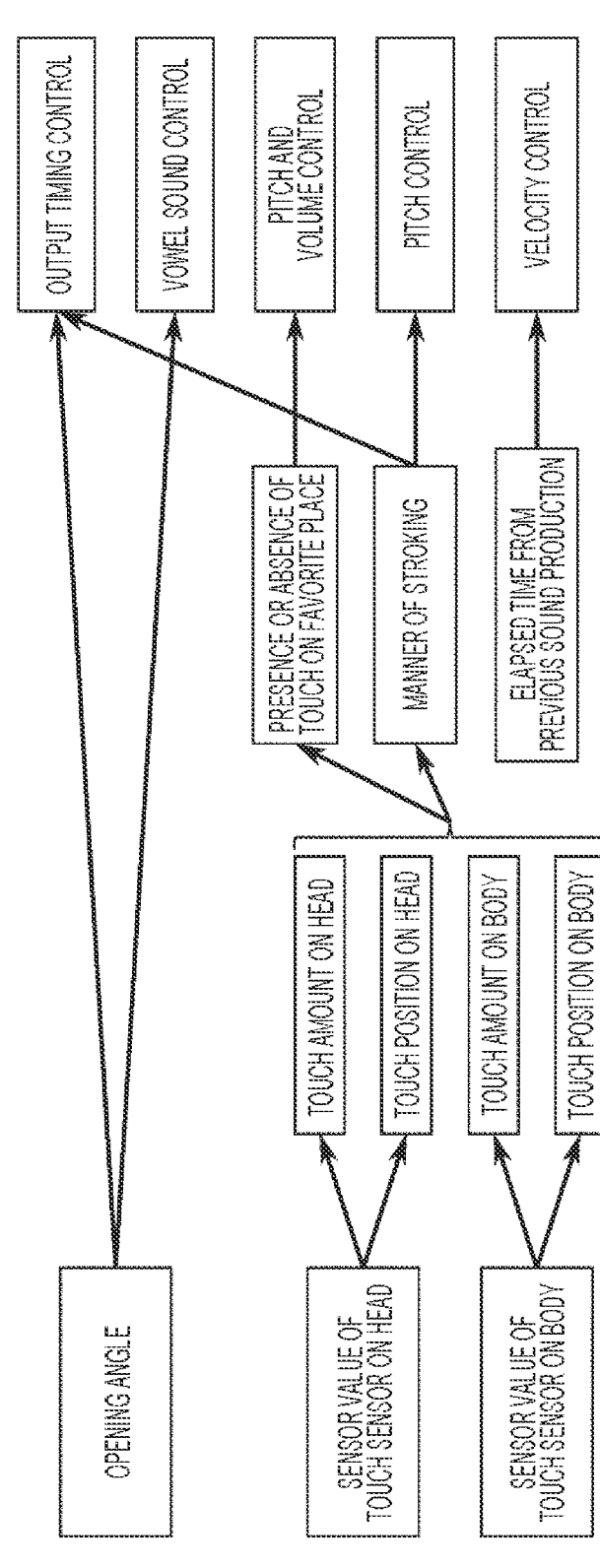
FIG. 13 is a diagram for explaining an example of a control algorithm of an audio parameter.

Next, an example of a control algorithm of the audio parameter of the autonomous mobile body 11 is described with reference to FIG. 13. Here, the control algorithm of the audio parameter of the cry of the autonomous mobile body 11 will be described as a specific example.

Figure 14:
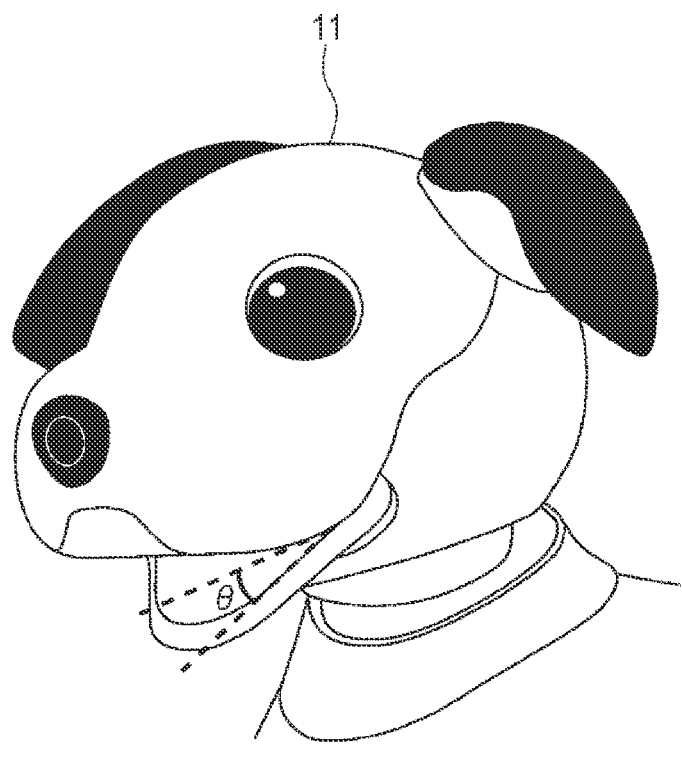
FIG. 14 is a view illustrating an example of an opening angle.

For example, the recognition unit 151 detects an angle (hereinafter, referred to as an opening angle) at which the autonomous mobile body 11 opens its mouth on the basis of the drive data from the drive unit 104. For example, as illustrated in FIG. 14, an angle θ centered on a mouth corner of the autonomous mobile body 11 is detected as the opening angle.

Note that, for example, in a case where the mouth of the autonomous mobile body 11 is displayed on the display and is not physically opened, the angle at which the displayed mouth is opened is used as the opening angle.

For example, the recognition unit 151 recognizes a touch amount and a touch position on the head on the basis of a sensor value of the touch sensor 57 on the head of the autonomous mobile body 11. For example, the recognition unit 151 recognizes a touch amount and a touch position on the body on the basis of the sensor value of the touch sensor 57 on the body of the autonomous mobile body 11.

Here, the touch amount is detected on the basis of the sensor value of the touch sensor 57, and represents, for example, intensity of the touch.

Note that, for example, the touch amount may be calculated on the basis of the intensity of the touch and duration of the touch (for example, on the basis of a product of the intensity of the touch and the duration of the touch). Therefore, a concept of time is introduced into the touch amount.

Furthermore, for example, the touch amount may be calculated on the basis of the intensity of the touch and an area of a touched region (for example, on the basis of a product of the intensity of the touch and the area of the touched region). Therefore, the concept of the area is introduced into the touch amount.

Moreover, for example, the touch amount may be calculated on the basis of the intensity of the touch, the duration of the touch, and the touched region.

For example, the recognition unit 151 recognizes the presence or absence of the touch on a place (hereinafter, referred to as a favorite place) where the autonomous mobile body 11 shows a strong positive reaction and a manner of stroking on the basis of the touch amount and the touch position on the head of the autonomous mobile body 11 and the touch amount and the touch position on the body. The manner of stroking is represented by, for example, the intensity, position, speed, direction and the like of stroking.

For example, the audio output control unit 171 controls the output timing of the cry (including the presence or absence of the output of the cry, for example,) on the basis of the opening angle and the manner of stroking.

For example, the audio processing unit 172 controls the vowel sound of the cry on the basis of the opening angle. For example, in a case where a real dog cries, the sound corresponding to the vowel sound of the cry changes depending on an opening degree of the mouth. For example, the cry of the dog is a sound close to a (a) in a case where the opening of the mouth is large, and is a sound close to u (u) in a case where the opening of the mouth is small. Such control of vowel sound is implemented by the application degree of the low-pass filter as described above.

For example, the audio processing unit 172 controls the pitch and volume of the cry on the basis of the presence or absence of the touch on the favorite place. For example, in a case where the favorite place is touched, the pitch and volume of the cry are increased.

For example, the audio processing unit 172 controls the pitch of the cry on the basis of the manner of stroking. For example, the pitch (frequency) of the cry changes in accordance with a change in stroking intensity and position.

For example, the audio output control unit 171 detects the elapsed time from the output of the previous cry. The elapsed time from the output of the previous cry is, for example, an elapsed time from a time point at which the output of the previous cry ends.

For example, the audio processing unit 172 controls a velocity of the cry (for example, an attack of the cry) on the basis of the elapsed time from the output of the previous cry.

<Example of State Transition of Internal State of Autonomous Mobile Body 11>

Next, an example of the state transition of the internal state of the autonomous mobile body 11 is described with reference to FIG. 15.

For example, under control of the internal state control unit 161, the internal state of the autonomous mobile body 11 transits among a normal state, a relaxed state, a drowsy state, and a displeased state according to the external stimulus and the like.

For example, when the autonomous mobile body 11 is powered on, the internal state is set to the normal state as an initial state. The normal state is a neutral state in which the feeling of the autonomous mobile body 11 is neither positive nor negative but neutral.

For example, in a case of the normal state, when a positive stimulus is given from the user to some extent, the internal state transits in a positive direction and transits to a relaxed state. The relaxed state is a state in which the autonomous mobile body 11 is relaxed.

The positive stimulus is, for example, a stimulus preferred by the autonomous mobile body 11. For example, stroking the autonomous mobile body 11 or talking to the autonomous mobile body 11 corresponds to the positive stimulus.

Note that, for example, in a case where the autonomous mobile body 11 performs a predetermined behavior such as walking or eating, even if the positive stimulus is given, the internal state remains the normal state and does not transit to the relaxed state.

For example, in a case of the relaxed state, when the positive stimulus is given from the user to some extent, the internal state transits in the positive direction and transits to the drowsy state. The drowsy state is a state in which the autonomous mobile body 11 is satisfied and sleepy or a state in which the autonomous mobile body 11 is drowsy.

For example, in the relaxed state or the drowsy state, when a state in which the stimulus is not given continues, the internal state transits in a negative direction and transits to the normal state.

For example, in a case of the normal state, when a state in which the stimulus is not given continues, the internal state transits in the negative direction and transits to the displeased state. The displeased state is a state in which the feeling of the autonomous mobile body is negative. For example, the displeased state is a state in which the autonomous mobile body 11 is angry, sulking, or having dissatisfaction.

Note that, for example, in a case where the autonomous mobile body 11 performs a predetermined behavior such as walking or eating, even if a state in which the stimulus is not given continues, the internal state remains the normal state and does not transit to the displeased state.

For example, in a case of the displeased state, when the positive stimulus is given from the user to some extent, the internal state transits in the positive direction and transits to the normal state.

Note that, for example, a detailed transition condition among the internal states changes depending on the user who stimulates or the manner of giving the stimulus.

For example, in a case of being gently stroked, the internal state transits in the positive direction in a short time as compared with a case of being stroked normally. For example, in a case of being roughly stroked, the internal state does not transit or transits in the negative direction.

For example, in a case where the recognition unit 151 recognizes that the user who is in contact with the autonomous mobile body 11 frequently strokes, a time required for the internal state to transit in the positive direction is shortened. For example, in a case where the recognition unit 151 cannot recognize the user who strokes, the time required for the internal state to transit in the positive direction becomes long.

Figure 15:
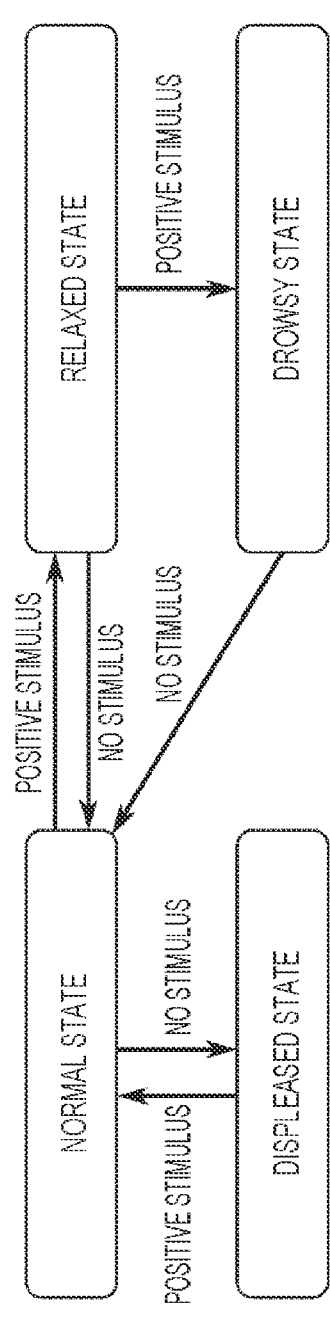
FIG. 15 is a diagram illustrating an example of a transition diagram of an internal state of the autonomous mobile body.

Note that, FIG. 15 illustrates an example of the internal state and the state transition, and can be changed. For example, it is possible to increase or decrease the number of types of the internal state, or change the condition or a transition destination of the state transition. For example, the internal state may transit on the basis of a negative stimulus from the user.

<Processing of Autonomous Mobile Body 11> Next, processing of the autonomous mobile body 11 will be described with reference to FIGS. 16, 17, 18, 19, 20, 21, 22A, 22B, 23A, 23B, 24A, 24B, 25, 26, 27, 28A, 28B, 29, 30, 31, 32, 33, 34, and 35.

<Touch Reaction Sound Control Processing>

First, touch reaction sound control processing executed by the autonomous mobile body 11 will be described with reference to a flowchart in FIG. 16.

The touch reaction sound is a type of stimulus reaction sound, and is audio output in response to the touch on the autonomous mobile body 11 or audio that changes in response to the touch on the autonomous mobile body 11. Here, an example in which the cry and talk in sleep are used as the touch reaction sounds will be described.

This processing is started, for example, when the autonomous mobile body 11 is powered on, and ends when the autonomous mobile body 11 is powered off.

At step S1, the audio output control unit 171 sets a non-reaction mode. That is, the audio output control unit 171 sets the sound production mode of the audio processing unit 172 to the non-reaction mode as the initial mode.

At step S2, the audio output control unit 171 determines whether or not a condition for entering a mode of crying when being stroked is satisfied. For example, in a case where the internal state of the autonomous mobile body 11 is the relaxed state, the audio output control unit 171 determines that the condition for entering the mode of crying when being stroked is satisfied, and the processing proceeds to step S3.

At step S3, the autonomous mobile body 11 enters the mode of crying when being stroked. Specifically, the audio output control unit 171 sets the sound production mode of the audio processing unit 172 to the mode of crying when being stroked. Therefore, the sound production mode transits from the non-reaction mode to the mode of crying when being stroked.

Note that, the autonomous mobile body 11 does not output the audio representing the state or feeling other than the cry in a case of responding to the touch while the sound production mode is set to the mode of crying when being stroked. Note that, the operation sound and the performance sound can be output.

At step S4, the autonomous mobile body 11 executes cry control processing. Although the cry control processing will be described later in detail, by this processing, the autonomous mobile body 11 outputs the cry in response to the touch.

At step S5, the audio output control unit 171 determines whether or not a condition for exiting from the mode of crying when being stroked is satisfied. In a case where it is determined that the condition for exiting from the mode of crying when being stroked is not satisfied, the processing returns to step S4.

Thereafter, processing at steps S4 and S5 is repeatedly executed until it is determined at step S5 that the condition of exiting from the mode of crying when being stroked is satisfied. During this time, the autonomous mobile body 11 outputs the cry in response to the touch.

For example, in a case where the internal state of the autonomous mobile body 11 is other than the relaxed state at step S5, the audio output control unit 171 determines that the condition for exiting from the mode of crying when being stroked is satisfied, and the processing proceeds to step S6.

At step S6, the autonomous mobile body 11 enters the mode of crying when being stroked. Specifically, the audio output control unit 171 sets the sound production mode of the audio processing unit 172 to a non-reaction mode. Therefore, the sound production mode transits from the mode of crying to the non-reaction mode.

Thereafter, the processing proceeds to step S7.

In contrast, in a case where it is determined at step S2 that the condition for entering the mode of crying when being stroked is not satisfied, processing at steps S3 to S6 is skipped, and the processing proceeds to step S7.

At step S7, the audio output control unit 171 determines whether or not a condition for entering a talk in sleep mode is satisfied. For example, in a case where the internal state of the autonomous mobile body 11 is the drowsy state, the audio output control unit 171 determines that the condition for entering the talk in sleep mode is satisfied, and the processing proceeds to step S8.

At step S8, the autonomous mobile body 11 enters the talk in sleep mode. Specifically, the audio output control unit 171 sets the sound production mode of the audio processing unit 172 to the talk in sleep mode. Therefore, the sound production mode transits from the non-reaction mode to the talk in sleep mode.

Note that, the autonomous mobile body 11 does not output the audio expressing the state or feeling other than the talk in sleep while the sound production mode is set to the talk in sleep mode. Note that, the operation sound and the performance sound can be output.

At step S9, the autonomous mobile body 11 executes talk in sleep control processing. Although the talk in sleep control processing will be described later in detail, by this processing, the autonomous mobile body 11 outputs the talk in sleep. Furthermore, after the autonomous mobile body 11 outputs the talk in sleep, the sound production mode transits from the talk in sleep mode to the non-reaction mode.

Thereafter, the processing returns to step S2, and processing at step S2 and subsequent steps is executed.

In contrast, at step S7, for example, in a case where the internal state of the autonomous mobile body 11 is other than the drowsy state, the audio output control unit 171 determines that the condition for entering the talk in sleep mode is not satisfied, the processing returns to step S2, and the processing at step S2 and subsequent steps is executed.

<First Embodiment of Cry Control Processing>

Figure 16:
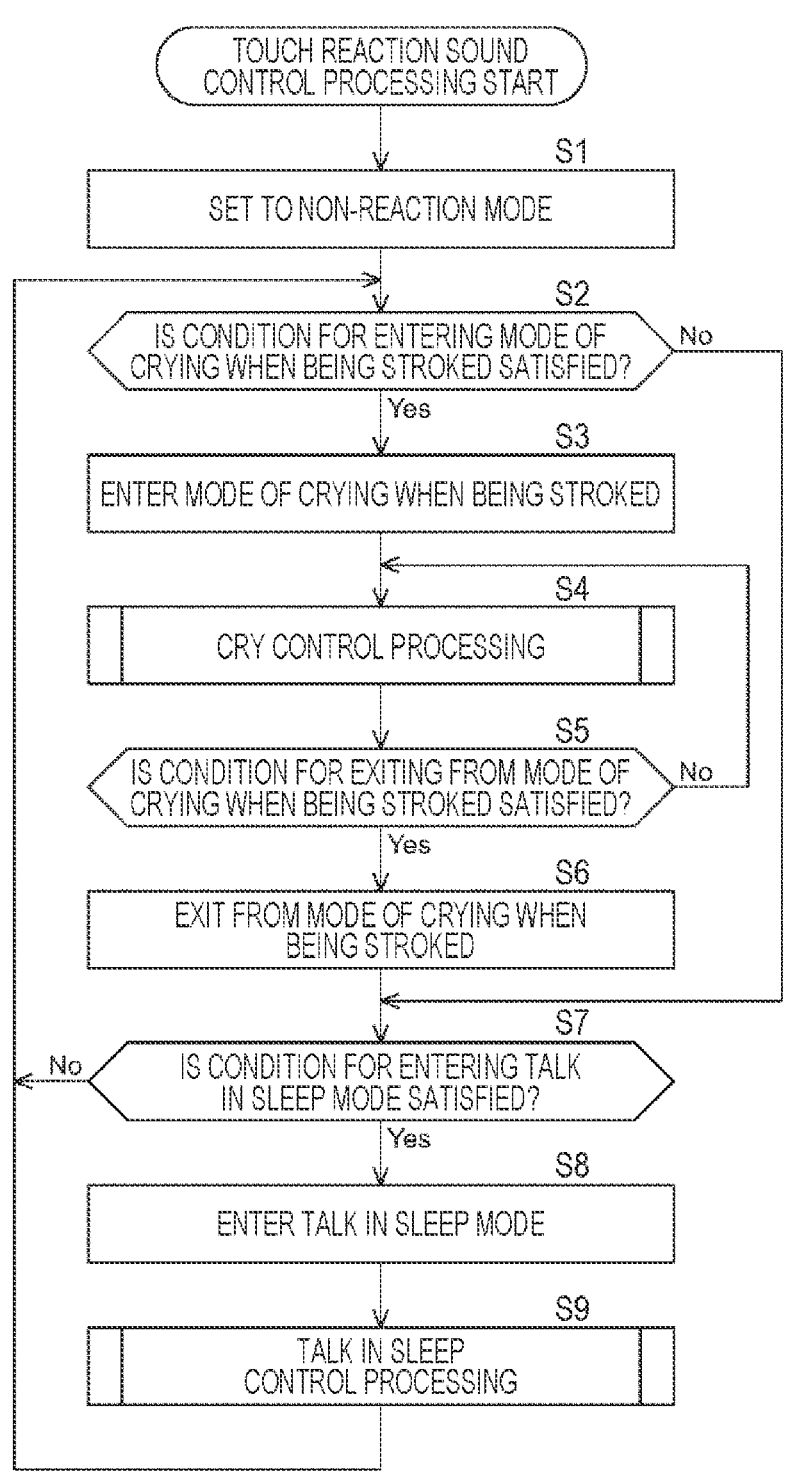
FIG. 16 is a flowchart for explaining touch reaction sound control processing.

Next, a first embodiment of the cry control processing at step S4 in FIG. 16 is described with reference to a flowchart in FIG. 17.

At step S21, the audio output control unit 171 determines whether or not the touch of a predetermined or larger touch amount is detected on the basis of the situation data from the recognition unit 151. In a case where it is determined that the touch of the predetermined or larger touch amount is detected, the processing proceeds to step S22.

At step S22, the audio output control unit 171 determines whether or not a time equal to or longer than a shortest output interval elapses from the previous output of the cry. In a case where the elapsed time from the time point at which the output of the previous cry ends is equal to or longer than the shortest output interval, which is a predetermined threshold, the audio output control unit 171 determines that the time equal to or longer than the shortest output interval elapses from the previous output of the cry, and the processing proceeds to step S23.

Note that, the shortest output interval may be either a fixed value or a variable value. In a case where the shortest output interval is the variable value, for example, the shortest output interval varies substantially randomly within a predetermined time range. Therefore, the interval of outputting the cry in a case where the autonomous mobile body 11 is touched varies randomly, and a reaction closer to that of a real dog is implemented.

At step S23, the autonomous mobile body 11 outputs the cry in accordance with a touch state.

Specifically, the audio output control unit 171 instructs the audio processing unit 172 to generate the cry.

The audio processing unit 172 recognizes the touch state (for example, the touch amount, the touch position and the like) on the basis of the situation data from the recognition unit 151. The audio processing unit 172 calculates the audio parameter of the output cry on the basis of the touch state. The audio processing unit 172 generates the audio data corresponding to the cry on the basis of the calculated audio parameter.

The audio output control unit 171 supplies the audio data generated by the audio processing unit 172 to the output unit 105.

The output unit 105 outputs the cry on the basis of the audio data. At that time, the operation control unit 162 may control the drive unit 104 to move the mouth and body of the autonomous mobile body 11 in accordance with the output of the cry.

Note that, in a case where the state of the autonomous mobile body 11 is not a state suitable for outputting the cry, it is also possible that the cry is not output. As a case where it is not the state suitable for outputting the cry, for example, a case where a predetermined behavior such as walking or eating is being executed, a case where audio other than the cry (for example, a conversation sound and the like) is being output, a state in which the mouth cannot be physically opened because the mouth is pressed and the like are assumed. Note that, for example, in a case where audio that can be output simultaneously with the cry such as the operation sound or performance sound is output, it is not determined that the state is not suitable for outputting the cry.

Thereafter, the cry control processing ends.

Here, with reference to FIGS. 18 and 19, an example of a relationship between the manner of touching and the output cry will be described.

Figure 18:
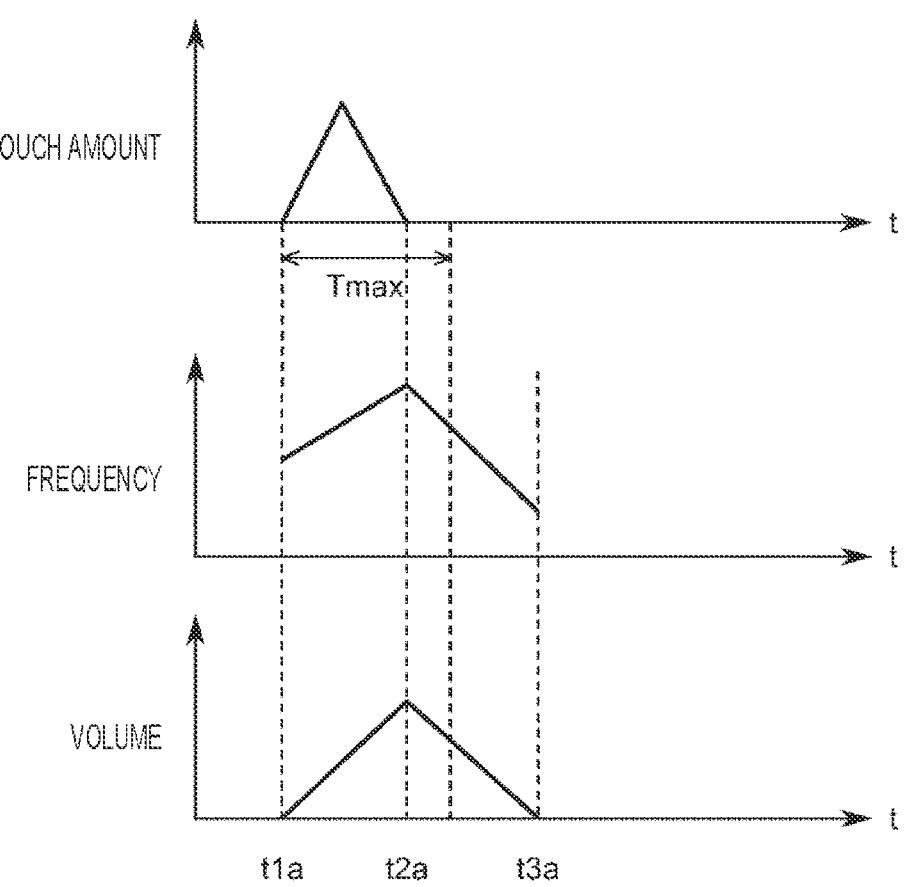
FIG. 18 is a diagram for explaining an example of a relationship between a manner of touching and an output cry.
Figure 19:
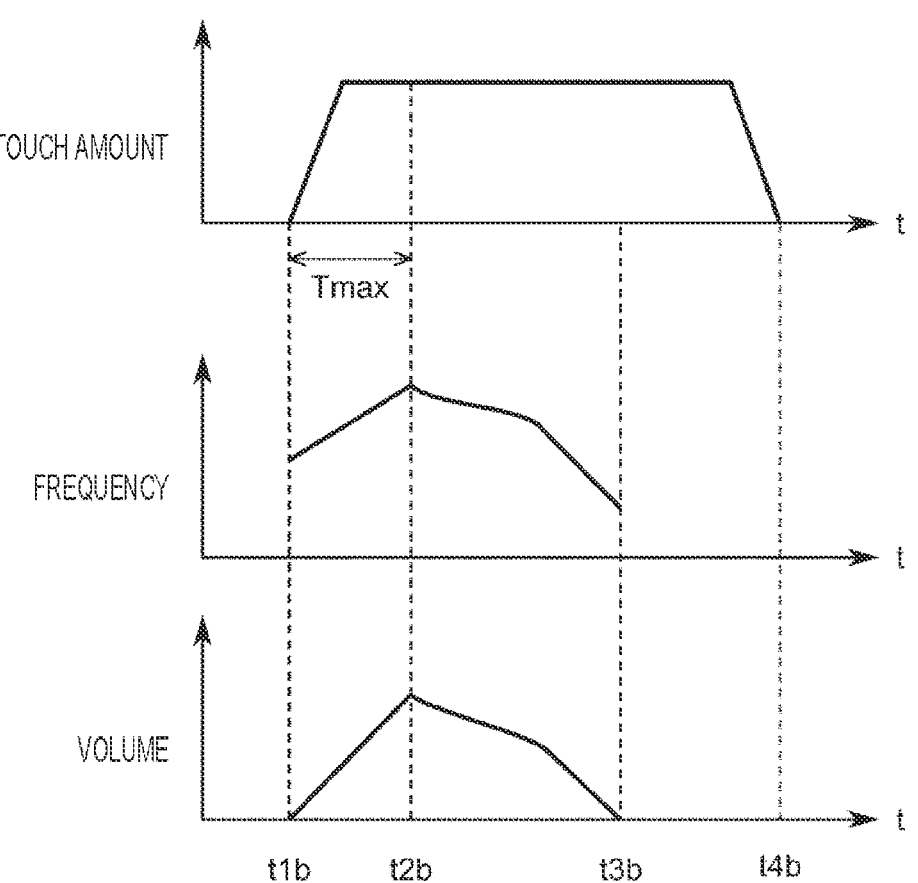
FIG. 19 is a diagram for explaining an example of a relationship between a manner of touching and an output cry.

FIGS. 18 and 19 illustrate a relationship between the touch amount and the frequency and volume of the output cry.

FIG. 18 illustrates an example of the cry in a case where the duration of the touch is equal to or shorter than a longest cry reaction time Tmax.

For example, at time t1a at which the touch is started, the output of the cry is started, the frequency and volume of the cry gradually increase until time t2a at which the touch ends, and become maximum at time t2a. Maximum values of the frequency and volume of the cry change according to the touch amount. After the touch ends at time t2a, the frequency and volume of the cry attenuate, and the output of the cry ends at time t3a.

In this manner, while being touched, the autonomous mobile body 11 continuously outputs the cry and changes the frequency and volume of the cry according to the touch amount. Furthermore, the autonomous mobile body 11 fades out the cry after the touch ends. Therefore, a natural cry corresponding to the touch is implemented.

FIG. 19 illustrates an example of the cry in a case where the duration of the touch is longer than the longest cry reaction time Tmax.

For example, at time t1b at which the touch is started, the output of the cry is started, the frequency and volume of the cry gradually increase until time t2b at which the longest cry reaction time Tmax elapses, and become maximum at time t2b. Maximum values of the frequency and volume of the cry change according to the touch amount. After time t2b, regardless of the touch amount, the frequency and volume of the cry attenuate, and the output of the cry ends at time t3b before time t4b at which the touch ends.

Therefore, it is prevented that the cry is unnaturally continuously output in a case where it is touched for a long time, and a more natural cry is implemented.

Note that, the longest cry reaction time Tmax may be either a fixed value or a variable value. In a case where the longest cry reaction time Tmax is the variable value, for example, the longest cry reaction time Tmax varies substantially randomly within a predetermined time range. Therefore, the time in which the autonomous mobile body 11 outputs the cry for the touch for a long time varies randomly, and a reaction closer to that of a real dog is implemented.

Returning to FIG. 17, in contrast, in a case where it is determined at step S22 that the time equal to or longer than the shortest output interval does not elapse from the previous output of the cry, the processing at step S23 is skipped, and the cry control processing ends. That is, in a case where the time equal to or longer than the shortest output interval does not elapse from the previous output of the cry, the cry is not output even if the touch of the predetermined touch amount or more is detected.

Therefore, for example, in a case where the touch is repeatedly performed at a short interval or in a case where the touch is continuously performed for a long time, repeated output of the cry at a short interval is prevented, and a more natural cry is implemented.

Furthermore, in a case where it is determined at step S21 that the touch of a predetermined touch amount or larger is not detected, the processing at steps S22 to S23 is skipped, and the cry control processing ends. That is, in a case where the touch of a predetermined touch amount or more is not detected, no cry is output.

<Second Embodiment of Cry Control Processing>

Figure 20:
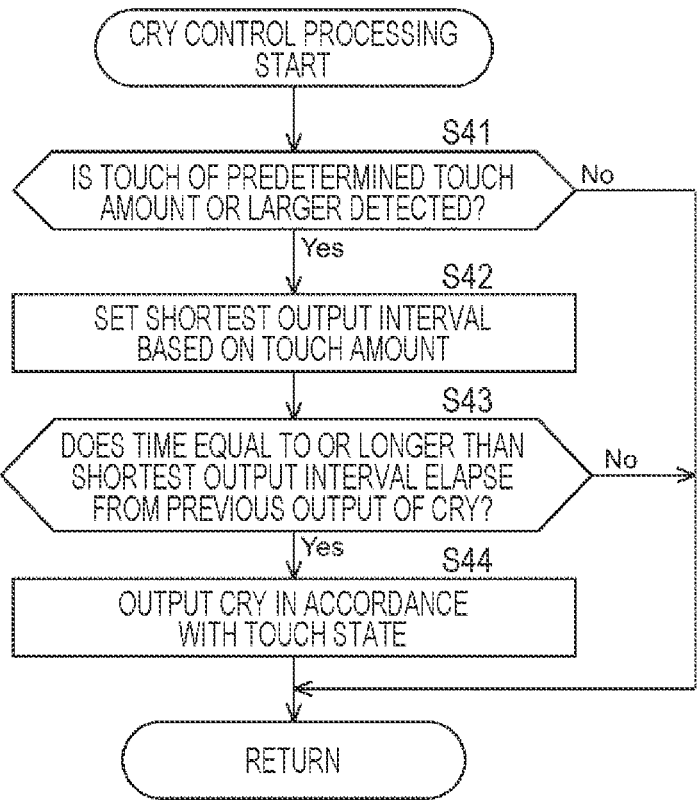
FIG. 20 is a flowchart for explaining a second embodiment of cry control processing.

Next, a second embodiment of the cry control processing at step S4 in FIG. 16 is described with reference to a flowchart in FIG. 20.

Figure 17:
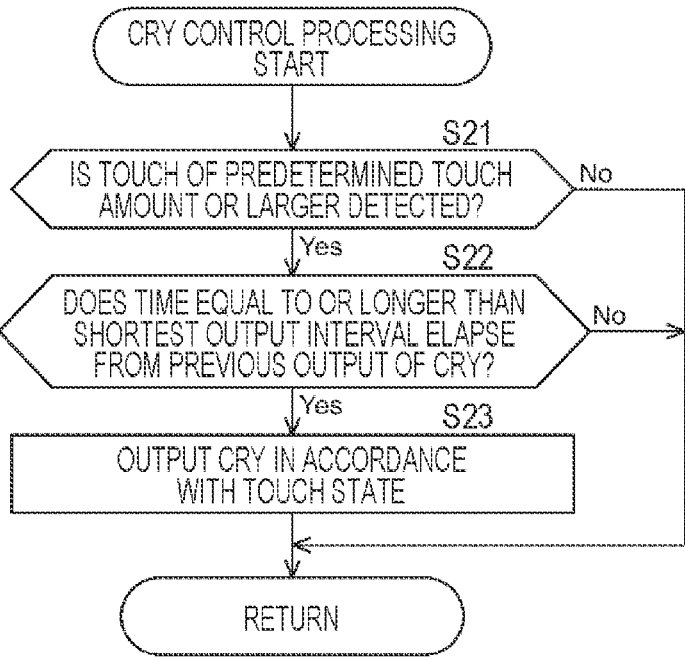
FIG. 17 is a flowchart for explaining a first embodiment of cry control processing.

At step S41, it is determined whether or not a touch of a predetermined touch amount or larger is detected, similarly to the processing at step S21 in FIG. 17. In a case where it is determined that the touch of the predetermined touch amount or larger is detected, the processing proceeds to step S42.

At step S42, the audio output control unit 171 sets the shortest output interval on the basis of the touch amount. For example, in a case where the touch amount is smaller than a predetermined threshold, the audio output control unit 171 sets the shortest output interval to a predetermined time. In contrast, in a case where the touch amount is equal to or larger than a predetermined threshold, for example, the audio output control unit 171 sets the shortest output interval to be shorter than a predetermined time. For example, the audio output control unit 171 shortens the shortest output interval as the touch amount increases.

At step S43, similarly to the processing at step S22 in FIG. 17, it is determined whether or not a time equal to or longer than the shortest output interval elapses from the previous output of the cry. In a case where it is determined that the time equal to or longer than the shortest output interval elapses from the previous output of the cry, the processing proceeds to step S44.

At step S44, similarly to the processing at step S23 in FIG. 17, the cry is output in accordance with the touch state.

In contrast, in a case where it is determined at step S43 that the time equal to or longer than the shortest output interval does not elapse from the previous output of the cry, the processing at step S44 is skipped, and the cry control processing ends.

Furthermore, in a case where it is determined at step S41 that the touch of a predetermined touch amount or larger is not detected, the processing at steps S42 to S44 is skipped, and the cry control processing ends.

In this manner, the output interval of the cry changes on the basis of the touch amount. For example, in a case where the autonomous mobile body 11 is strongly touched or strongly stroked, this outputs the cry at short intervals. Therefore, a more natural reaction to the touch is implemented.

<Third Embodiment of Cry Control Processing>

Figure 21:
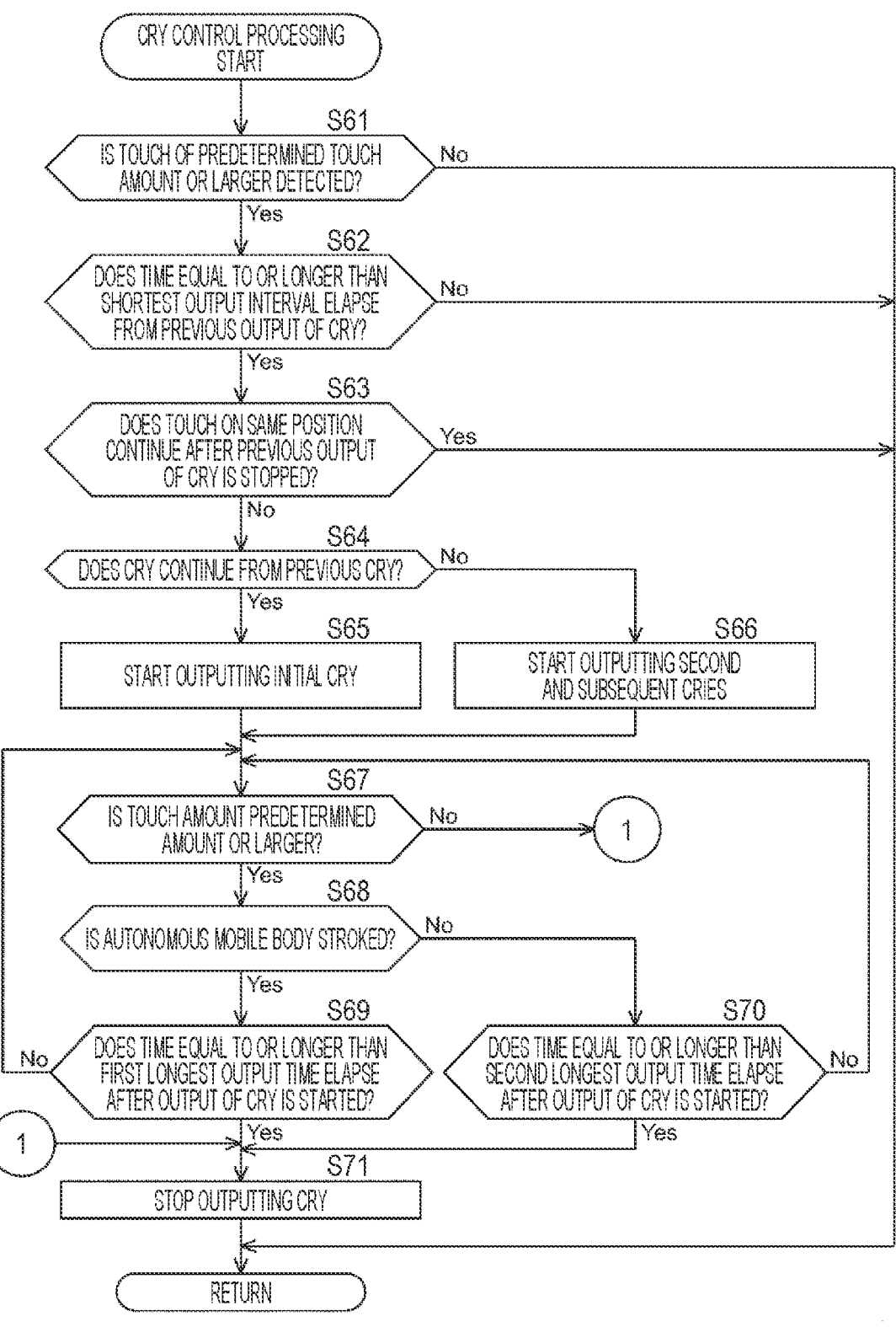
FIG. 21 is a flowchart for explaining a third embodiment of cry control processing.

Next, a third embodiment of the cry control processing at step S4 in FIG. 16 is described with reference to a flowchart in FIG. 21.

At step S61, it is determined whether or not a touch of a predetermined touch amount or larger is detected, similarly to the processing at step S21 in FIG. 17. In a case where it is determined that the touch of the predetermined touch amount or larger is detected, the processing proceeds to step S62.

At step S62, similarly to the processing at step S22 in FIG. 17, it is determined whether or not a time equal to or longer than the shortest output interval elapses from the previous output of the cry. In a case where it is determined that the time equal to or longer than the shortest output interval elapses from the previous output of the cry, the processing proceeds to step S63.

At step S63, the audio output control unit 171 determines whether or not the touch on the same position continues after the previous output of the cry is stopped. For example, the audio output control unit 171 recognizes the position of the touch on the basis of the situation data from the recognition unit 151, and detects a moved amount of the touch position after the previous output of the cry is stopped on the basis of the recognized touch position. In a case where the detected moved amount of the touch position is equal to or larger than a predetermined threshold, the audio output control unit 171 determines that the touch on the same position does not continue after the previous output of the cry is stopped, and the processing proceeds to step S64. This also includes a case where there is a period in which no touch is detected after the previous output of the cry is stopped.

At step S64, the audio output control unit 171 determines whether or not the cry continues from the previous cry. For example, in a case where a time equal to or longer than a continuation determination threshold elapses from a time point at which the previous output of the cry ends, the audio output control unit 171 determines that the cry does not continue from the previous cry, and the processing proceeds to step S65.

Note that, the continuation determination threshold is set to a time longer than the shortest output interval.

At step S65, the autonomous mobile body 11 starts outputting an initial cry. The initial cry is a non-continuous single cry or a first cry of continuous cries.

Specifically, the audio output control unit 171 instructs the audio processing unit 172 to generate the initial cry.

The audio processing unit 172 starts generating the audio data corresponding to the initial cry. Specifically, the audio processing unit 172 recognizes the touch state on the basis of the situation data from the recognition unit 151, and calculates the audio parameter of the cry to be output on the basis of the touch state. The audio processing unit 172 generates the audio data corresponding to the cry on the basis of the calculated audio parameter.

The audio output control unit 171 starts supplying the audio data generated by the audio processing unit 172 to the output unit 105.

The output unit 105 starts outputting the cry on the basis of the audio data.

Thereafter, the processing proceeds to step S67.

In contrast, at step S64, for example, in a case where a time equal to or longer than the continuation determination threshold does not elapse from a time point at which the output of the previous cry ends, the audio output control unit 171 determines that the cry continues from the previous cry, and the processing proceeds to step S66.

Note that, in a case where three or more cries including the current cry are output at intervals shorter than the continuation determination threshold, it is determined that the three or more cries are continuous.

At step S66, the autonomous mobile body 11 starts outputting second and subsequent cries.

Specifically, the audio output control unit 171 instructs the audio processing unit 172 to generate the second and subsequent cries. Here, the second and subsequent cries are cries output second or subsequently out of the cries determined to be continuous.

The audio processing unit 172 starts generating the audio data. Specifically, the audio processing unit 172 recognizes the touch state on the basis of the situation data from the recognition unit 151, and calculates the audio parameter of the cry to be output on the basis of the touch state. At that time, for example, the audio processing unit 172 sets the velocity to a value lower than that of the first cry. The audio processing unit 172 generates the audio data corresponding to the cry on the basis of the calculated audio parameter.

The audio output control unit 171 starts supplying the audio data generated by the audio processing unit 172 to the output unit 105.

The output unit 105 starts outputting the cry on the basis of the audio data.

Therefore, a cry with an attack suppressed more than the first cry out of the continuous cries is output.

Thereafter, the processing proceeds to step S67.

At step S67, the audio output control unit 171 determines whether or not the touch amount is a certain amount or larger on the basis of the situation data from the recognition unit 151. In a case where it is determined that the touch amount is a certain amount or larger, the processing proceeds to step S68.

At step S68, the audio output control unit 171 determines whether or not the autonomous mobile body 11 is stroked on the basis of the situation data from the recognition unit 151. In a case where it is determined that the autonomous mobile body 11 is stroked, the processing proceeds to step S69.

At step S69, the audio output control unit 171 determines whether or not a time equal to or longer than a first longest output time elapses after the output of the cry is started. In a case where it is determined that the time equal to or longer than the first longest output time does not elapse after the output of the cry is started, the processing returns to step S67.

Thereafter, the processing at steps S67 to S70 is repeatedly executed until it is determined at step S67 that the touch amount is not equal to or larger than a certain amount, it is determined at step S69 that the time equal to or longer than the first longest output time elapses after the output of the cry is started, or it is determined at step S70 that a time equal to or longer than a second longest output time elapses after the output of the cry is started.

In contrast, in a case where it is determined at step S68 that the autonomous mobile body 11 is not stroked, for example, in a case where the touch position is fixed without moving, the processing proceeds to step S70.

At step S70, the audio output control unit 171 determines whether or not the time equal to or longer than the second longest output time elapses after the output of the cry is started. The second longest output time is set to a time shorter than the first longest output time at step S69. In a case where it is determined that the time equal to or longer than the second longest output time does not elapse after the output of the cry is started, the processing returns to step S67.

Thereafter, the processing at steps S67 to S70 is repeatedly executed until it is determined at step S67 that the touch amount is not equal to or larger than a certain amount, it is determined at step S69 that the time equal to or longer than the first longest output time elapses after the output of the cry is started, or it is determined at step S70 that a time equal to or longer than a second longest output time elapses after the output of the cry is started.

In contrast, at step S70, in a case where it is determined that the time equal to or longer than the second longest output time elapses after the output of the cry is started, the processing proceeds to step S71. This is, for example, a case where the same position is touched continuously for the second longest time or longer.

Furthermore, at step S69, in a case where it is determined that the time equal to or longer than the first longest output time elapses after the output of the cry is started, the processing proceeds to step S71. This is, for example, a case where it is continuously stroked for the first longest time or longer.

Moreover, in a case where it is determined that the touch amount is smaller than a certain amount at step S67, the processing proceeds to step S71. This is, for example, a case where the touch on the autonomous mobile body 11 ends.

At step S71, the autonomous mobile body 11 stops outputting the cry. Specifically, the audio output control unit 171 stops supplying the audio data to the output unit 105. Furthermore, the audio output control unit 171 instructs the audio processing unit 172 to stop generating the cry. The audio processing unit 172 stops generating the audio data.

Thereafter, the cry control processing ends.

In contrast, at step S630, in a case where the detected moved amount of the touch position is smaller than a predetermined threshold, the audio output control unit 171 determines that the touch on the same position continues after the previous output of the cry is stopped, the processing at steps S64 to S71 is skipped, and the cry control processing ends.

Furthermore, in a case where it is determined at step S62 that the time equal to or longer than the shortest output interval does not elapse from the previous output of the cry, the processing at steps S63 to S71 is skipped, and the cry control processing ends.

Moreover, in a case where it is determined at step S61 that the touch of a predetermined touch amount or larger is not detected, the processing at steps S62 to S71 is skipped, and the cry control processing ends.

Here, an example of the cry output in the third embodiment of the cry control processing is described with reference to FIGS. 22A, 22B, 23A, 23B, 24A, and 24B. FIGS. 22B, 23B, and 24B illustrate time-series transition of the touch amount, the touch position in a front-rear direction on the back of the autonomous mobile body 11, and the velocity and pitch of the cry.

Figure 22A:
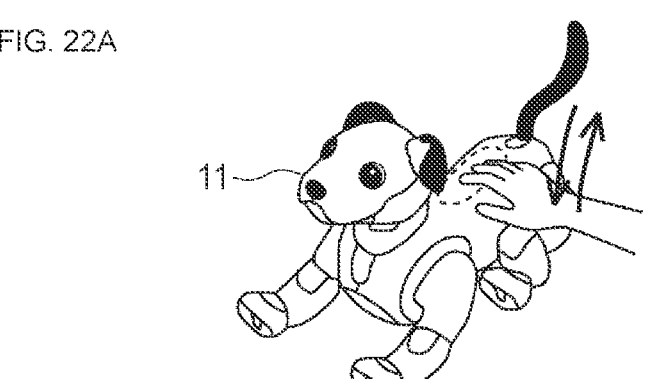
FIGS. 22A and 22B are diagrams illustrating an example of an audio parameter of a cry in a case where an operation of touching the back or separating the hand from the back of the autonomous mobile body is repeated at short intervals.
Figure 22B:
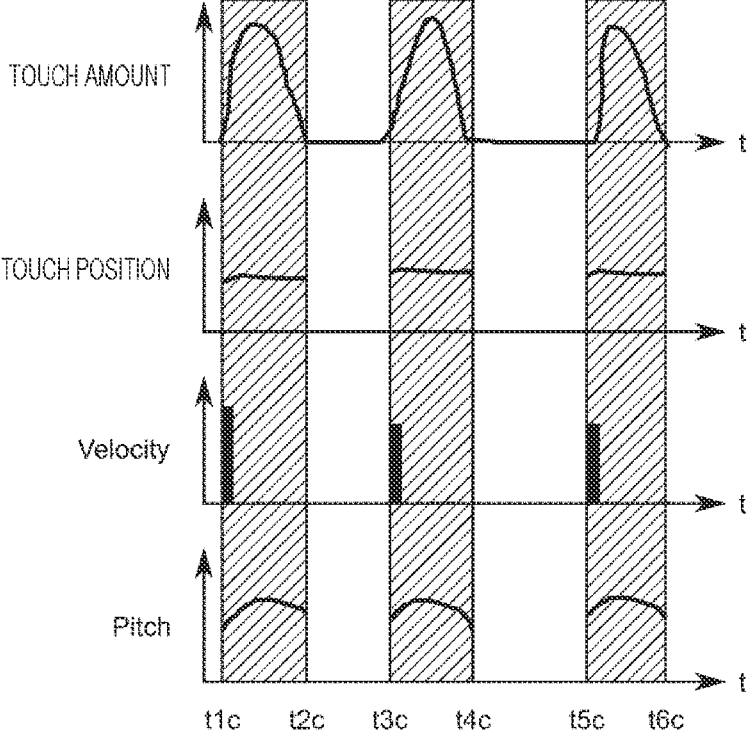

FIGS. 22A and 22B illustrate an example of the cry in a case where the user repeats an operation of touching the back or separating the hand from the back of the autonomous mobile body 11 at short intervals as illustrated in FIG. 22A.

Specifically, a first touch is performed between time t1c and time t2c, a second touch is performed between time t3c and time t4c, and a third touch is performed between time t5c and time toc. The touch amount and the touch position of the first to third touches are substantially similar.

For example, in a case where an interval between time t2c and time t3c and an interval between time t4c and time t5c are shorter than the continuation determination threshold, it is determined that the first to third cries are continuous.

In this case, for example, the velocity of the second and third cries is made lower than the velocity of the first cry. Furthermore, the pitches of the first to third cries are set to be substantially similarly. As a result, the attacks of the second and subsequent cries are suppressed more than the attack of the first cry. That is, a change in volume and pitch of a start portion of the second and subsequent cries becomes gentle as compared with that of the first cry.

Therefore, for example, the user feels that the second and subsequent cries are less aggressive than the first cry. Furthermore, the user has an impression that the first to third cries are continuous and are temporarily interrupted by breathing, and can feel the cries of the autonomous mobile body 11 natural.

Figure 23A:
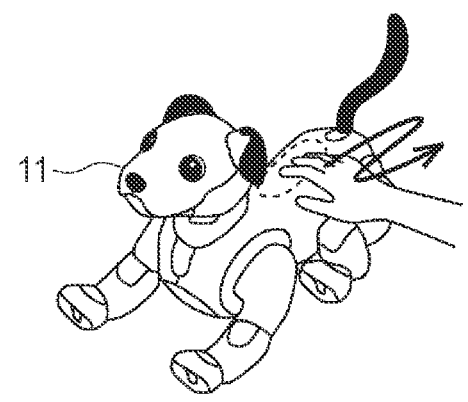
FIGS. 23A and 23B are diagrams illustrating an example of the audio parameter of the cry in a case where the hand is moved back and forth on the back of the autonomous mobile body to stroke.
Figure 23B:
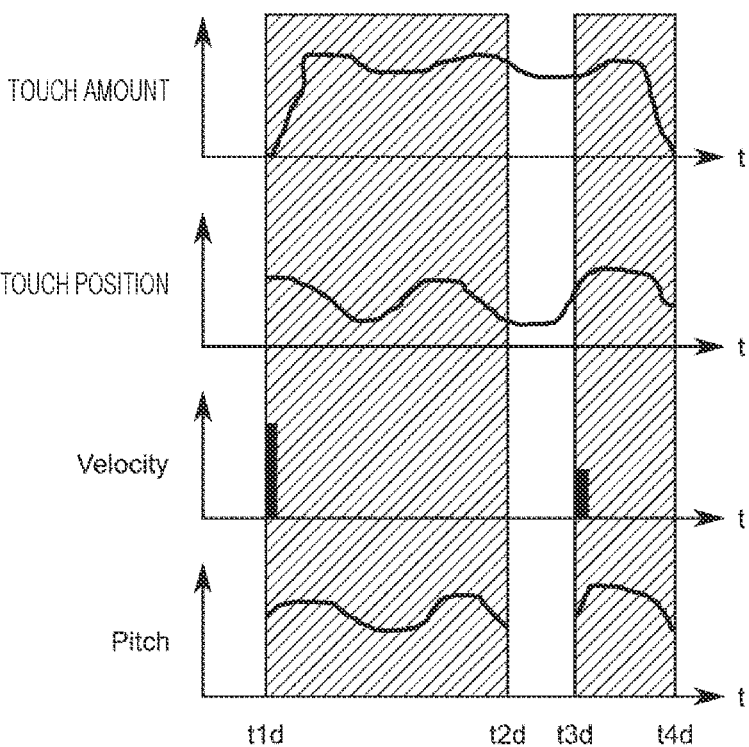

FIGS. 23A and 23B illustrate an example of the cry in a case where the user moves the hand in the front-rear direction to stroke on the back of the autonomous mobile body 11 as illustrated in FIG. 23A.

Specifically, the touch is continuously performed from time t1d to time t4d. The touch amount during that time is substantially similar except at the start and end, and the touch position moves back and forth.

In this case, for example, the first cry is output from time t1d to time t2d at which the first longest output time elapses, and the output of the first cry stops at time t2d. Next, at time t3d at which the shortest output interval elapses after time t2d, the output of the second cry is started, and at time t4d, the output of the second cry stops.

In this case, for example, the velocity of the second cry is made lower than the velocity of the first cry. As a result, the attack of the second cry is suppressed more than the attack of the first cry. Furthermore, in the first and second cries, the pitch of the cries changes according to the touch position.

Therefore, even when the back of the autonomous mobile body 11 is continuously stroked, the cry is not output unnaturally long, and a short pause is provided. Furthermore, the user has an impression that the first and second cries are continuous and are temporarily interrupted by breathing, and can feel the cries of the autonomous mobile body 11 natural.

Figure 24A:
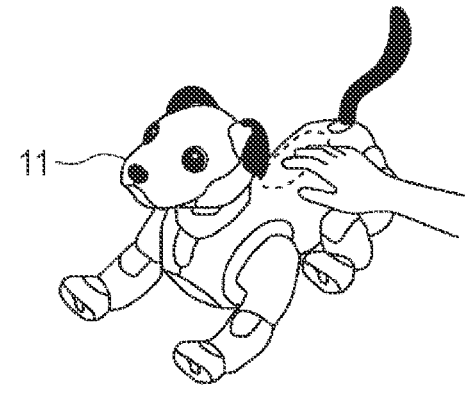
FIGS. 24A and 24B are diagrams illustrating an example of the audio parameter of the cry in a case where the hand is continuously put on the back of the autonomous mobile body without being moved.
Figure 24B:
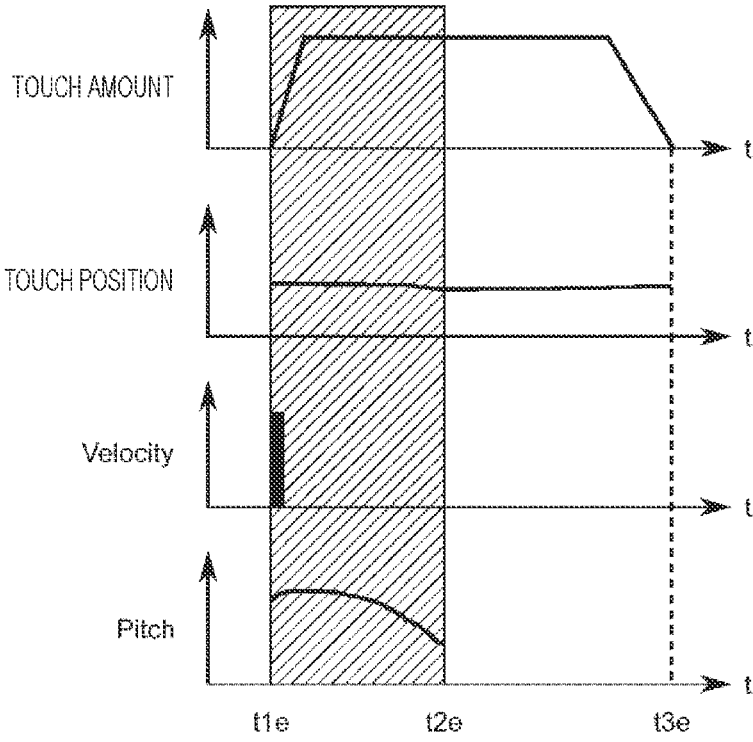

FIGS. 24A and 24B illustrate an example of the cry in a case where the user continuously puts the hand without moving on the back of the autonomous mobile body 11 as illustrated in FIG. 24A.

Specifically, the touch is continuously performed from time t1e to time t3e. The touch amount during that time is substantially similar except at the start and end of the touch. Furthermore, the touch positions during that time are substantially similar.

In this case, for example, the cry is output from time t1e to time t2e at which the second longest output time elapses, and the output of the cry stops after time t2e.

Therefore, in a case where the touch position does not move, the output time of the cry is shortened as compared with a case where the touch position moves (stroked). In other words, in a case where the touch position moves (stroked), the output time of the cry becomes longer than that in a case where the touch position does not move.

Therefore, even when the hand is continuously put on the back of the autonomous mobile body 11, the cry is not output unnaturally long, and the cry stops. Furthermore, since the hand is merely continuously put and the state (stimulus) of the touch does not change, the output of the cry is not resumed.

Note that, in the third embodiment of the cry control processing, as in the second embodiment, the shortest output interval may be changed on the basis of the touch amount.

<Fourth Embodiment of Cry Control Processing>

Next, a fourth embodiment of the cry control processing at step S4 in FIG. 16 is described with reference to a flowchart in FIG. 25.

At step S81, it is determined whether or not a touch of a predetermined touch amount or larger is detected, similarly to the processing at step S21 in FIG. 17. In a case where it is determined that the touch of the predetermined touch amount or larger is detected, the processing proceeds to step S82.

At step S82, similarly to the processing at step S22 in FIG. 17, it is determined whether or not a time equal to or longer than the shortest output interval elapses from the previous output of the cry. In a case where it is determined that the time equal to or longer than the shortest output interval elapses from the previous output of the cry, the processing proceeds to step S83.

At step S83, the recognition unit 151 executes reaction intensity detection processing. Although the reaction intensity detection processing will be described later in detail, a reaction intensity is detected on the basis of the touched position and the like by this processing.

At step S84, the autonomous mobile body 11 outputs the cry in accordance with the reaction intensity. For example, the autonomous mobile body 11 executes processing similar to the processing at step S23 in FIG. 17 using the reaction intensity instead of the touch amount. Therefore, for example, in FIGS. 18 and 19, the frequency and volume of the cry are controlled on the basis of the reaction intensity instead of the touch amount.

Thereafter, the cry control processing ends.

Furthermore, in a case where it is determined at step S82 that the time equal to or longer than the shortest output interval does not elapse from the previous output of the cry, the processing at steps S83 to S84 is skipped, and the cry control processing ends.

Furthermore, in a case where it is determined at step S81 that the touch of a predetermined touch amount or larger is not detected, the processing at steps S82 to S84 is skipped, and the cry control processing ends.

Note that, in the fourth embodiment of the cry control processing, as in the second embodiment, the shortest output interval may be changed on the basis of the touch amount.

<Reaction Intensity Detection Processing in Detail>

Figure 25:
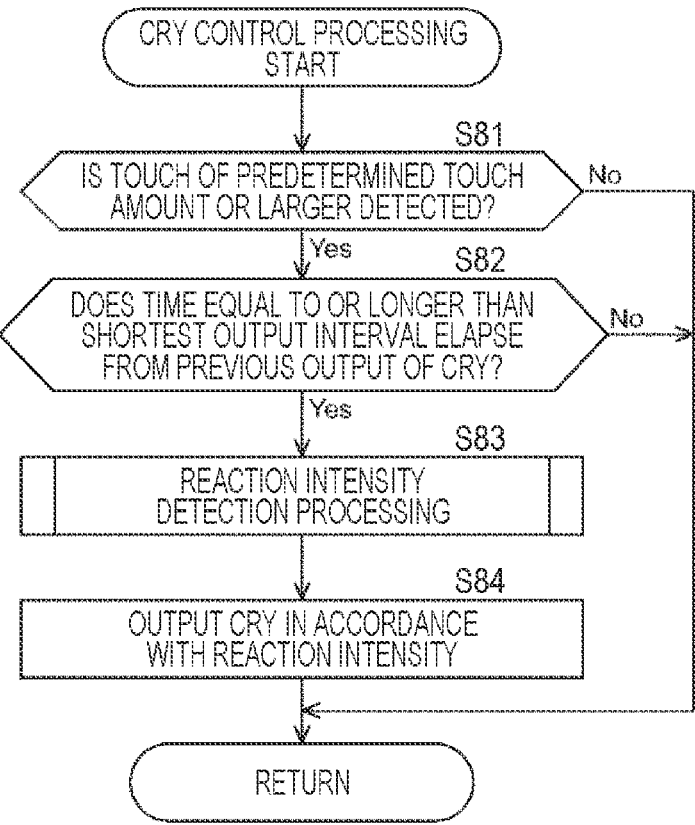
FIG. 25 is a flowchart for explaining a fourth embodiment of cry control processing.
Figure 26:
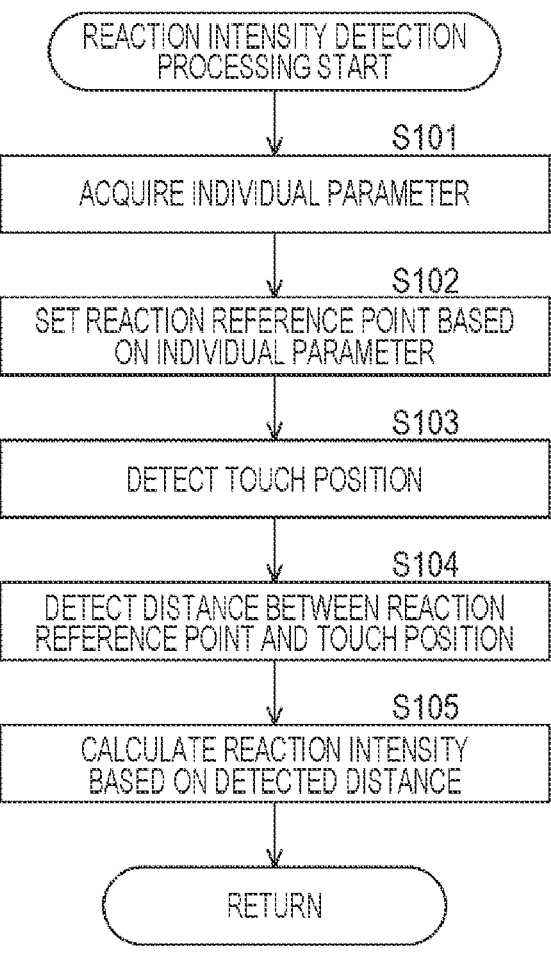
FIG. 26 is a flowchart for explaining reaction intensity detection processing in detail.

Next, the reaction intensity detection processing at step S83 in FIG. 25 is described in detail with reference to a flowchart in FIG. 26.

At step S101, the recognition unit 151 acquires an individual parameter. For example, the recognition unit 151 acquires the individual parameter regarding an individual of the autonomous mobile body 11 stored in the storage unit 106. Alternatively, for example, the recognition unit 151 receives the individual parameter of the autonomous mobile body 11 from the information processing terminal 12 or the information processing server 13.

Here, an example of the individual parameter is described.

For example, a parameter unique to each autonomous mobile body 11 is used as the individual parameter. For example, a product number and the like of the autonomous mobile body 11 is used as the individual parameter.

For example, a parameter indicating a feature of the autonomous mobile body 11 is used as the individual parameter. For example, a color of the autonomous mobile body 11, a type of a living body expressed by the autonomous mobile body 11, a type of a dog expressed by the autonomous mobile body 11 and the like are used as the individual parameter.

For example, a parameter indicating an attribute assigned by the user to the autonomous mobile body 11 is used as the individual parameter. For example, a name, a birthday and the like of the autonomous mobile body 11 is used as the individual parameter. For example, age based on the birthday of the autonomous mobile body 11 is used as the individual parameter.

At step S102, the recognition unit 151 sets a reaction reference point on the basis of the individual parameter. For example, the recognition unit 151 quantifies a character string representing the individual parameter using a hash function and the like, and sets the reaction reference point on the basis of an acquired numerical value.

The reaction reference point is a point serving as a reference for detecting the intensity of the reaction (reaction intensity) of the autonomous mobile body 11 to the touch. For example, the reaction intensity increases as the touch position approaches the reaction reference point, and the reaction intensity decreases as the touch position moves away from the reaction reference point. A reaction pattern of the autonomous mobile body 11 with respect to the touch is set by the reaction reference point.

Figure 27:
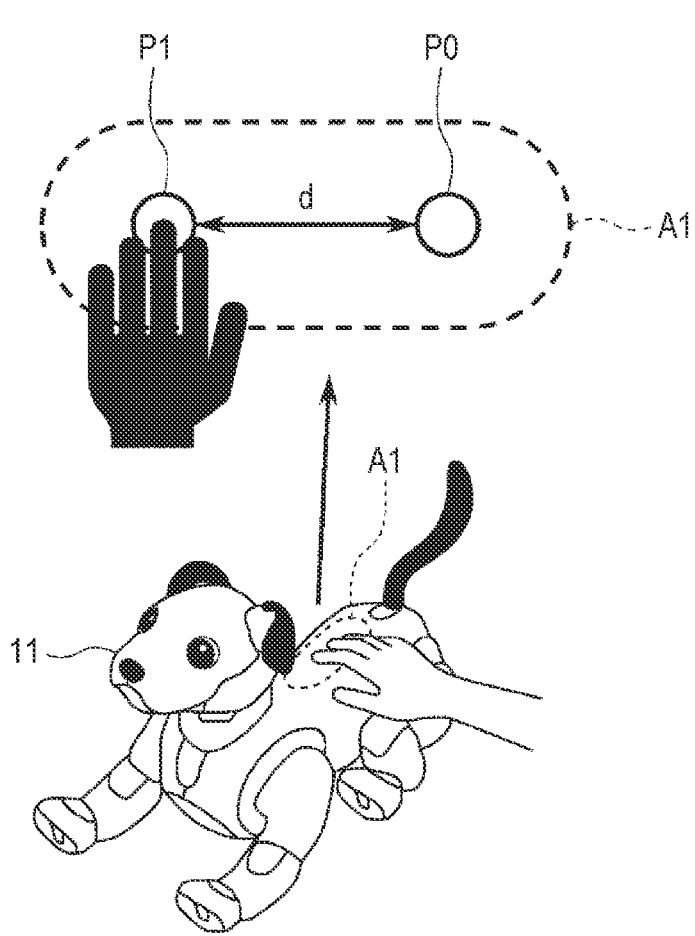
FIG. 27 is a view for explaining a method of detecting the reaction intensity.

For example, as illustrated in FIG. 27, a reaction reference point P0 is set in a reaction area A1 of the autonomous mobile body 11 on the basis of the individual parameter. The reaction area A1 is, for example, a range in which the touch sensor 57 provided on the back of the autonomous mobile body 11 can react (a range in which the touch can be detected).

For example, in a case where the individual parameter is a parameter specific to the autonomous mobile body 11, the reaction reference point is set at a position specific to the autonomous mobile body 11. For example, in a case where the individual parameter is a parameter representing the feature or attribute of the autonomous mobile body 11, the reaction reference point is set at the same position in the autonomous mobile body 11 having the same feature or attribute.

At step S103, the recognition unit 151 detects the touch position on the basis of the sensor data from the touch sensor 57.

At step S104, the recognition unit 151 detects a distance between the reaction reference point and the touch position.

For example, as illustrated in FIG. 27, in a case where a touch position P1 is detected, a distance d between the reaction reference point P0 and the touch position P1 is detected.

At step S105, the recognition unit 151 calculates the reaction intensity on the basis of the detected distance.

For example, the recognition unit 151 normalizes the distance between the touch position and the reaction reference point within a range from 0 to 1 by dividing the distance d by a size of the reaction area A1 (for example, a radius of the reaction area A1). For example, the recognition unit 151 sets a reciprocal of the normalized distance as the reaction intensity. Alternatively, for example, the recognition unit 151 converts the distance d into the reaction intensity using a predetermined function.

Note that, the reaction intensity increases as the distance d decreases, and decreases as the distance d increases. That is, the reaction intensity increases as the touch position P1 is closer to the reaction reference point P0, and the reaction intensity decreases as the touch position P1 is farther from the reaction reference point P0.

The recognition unit 151 supplies situation data including the detected reaction intensity to the behavior control unit 153.

Thereafter, the reaction intensity detection processing ends.

Therefore, the reaction reference point is set at a different position for each autonomous mobile body 11 or each autonomous mobile body 11 having the same feature or attribute. Therefore, the reaction pattern changes for each autonomous mobile body 11 with respect to the similar touch. For example, for each autonomous mobile body 11, the characteristic and the output timing of the cry output for a similar touch change. Therefore, personality of each autonomous mobile body 11 is expressed, and the user can have more attachment to the autonomous mobile body 11.

Furthermore, since it is not necessary to prepare many types of audio data in order to express the personality of each autonomous mobile body 11, a manufacturing cost and a data amount of the audio data can be reduced.

Note that, in the above description, an example is described in which the reaction reference point is set on the back of the autonomous mobile body 11, but the reaction reference point can be set at any position where the touch can be detected on the surface of the autonomous mobile body 11.

Furthermore, the reaction reference point may be set at a different site (for example, the head, chin, abdomen, back and the like) for each autonomous mobile body 11 on the basis of the individual parameter of each autonomous mobile body 11.

<Variation of Fourth Embodiment of Cry Control Processing>

Here, a variation of the fourth embodiment of the cry control processing described above with reference to FIGS. 25 and 26 is described.

For example, the recognition unit 151 may set a strong reaction place on the basis of the reaction reference point. The strong reaction place is a place where the autonomous mobile body 11 reacts more strongly than other places. For example, the strong reaction place is divided into a favorite place where the autonomous mobile body 11 shows a stronger positive reaction than other places and a place where the autonomous mobile body 11 shows a stronger negative reaction than other places (hereinafter, referred to as a disliked place). The reaction pattern of the autonomous mobile body 11 with respect to the touch is set by the strong reaction place.

Furthermore, for example, the learning unit 152 may set the reaction pattern of the autonomous mobile body 11 to the touch by performing learning processing on the basis of the behavior history data and the like stored in the storage unit 106 and setting the strong reaction place.

Specifically, as described above, data indicating the recognition result or the estimation result of the situation by the recognition unit 151 is registered in the behavior history data. For example, on the basis of the behavior history data, the learning unit 152 detects a site stroked in the past, a position in the site, and a stroked time. Then, the learning unit 152 sets a site in which an amount stroked in the past is the largest as the favorite place. For example, in a case where the stroked amount of the head is the largest among the head, chin, abdomen, and back, the head is set as the favorite place.

Note that, as the stroked amount, for example, a cumulative value of the stroked time is used. Note that, a time in which the hand is merely put without moving is not included in the stroked time.

Furthermore, for example, the recognition unit 151 sets a place where the autonomous mobile body 11 is injured as the disliked place, thereby setting the reaction pattern of the autonomous mobile body 11 to the touch. Note that, a place where a physical malfunction occurs may be set as the disliked place, or a place where it is assumed that the injury occurs virtually may be set as the disliked place.

For example, the audio processing unit 172 changes the cry between a case where the strong reaction place is touched and a case where a place other than the strong reaction place is touched. Specifically, for example, in a case where the favorite place is touched, the audio processing unit 172 increases the pitch of the cry as compared with a case where the place other than the favorite place is touched.

Figures 28A, 28B, 29:
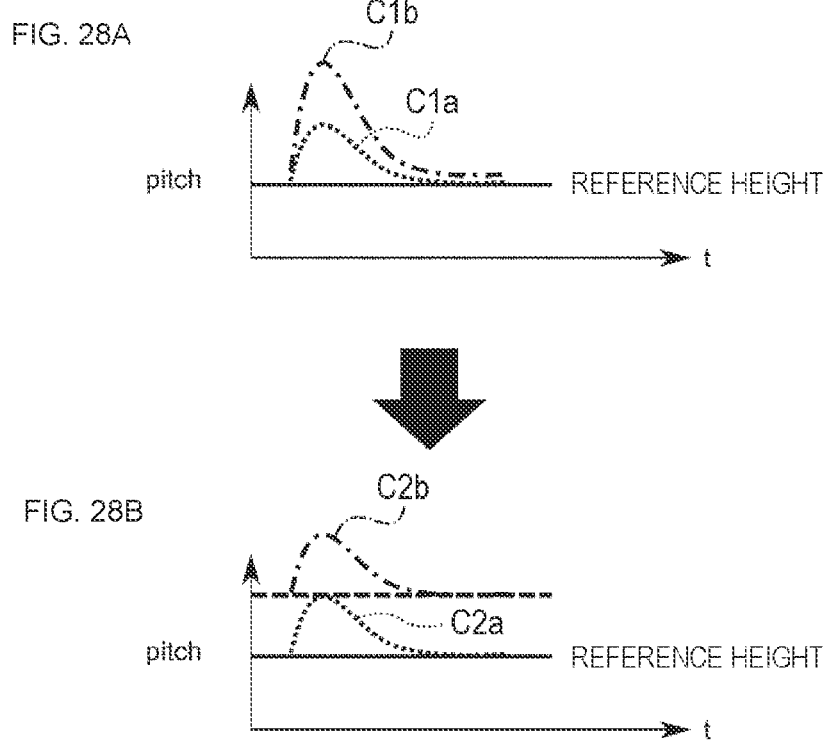

FIGS. 28A and 28B illustrate an example of a manner of increasing the pitch of the cry. Time is plotted along the abscissa and the pitch is plotted along the ordinate of a graph in FIGS. 28A and 28B. Dotted curve C1*a* in FIG. 28A indicates a characteristic of the pitch of the cry in a case where the place other than the favorite place is touched, and dashed-dotted curve C1*b* indicates a characteristic of the pitch of the cry in a case where the favorite place is touched. Dotted curve C2*a* in FIG. 28B indicates a characteristic of the pitch of the cry in a case where the place other than the favorite place is touched, and dashed-dotted curve C2*b* indicates a characteristic of the pitch of the cry in a case where the favorite place is touched.

In the example in FIG. 28A, the pitch is increased around a peak of a waveform of the pitch of the cry. In the example in FIG. 28B, an entire waveform of the pitch of the cry is increased. When the example in FIG. 28A is compared with the example in FIG. 28B, it is easier for the user to notice that the pitch of the cry changes in the example in FIG. 28B.

Note that, the volume may be increased together with the pitch of the cry.

Furthermore, for example, the autonomous mobile body 11 may decrease the pitch of the cry on the contrary in a case where the disliked place is touched as compared with a case where a place other than the dislike place is touched.

Furthermore, for example, the audio output control unit 171 changes a frequency of outputting the cry between a case where the favorite place is stroked and a case where the site other than the favorite place is stroked. For example, the audio output control unit 171 shortens the shortest output interval in a case where the favorite place is stroked as compared with a case where the site other than the favorite place is stroked. Alternatively, for example, in a case where the favorite place is touched, the audio output control unit 171 decreases the touch amount used for determining the output of the cry at step S21 and the like in FIG. 17 as compared with a case where the site other than the favorite place is touched. Therefore, in a case where the favorite place is stroked, the output frequency of the cry becomes higher than that in a case where the site other than the favorite place is stroked.

Note that, for example, the characteristic and the output timing of the cry may be changed for each site on the basis of the amount stroked in the past without setting the favorite place.

For example, the audio processing unit 172 controls the audio parameter for each site on the basis of the amount stroked in the past. For example, in a case where a site stroked in the past by a large amount is stroked, the audio processing unit 172 increases the volume of the cry or increases the frequency. On the other hand, for example, in a case where a site stroked in the past by a small amount is stroked, the audio output control unit 171 decreases the volume of the cry or decreases the frequency.

For example, the audio output control unit 171 shortens the shortest output interval or decreases the touch amount used for determining the output of the cry for the site stroked in the past by a large amount. On the other hand, the audio output control unit 171 elongates the shortest output interval or increases the touch amount used for determining the output of the cry for the site stroked in the past by a small amount.

FIG. 29 illustrates an example of a parameter used for setting the favorite place and the like.

"individual_voice_param" is a parameter indicating an individual difference in voice quality of the autonomous mobile body 11. "individual_voice_param" is set to a value within a range from 0.0 to 1.0.

"chin_weight" is a parameter indicating a degree of preference for touch on the chin of the autonomous mobile body 11. "chin_weight" is set to a value within a range from 0.0 to 1.0. For example, as "chin_weight" becomes closer to 1.0, the degree of preference for the touch on the chin of the autonomous mobile body 11 becomes higher. That is, a degree to which the autonomous mobile body 11 exhibits a positive reaction to the touch on the chin becomes high. As "chin_weight" becomes closer to 0.0, the degree of preference for the touch on the chin of the autonomous mobile body 11 becomes higher. That is, a degree to which the autonomous mobile body 11 exhibits a positive reaction to the touch on the chin becomes low. Alternatively, a degree to which the autonomous mobile body 11 exhibits a negative reaction to the touch on the chin becomes high.

"head_weight" is a parameter indicating a degree of preference for touch on the head of the autonomous mobile body 11 similarly to "chin_weight".

Similarly to "chin_weight" and "head_weight", "body_forward_weight" is a parameter indicating a degree of preference for touch on the body front (for example, the abdomen and the like) of the autonomous mobile body 11.

Similarly to "chin_weight", "head_weight", and "body_forward_weight", "body_back_weight" is a parameter indicating a degree of preference for touch on the body back (for example, the back and the like) of the autonomous mobile body 11.

Note that, for example, the recognition unit 151 may set the strong reaction place not in units of sites but in units of regions in the site. For example, the recognition unit 151 sets, as the strong reaction place, a region in which stroked amount is the maximum in the site in which amount stroked in the past is the maximum.

<Talk in Sleep Control Processing>

Figure 30:
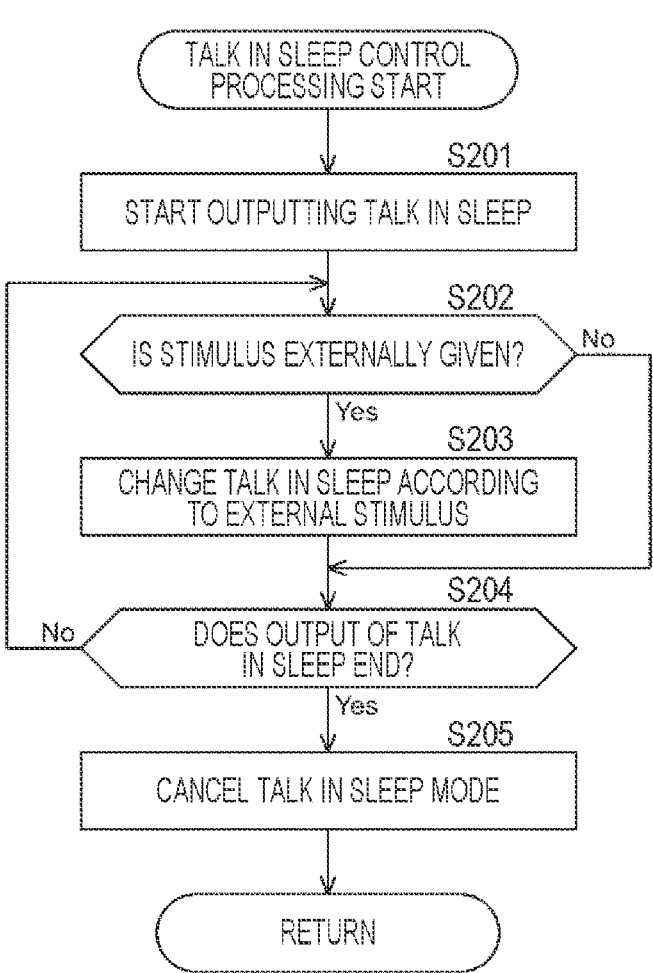
FIG. 30 is a flowchart for explaining talk in sleep control processing in detail.

Next, talk in sleep control processing at step S8 in FIG. 16 is described in detail with reference to a flowchart in FIG. 30.

At step S201, the autonomous mobile body 11 starts outputting the talk in sleep.

Specifically, the audio output control unit 171 instructs the audio processing unit 172 to generate the talk in sleep.

The audio processing unit 172 starts generating and supplying the audio data corresponding to the talk in sleep. Specifically, the audio processing unit 172 calculates an audio parameter of the talk in sleep to be output on the basis of the situation data from the recognition unit 151. The audio processing unit 172 generates the audio data corresponding to the talk in sleep on the basis of the calculated audio parameter.

Note that, for example, the audio processing unit 172 may detect a behavior content on the day on the basis of the behavior history data stored in the storage unit 106, and set the content of the talk in sleep on the basis of the behavior content on the day.

The audio output control unit 171 starts supplying the audio data generated by the audio processing unit 172 to the output unit 105.

The output unit 105 starts outputting the talk in sleep on the basis of the audio data.

Note that, the talk in sleep is output for a fixed time. An output time of the talk in sleep may be either a fixed value or a variable value. In a case where the output time of the talk in sleep is the variable value, for example, the output time varies substantially randomly within a predetermined range. Therefore, more natural talk in sleep implemented.

At step S202, the audio processing unit 172 determines whether or not stimulus is externally given on the basis of the situation data from the recognition unit 151. In a case where it is determined that the stimulus is externally given, the processing proceeds to step S203.

At step S203, the audio processing unit 172 changes the talk in sleep according to the external stimulus. For example, in a case where the autonomous mobile body 11 is stroked, shaken, or spoken to, the audio processing unit 172 changes the audio parameter of the talk in sleep according to the stimulus, thereby modulating the talk in sleep.

Thereafter, the processing proceeds to step S204.

In contrast, in a case where it is determined at step S202 that the stimulus is not externally given, the processing at step S203 is skipped, and the processing proceeds to step S204.

At step S204, the audio output control unit 171 determines whether or not the output of the talk in sleep ends. In a case where it is determined that the output of the talk in sleep does not end, the processing returns to step S202.

Thereafter, until it is determined at step S204 that the output of the talk in sleep ends, the processing at steps S202 to S204 is repeatedly executed. Therefore, the output of the talk in sleep is continued, and the talk in sleep changes according to the external stimulus.

In contrast, in a case where it is determined at step S204 that the output of the talk in sleep ends, the processing proceeds to step S205.

At step S205, the autonomous mobile body 11 exits from the talk in sleep mode. Specifically, the audio output control unit 171 sets the sound production mode of the audio processing unit 172 to a non-reaction mode. Therefore, the sound production mode transits from the talk in sleep mode to the non-reaction mode.

Thereafter, the talk in sleep control processing ends.

In the above-described manner, ability in expression by the audio of the autonomous mobile body 11 is improved. For example, the autonomous mobile body 11 can output a more natural and rich stimulus reaction sound with respect to various external stimuli. Furthermore, personality appears in the reaction to the stimulus for each autonomous mobile body 11. For example, the characteristic and output timing of the stimulus reaction sound to the same stimulus change for each autonomous mobile body 11.

Therefore, the user feels that the autonomous mobile body 11 is closer to a living body such as a real pet, and the degree of attachment and satisfaction to the autonomous mobile body 11 are improved.

Furthermore, since it is not necessary to prepare the audio data for each stimulus reaction sound, it is possible to reduce the production cost and the data amount of the stimulus reaction sound.

<Motion Sound Control Processing>

Figure 31:
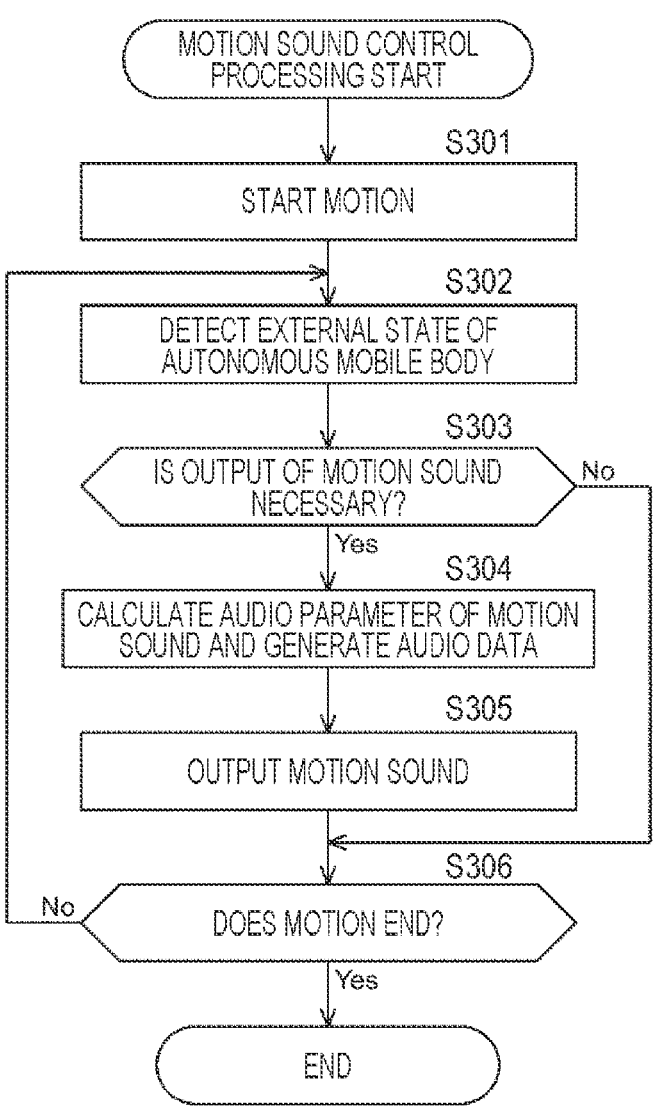
FIG. 31 is a flowchart for explaining motion sound control processing.

Next, motion sound control processing executed by the autonomous mobile body 11 will be described with reference to a flowchart in FIG. 31.

This processing is started, for example, when a condition that the autonomous mobile body 11 executes a predetermined motion is satisfied.

At step S301, the autonomous mobile body 11 starts the motion. Specifically, the operation control unit 162 controls the drive unit 104 and the output unit 105 on the basis of the motion data stored in the storage unit 106 to start execution of the motion the condition for execution of which is satisfied.

At step S302, the recognition unit 151 recognizes the external state of the autonomous mobile body 11 on the basis of the sensor data supplied from the input unit 101 and the drive data supplied from the drive unit 104. The external state of the autonomous mobile body 11 is a state appearing outside the autonomous mobile body 11. For example, the recognition unit 151 detects a state variable representing an external state such as a position, an angle and the like of each portion such as the head, body, leg, tail, and mouth of the autonomous mobile body 11. The recognition unit 151 supplies the situation data including a recognition result of the external state (for example, a detection result of the state variable representing the external state) of the autonomous mobile body 11 to the behavior control unit 153.

At step S303, the audio output control unit 171 determines whether or not the output of the motion sound is necessary on the basis of the recognition result of the external state of the autonomous mobile body 11. In a case where it is determined to be a state in which the motion sound is necessarily output, the processing proceeds to step S304.

At step S304, the audio processing unit 172 calculates an audio parameter of the motion sound and generates audio data.

Specifically, the audio output control unit 171 instructs generation of the audio data corresponding to the motion sound according to the external state of the autonomous mobile body 11.

The audio processing unit 172 calculates the audio parameter of the motion sound to be output on the basis of the detection result of the state variable representing the external state of the autonomous mobile body 11.

Figure 32:
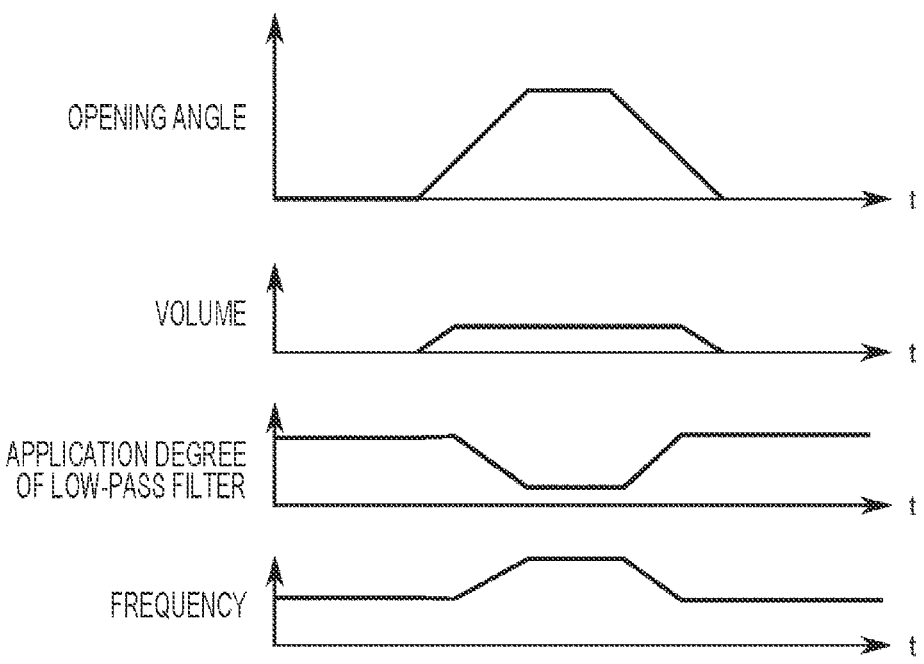
FIG. 32 is a graph illustrating a relationship between an opening angle and the audio parameter.

FIG. 32 illustrates a relationship between the opening angle and audio parameter in a case where the cry is output as the motion sound in accordance with the movement of the mouth while the autonomous mobile body 11 executes the motion of opening and closing the mouth. Specifically, FIG. 32 illustrates time-series transition of the opening angle, which is the state variable of the autonomous mobile body 11, and the volume, the application degree of the low-pass filter, and the frequency, which are the audio parameters of the cry.

As illustrated in a graph in FIG. 32, the audio processing unit 172 sets the volume of the cry, the application degree of the low-pass filter, and the frequency on the basis of the opening angle.

In this example, the volume of the cry is proportional to the opening angle until the opening angle reaches a predetermined value, that is, until the mouth of the autonomous mobile body 11 is opened to some extent. In contrast, the application degree of the low-pass filter and the frequency of the cry are constant until the opening angle reaches a predetermined value.

Furthermore, in a case where the opening angle is a predetermined value or larger, that is, in a case where the mouth of the autonomous mobile body 11 is opened to a certain extent or more, the volume of the cry becomes constant. In contrast, in a case where the opening angle is a predetermined value or larger, the application degree of the low-pass filter is inversely proportional to the opening angle, and the frequency is proportional to the opening angle.

Therefore, in a case where the opening angle is smaller than a predetermined value, the volume changes according to the change in the opening angle with the sound quality of the cry fixed.

In contrast, in a case where the opening angle is not smaller than the predetermined value, the sound quality changes according to the change in the opening angle with the volume of the cry fixed. For example, as described above, when a living body closes its mouth, the pronunciation is close to "u (u)", and when the living thing opens its mouth, the pronunciation is close to "a (a)". This change in vowel sound is implemented by changing the application degree of the low-pass filter according to the opening angle.

Therefore, the real cry is implemented in accordance with the movement of the mouth. For example, the cry with the volume and sound quality corresponding to an opening size of the mouth is output, and a speed at which the cry changes according to the speed of moving the mouth.

Note that, for example, when the cry is continuously output in a case where the autonomous mobile body 11 continues to open the mouth for a long time during the execution of the motion of opening and closing the mouth, the user might feel this unnatural.

For this, for example, as described above with reference to FIGS. 23A and 23B, breathing may be interposed in the middle. For example, similarly to a case where the autonomous mobile body 11 is continuously stroked, the cry is stopped or attenuated when a time equal to or longer than the longest output time in which the mouth is opened elapses. Thereafter, in a case where the mouth of the autonomous mobile body 11 is kept opened until the shortest output interval elapses, the cry with a velocity weaker than that of the initial cry is output again.

The audio processing unit 172 generates the audio data corresponding to the motion sound on the basis of the calculated audio parameter.

At step S305, the autonomous mobile body 11 outputs the motion sound. Specifically, the audio output control unit 171 supplies the audio data generated by the audio processing unit 172 to the output unit 105. The output unit 105 outputs the motion sound on the basis of the audio data.

Thereafter, the processing proceeds to step S306.

In contrast, in a case where it is determined at step S303 that the output of the motion sound is not necessary, the processing at steps S304 and S305 is skipped, and the processing proceeds to step S306.

At step S306, the operation control unit 162 determines whether or not the motion ends. In a case where it is determined that the motion does not end, the processing returns to step S302.

Thereafter, until it is determined at step S306 that the motion ends, the processing at steps S302 to S306 is repeatedly executed. Therefore, during execution of the motion, the motion sound is output according to the motion as necessary.

In contrast, in a case where it is determined at step S306 that the motion ends, the motion sound control processing ends.

Note that, the autonomous mobile body 11 can output the motion sound other than the cry on the basis of the external state of the autonomous mobile body 11 by a similar method.

For example, the recognition unit 151 detects the position in the vertical direction of the center of gravity of the autonomous mobile body 11 and an angle of the joint of each leg as state variables on the basis of the sensor data from the inertial sensor 60 and the drive data from the drive unit 104 during the execution of the motion of movement such as running or walking. The audio processing unit 172 generates the audio data corresponding to the audio expressing exhalation or breathing to be output in accordance with the movement of the autonomous mobile body 11 on the basis of the detection result of the position in the vertical direction of the center of gravity of the autonomous mobile body 11 and the angle of the joint of each leg. The audio output control unit 171 causes the output unit 105 to output the audio expressing exhalation or breathing in accordance with the movement of the autonomous mobile body 11 on the basis of the audio data generated by the audio processing unit 172.

Therefore, the autonomous mobile body 11 can output the exhalation and breathing in accordance with the movement like an actual dog.

For example, the recognition unit 151 detects the presence or absence of an impact on the autonomous mobile body 11 and magnitude of the impact as state variables on the basis of the sensor data from the inertial sensor 60 during execution of the motion of movement. The audio processing unit 172 generates the audio data corresponding to an impact sound output in accordance with the impact according to the magnitude of the impact on the basis of the detection result of the presence or absence of the impact on the autonomous mobile body 11 and the magnitude of the impact. The audio output control unit 171 causes the output unit 105 to output the impact sound in accordance with the impact to the autonomous mobile body 11 on the basis of the audio data generated by the audio processing unit 172.

Therefore, the autonomous mobile body 11 can output the impact sound corresponding to the magnitude of the impact. Furthermore, for example, in a case where an unexpected impact is applied during execution of the motion, the autonomous mobile body 11 can quickly follow and output the impact sound.

Note that, examples of the impact on the autonomous mobile body 11 may include, for example, collision with a wall, a stumble, a fall and the like. Examples of the impact sound may include, for example, a collision sound, a stumbling sound, a falling sound and the like.

For example, the recognition unit 151 detects the presence or absence of landing of each leg of the autonomous mobile body 11 and magnitude of impact at the time of landing as state variables on the basis of the sensor data from the foot sole button 59 and the inertial sensor 60 during execution of the motion of movement. The audio processing unit 172 generates the audio data corresponding to a footstep sound corresponding to the magnitude of the impact at the time of landing on the basis of the detection result of the presence or absence of the landing of each leg of the autonomous mobile body 11 and the magnitude of the impact at the time of landing. The audio output control unit 171 causes the output unit 105 to output the footstep sound in accordance with the landing of each leg on the basis of the audio data generated by the audio processing unit 172.

Therefore, the autonomous mobile body 11 can output the footstep sound in accordance with the landing of each leg and output the footstep sound of the loudness corresponding to the impact at the time of landing.

For example, the recognition unit 151 detects swing of the body of the autonomous mobile body 11 as the state variable on the basis of the sensor data from the inertial sensor 60 during execution of the motion of movement. In a case where it is assumed that the autonomous mobile body 11 wears clothes, the audio processing unit 172 generates audio data corresponding to a cloth rustle sound generated by the swing of the body of the autonomous mobile body 11 on the basis of the detection result of the swing of the body of the autonomous mobile body 11. The audio output control unit 171 causes the output unit 105 to output the cloth rustle sound in accordance with the swing of the body of the autonomous mobile body 11 on the basis of the audio data generated by the audio processing unit 172.

Therefore, the autonomous mobile body 11 can output the cloth rustle sound in accordance with the swing of the body of the autonomous mobile body 11.

Note that, the autonomous mobile body 11 may output a sound of a bell together with the cloth rustle sound on the assumption that the autonomous mobile body 11 wears the cloth with the bell during the holiday season, for example.

For example, the recognition unit 151 detects an angle of the joint of the neck of the autonomous mobile body 11 as the state variable on the basis of the drive data from the drive unit 104 during the execution of the motion of turning back. The audio processing unit 172 generates audio data corresponding to a turning sound representing turning of the autonomous mobile body 11 on the basis of the detection result of the angle of the joint of the neck of the autonomous mobile body 11. The audio output control unit 171 causes the output unit 105 to output the turning sound in accordance with the movement of the neck (head) of the autonomous mobile body 11 on the basis of the audio data generated by the audio processing unit 172.

Therefore, the autonomous mobile body 11 can output the turning sound in accordance with the turning of the autonomous mobile body 11.

Note that, the audio output control unit 171 switches an algorithm and a parameter used by the audio processing unit 172 as necessary depending on, for example, the type of the motion being executed. Therefore, even if the external state of the autonomous mobile body 11 is the same, the characteristic and the output timing of the motion sound can be changed depending on the type of the motion being executed.

For example, even if the movement of the mouth of the autonomous mobile body 11 is the same, different motion sound is output depending on the difference in the motion being executed. Specifically, for example, in a case where the autonomous mobile body 11 is executing the motion of running, a cry with breathing of short breath is output in accordance with the movement of the mouth. In contrast, for example, in a case where the autonomous mobile body 11 is executing a motion of demanding attention of the user, a cry of demanding attention is output in accordance with the movement of the mouth.

For example, in a case where contact of an object with the foot sole is detected by the foot sole button 59, the presence or absence of the output of the motion sound is switched depending on a difference in motion being executed.

Figure 33:
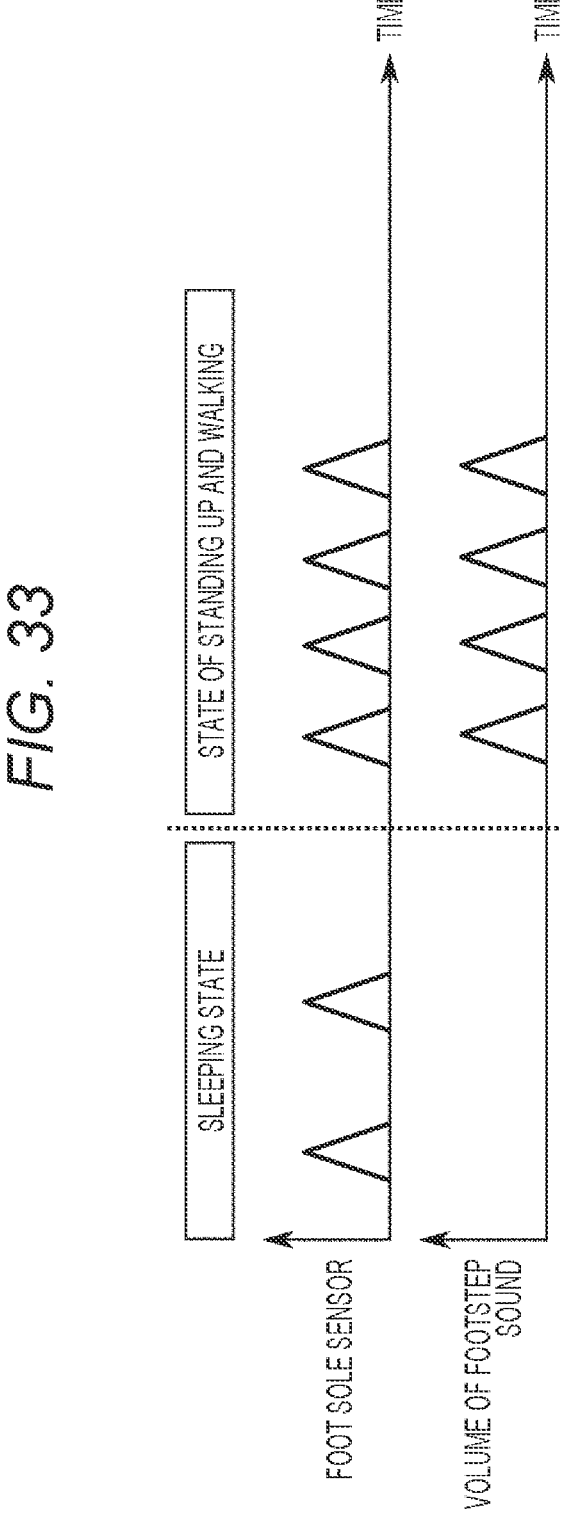
FIG. 33 is a diagram illustrating a relationship between a detection result of a foot sole button and a volume of a footstep sound.

FIG. 33 illustrates a relationship between the detection result of the foot sole button 59 and the volume of the footstep sound, which is the motion sound.

For example, in a case where the autonomous mobile body 11 is in a sleeping state, that is, in a case where a motion of sleeping is being executed, even if the foot sole button 59 detects contact, the footstep sound is not output.

In contrast, in a case where the autonomous mobile body 11 is in a state of standing up and walking, that is, in a case where a motion of walking is being executed, the footstep sound is output in accordance with the detection of the contact of the foot sole button 59.

Therefore, an appropriate motion sound is output in accordance with the motion and the external state of the autonomous mobile body 11.

<Specific Example of Method of Calculating Audio Parameter of Motion Sound>

Next, a specific example of a method of calculating the audio parameter of the motion sound will be described with reference to FIGS. 34 and 35.

For example, a designer of the motion sound adjusts the audio parameter while actually listening to each motion sound output from the autonomous mobile body 11 and designs an appropriate motion sound. Furthermore, for example, the designer creates an algorithm for generating each motion sound or sets the audio parameter using an authoring tool.

Note that, at that time, the designer sets the audio parameter of each motion sound so as to cover the movement of the autonomous mobile body 11 on the basis of, for example, the maximum value and the maximum change width of the movement of each portion of the autonomous mobile body 11.

Then, for example, data indicating a relationship between the state variable and the audio parameter in a key frame of each motion is held in the audio processing unit 172 of the autonomous mobile body 11. More specifically, for example, the data indicating a relationship between the state variable and a value and a change amount of the audio parameter in the key frame of each motion is held in the audio processing unit 172.

The audio processing unit 172 calculates the audio parameter of the motion sound in real time on the basis of the data indicating the relationship between the state variable and the value and the change amount of the audio parameter in the key frame. The audio processing unit 172 generates the audio data corresponding to the motion sound on the basis of the calculated audio parameter.

Figure 34:
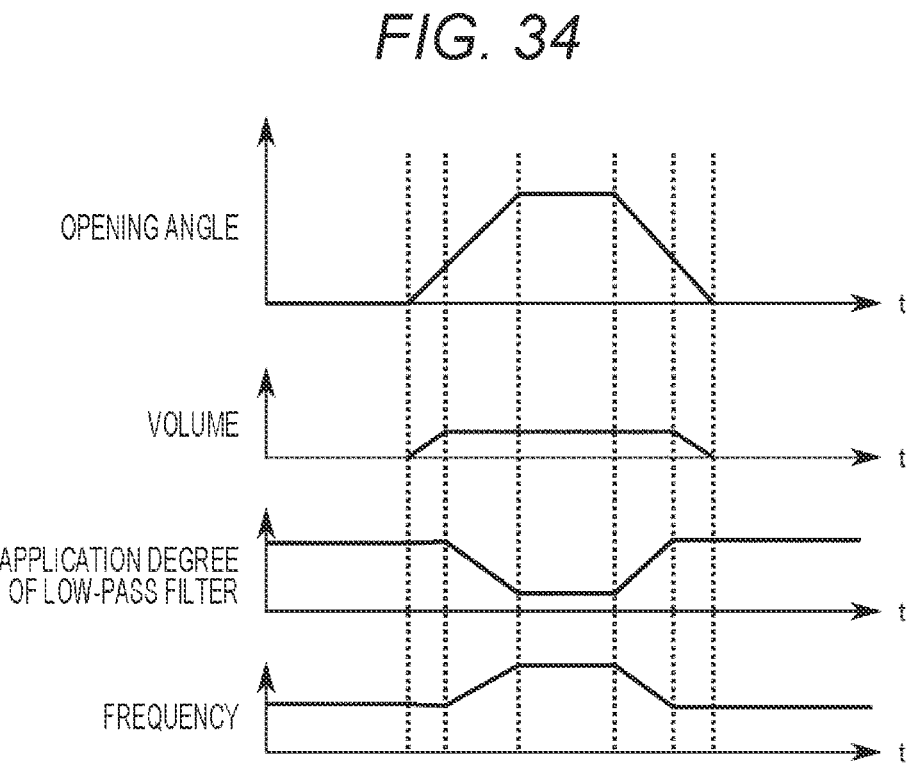
FIG. 34 is a diagram for explaining an example of a method of calculating the audio parameter.

FIG. 34 illustrates an example of the key frame. Specifically, FIG. 34 is obtained by adding auxiliary lines representing time t1f to time t6f corresponding to the keyframes to the graph in FIG. 32.

Time t1f is time at which the opening angle rises (starts increasing from zero degrees). Time t2f is time at which the opening angle reaches the angle at which the volume becomes a constant value. Time t3f is time at which the opening angle reaches the maximum value. Time t4f is time at which the opening angle starts decreasing from the maximum value. Time t5f is time at which the opening angle reaches the angle at which the volume becomes a constant value. Time t6f is time at which the opening angle reaches the zero degrees.

For example, the audio processing unit 172 interpolates the audio parameter at the opening angle other than the key frame on the basis of the opening angle and the value and change amount of the audio parameter in each key frame. Therefore, the audio parameter at each opening angle is calculated in real time.

Figure 35:
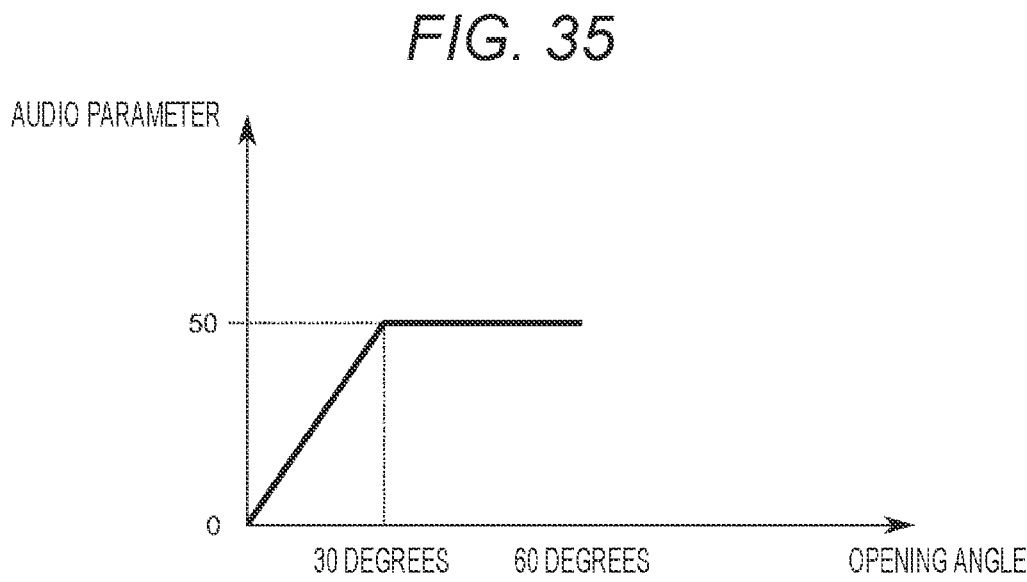
FIG. 35 is a graph illustrating a relationship between the opening angle and the audio parameter.

For example, FIG. 35 is a graph illustrating a relationship between the opening angle and the audio parameter (for example, volume). The opening angle is plotted along the abscissa, and the audio parameter is plotted along the ordinate.

For example, values and change amounts of the audio parameters at zero degrees, 30 degrees, and 60 degrees, which are the opening angles in the key frames, are held in the audio processing unit 172. The audio processing unit 172 calculates the audio parameters at other opening angles in real time by performing linear interpolation on the basis of the audio parameters at the opening angles of zero degrees, 30 degrees, and 60 degrees.

Then, the audio processing unit 172 generates the audio data corresponding to the motion sound on the basis of the calculated audio parameter.

Note that, for example, the designer may create a function that converts the state variable representing the external state of the autonomous mobile body 11 into the audio parameter of each motion sound for each motion of the autonomous mobile body 11. Then, the audio processing unit 172 may calculate the audio parameter of each motion sound in real time on the basis of the state variable of the autonomous mobile body 11 using the created function.

As described above, the audio data corresponding to the motion sound is generated or processed in real time on the basis of the external state of the autonomous mobile body 11, and the motion sound is output on the basis of the generated or processed audio data.

Therefore, it is possible to output an appropriate motion sound at an appropriate timing in conjunction with the movement of the autonomous mobile body 11 during the execution of various motions of the autonomous mobile body 11.

Furthermore, for example, even when a movement different from the movement expected by the autonomous mobile body 11 (for example, landing failure and the like) occurs due to user intervention or disturbance during the execution of various motions of the autonomous mobile body 11, an appropriate motion sound can be output at an appropriate timing.

As a result, the ability of expression by the audio of the autonomous mobile body 11 is improved, and the satisfaction level of the user is improved.

Furthermore, various types of motion sounds can be output without preparing all audio data corresponding to the motion sounds in advance. Therefore, the production cost and the data amount of the motion sound can be reduced.

2. Variation

Hereinafter, a variation of the embodiments of the present technology described above will be described.
<Variation regarding Type of Stimulus Reaction Sound>

For example, it is possible to use a stimulus other than the stimulus by touch described above as a trigger of the stimulus reaction sound.

For example, an action of lifting, swinging, or holding the autonomous mobile body 11 can be used as the trigger of the stimulus reaction sound.

For example, a stimulus given without touching the autonomous mobile body 11, for example, a visual or auditory stimulus can be used as the trigger of the stimulus reaction sound.

Specifically, for example, in a case where the autonomous mobile body 11 is allowed to look at what this likes or does not like, the stimulus reaction sound may be output. Examples of what this likes include, for example, a favorite living body (including a person), a favorite plant, a friend (for example, another autonomous mobile body with a good relationship), a favorite toy, a favorite food and the like. Examples of what this does not like include, for example, a disliked living body (including a person), a disliked plant, an enemy (for example, another autonomous mobile body with a bad relationship), a disliked food and the like.

For example, in a case where the autonomous mobile body 11 is allowed to listen to a favorite sound or a disliked sound, the stimulus reaction sound may be output. Examples of the favorite sound may include, for example, talking from the user or friend, favorite music and the like. Examples of the disliked sound may include, for example, reprimand, talking from the enemy, disliked music and the like.

Furthermore, for example, even for the stimulus other than the stimulus by touch, the stimulus reaction sound to be output may change according to the stimulus content. That is, the output timing (for example, the shortest output interval and the like), the audio parameter and the like may change according to the contents of various stimuli.

Note that, the stimulus content is represented by, for example, a type of stimulus, a manner of stimulus, an intensity of stimulus, a timing of stimulus, a period of stimulus, or a position of stimulus, or a combination thereof.

Moreover, for example, the stimulus reaction sound to be output may be changed by a method of combining a plurality of types of stimuli. For example, the stimulus reaction sound to be output may be changed between a case where the autonomous mobile body 11 is stroked while the autonomous mobile body 11 is allowed to look at what this likes and a case where the autonomous mobile body 11 is stroked while the autonomous mobile body 11 is allowed to listen to the favorite sound.

For example, a sound other than the above-described cry and talk in sleep can be used as the stimulus reaction sound. For example, a barking voice, a growling voice, a sound of the stomach when hungry and the like can be used as the stimulus reaction sound.

Furthermore, in the above description, an example is described in which the velocity is changed between the cry before breathing and the cry after breathing, but the audio parameter other than the velocity may be changed.
<Variation regarding Factor of Change in Stimulus Reaction Sound>

For example, the characteristic and the output timing of the stimulus reaction sound to be output may change depending on a factor other than the stimulus content. Examples of such factor may include, for example, the behavior of the autonomous mobile body 11, the state of the autonomous mobile body 11, the partner who gives the stimulus, and the surrounding situation.

First, a specific example in which the stimulus reaction sound to be output is changed by the behavior of the autonomous mobile body 11 will be described.

For example, even in a case where the same site is stroked, the autonomous mobile body 11 changes the stimulus reaction sound to be output according to the behavior of the autonomous mobile body 11 at that time. Specifically, for example, the autonomous mobile body 11 outputs the cry in a case of being stroked in a case where this does nothing, and does not output the cry in a case where this is executing any behavior.

For example, the autonomous mobile body 11 changes the stimulus reaction sound to be output by an immediately preceding behavior. For example, when the autonomous mobile body 11 is stroked in a case where this does exercise immediately before, this outputs the cry with rough breathing as compared with a case of being stroked in a case of not doing exercise immediately before.

Next, a specific example in which the stimulus reaction sound to be output is changed by the state of the autonomous mobile body 11 will be described.

For example, even in a case where the same site is stroked, the autonomous mobile body 11 changes the stimulus reaction sound to be output according to the state of the site. Specifically, for example, in a case where a site where nothing occurs is stroked, the autonomous mobile body 11 outputs a pleased cry. In contrast, in a case where the site set as the disliked place is stroked, the autonomous mobile body 11 outputs the cry indicating a sense of dislike or executes an operation of refusing without outputting the cry. Furthermore, in a case where a site where a virtual itching occurs is stroked, the autonomous mobile body 11 outputs a comfortable cry.

For example, even in a case where the same site is stroked, the autonomous mobile body 11 changes the stimulus sound to be output according to the feeling of the autonomous mobile body 11. Specifically, for example, when the autonomous mobile body 11 is stroked in a case where this is in a good mood, this outputs the pleased cry. In contrast, when the autonomous mobile body 11 is stroked in a case where this is in a bad mood, this outputs a displeased cry.

For example, in a case where the autonomous mobile body 11 is allowed to look at the food, this changes the stimulus reaction sound to be output according to the degree of hunger. For example, when the autonomous mobile body 11 is allowed to look at the food in a case where the degree of hunger is high, this outputs the pleased cry or outputs the sound of the stomach. In contrast, the autonomous mobile body 11 does not particularly react and does not output the stimulus reaction sound when being allowed to look at the food in a case where the degree of hunger is low.

For example, the autonomous mobile body 11 changes the stimulus reaction sound on the basis of age. For example, the autonomous mobile body 11 decreases the pitch of the cry so as to make the user feel aging as this gets older.

Next, a specific example in which the stimulus reaction sound to be output is changed by the partner who gives the stimulus is described. Here, examples of the partner who gives the stimulus may include, for example, other autonomous mobile bodies and animals such as pets in addition to the user.

For example, the autonomous mobile body 11 changes the stimulus reaction sound to be output according to the relationship (for example, an intimacy degree) with the partner who gives the stimulus. The degree of intimacy with the partner who gives the stimulus is set on the basis of, for example, the number of times of meeting with the partner who gives the stimulus in the past and the cumulative time. For example, the autonomous mobile body 11 outputs the cry that makes the user feel more familiar (for example, the cry of demanding attention) as the degree of intimacy with the partner who touches increases. For example, in a case where the autonomous mobile body 11 cannot recognize the partner who touches (for example, in a case where this does not meet the partner who touches in the past), this outputs a default cry.

For example, since a child generally has a small force or area of the touch, it is assumed that the reaction to the touch of the child is reduced. For this, for example, the autonomous mobile body 11 may temporarily increase sensitivity for detecting the touch in a case where a state in which the touch amount is small continues for a predetermined time or longer.

Next, a specific example in which the stimulus reaction sound to be output is changed by the surrounding situation will be described.

For example, the autonomous mobile body 11 changes the stimulus reaction sound to be output according to the surrounding environment sounds. For example, the autonomous mobile body 11 changes the volume of the cry according to the loudness of the surrounding environment sounds. Therefore, for example, the cry can be reliably heard regardless of the loudness of the surrounding environmental sounds.

For example, the autonomous mobile body 11 changes the stimulus reaction sound by the place and time. For example, the autonomous mobile body 11 changes the cry between a case of being in a room and a case of being out for a walk and the like, or changes the cry in a time period of a day.

For example, the autonomous mobile body 11 changes the cry according to a surrounding reaction in a case of outputting the cry. For example, in a case of outputting the cry, in a case where the partner (for example, a surrounding user, another autonomous mobile body and the like) exhibits a positive reaction, the autonomous mobile body 11 changes the cry according to the reaction. In contrast, in a case where the autonomous mobile body 11 outputs the cry, in a case where the partner has no reaction or exhibits a negative reaction, this stops outputting the cry and keeps calm.

Note that, the positive reaction is, for example, a reaction of smiling, talking to, or approaching. The negative reaction is, for example, a reaction of making a disgusting expression or escaping.

For example, the autonomous mobile body 11 may predict a home arrival time of an owner who is the user who owes the autonomous mobile body 11 on the basis of position information of the owner or a learning result of the home arrival time of the owner by the learning unit 152, and change the manner of crying when the predicted home arrival time approaches.

Note that, for example, the stimulus reaction sound to be output may be changed by a combination of two or more of the behavior of the autonomous mobile body 11, the state of the autonomous mobile body 11, the partner who gives the stimulus, the surrounding situation, and the stimulus content.

Furthermore, for example, the setting value of the audio parameter of the stimulus reaction sound may be different for each autonomous mobile body 11. For example, the audio processing unit 172 of each autonomous mobile body 11 may change the frequency or the tone as the base of the stimulus reaction sound on the basis of the individual parameter of each autonomous mobile body 11.

<Variation Regarding Reaction Pattern>

In the above description, an example is described in which the reaction pattern of the autonomous mobile body 11 to the touch is set by setting the reaction reference point or the strong reaction place. In contrast, for example, the reaction pattern of the autonomous mobile body 11 to the touch may be set by a method other than the reaction reference point and the strong reaction place.

For example, the learning unit 152 may learn a method of stimulating of the user and set the reaction pattern of the autonomous mobile body 11 on the basis of the learning result of the method of stimulating.

For example, the learning unit 152 performs learning processing on the basis of the behavior history data and the like stored in the storage unit 106, and learns the pattern of stroking the autonomous mobile body 11 by the owner. The pattern of stroking is represented by, for example, the position, intensity, speed and the like of stroking. Then, the learning unit 152 sets the pattern of stroking by the owner and a similar pattern as a strong reaction touch pattern.

Then, the audio processing unit 172 changes the cry between a case where this is stroked with the strong reaction touch pattern and a case where this is stroked with other patterns. For example, the audio processing unit 172 increases the volume of the cry or increases the pitch of the cry so as to exhibit a more positive reaction in a case of being stroked with the strong reaction touch pattern than in a case of being stroked with other patterns.

Therefore, for example, every time the owner strokes the autonomous mobile body 11, the reaction of the autonomous mobile body 11 is improved. Furthermore, for example, in a case where the owner strokes the autonomous mobile body 11, the reaction of the autonomous mobile body 11 is improved as compared with a case where another user strokes the same. As a result, for example, the owner can feel that the autonomous mobile body 11 is attached to, and the attachment to the autonomous mobile body 11 increases.

Furthermore, for example, the learning unit 152 may set the reaction pattern to the stimulus other than the touch by learning the content of the stimulus other than the touch given to the autonomous mobile body 11 in the past. For example, the learning unit 152 may set the reaction pattern for the content spoken by the user by learning the content spoken by the user in the past.

<Takeover of Feature of Autonomous Mobile Body 11>

For example, in a case where the autonomous mobile body 11 is exchanged due to a failure and the like, data regarding a feature of an old autonomous mobile body 11 may be transferred to a new autonomous mobile body 11, and the new autonomous mobile body 11 may take over the feature of the old autonomous mobile body 11. Specifically, for example, the new autonomous mobile body 11 may take over the reaction pattern from the old autonomous mobile body 11.

Therefore, for example, it is possible to prevent the user from feeling a loss, and it is possible to save time and effort for the user to train the new autonomous mobile body 11.

By a similar method, for example, in a system in which a child of the autonomous mobile body 11 is born, the child autonomous mobile body 11 can take over all or a part of the features of the parent autonomous mobile body 11.

<Variation Regarding Motion Sound>

For example, the autonomous mobile body 11 can change the characteristic and the output timing of the motion sound according to the surrounding situation. For example, the autonomous mobile body 11 changes the volume and sound quality of the motion sound according to the surrounding environment sounds.

For example, in a case where the autonomous mobile body 11 executes a motion of eating food, the motion sound of eating food may be changed according to the food to be eaten.

For example, the autonomous mobile body 11 executes a preliminary operation for outputting a motion sound as necessary. For example, in a case where the autonomous mobile body 11 executes a motion for outputting the cry, when this holds a bone in the mouth, this first executes an operation of placing the holding bone.

Other Variations

For example, the information processing terminal 12 may output the motion sound in synchronization with the motion of the autonomous mobile body 11 in the screen during execution of an application that manages the autonomous mobile body 11 and the like. In this case, for example, the audio parameter of the motion sound is changed from the audio parameter for the autonomous mobile body 11 according to a difference in sound system such as a speaker between the information processing terminal 12 and the autonomous mobile body 11.

Note that, in a case where the motion sound cannot be output from the information processing terminal 12, for example, a color of the autonomous mobile body 11 in the screen may be changed or a waveform representing the motion sound may be displayed so that the user can recognize that the motion sound is being output.

For example, a part of the processing of the autonomous mobile body 11 described above may be executed by the information processing terminal 12 or the information processing server 13. For example, the information processing terminal 12 or the information processing server 13 may execute all or part of the processing of the information processing unit 103 of the autonomous mobile body 11 to remotely control the autonomous mobile body 11. Specifically, for example, the information processing terminal 12 or the information processing server 13 may remotely control the output of the stimulus reaction sound or the motion sound of the autonomous mobile body 11.

The present technology can be applied to the autonomous mobile body that outputs the stimulus reaction sound or the motion sound, in addition to the above-described dog-shaped quadruped walking robot.

3. Others

<Configuration Example of Computer>

The above-described series of processing can be executed by hardware or software. In a case where the series of processing is executed by software, a program configuring the software is installed in a computer. Here, examples of the computer include a computer incorporated in dedicated hardware, and a general-purpose personal computer capable of executing various functions by installing various programs, for example.

Figure 36:
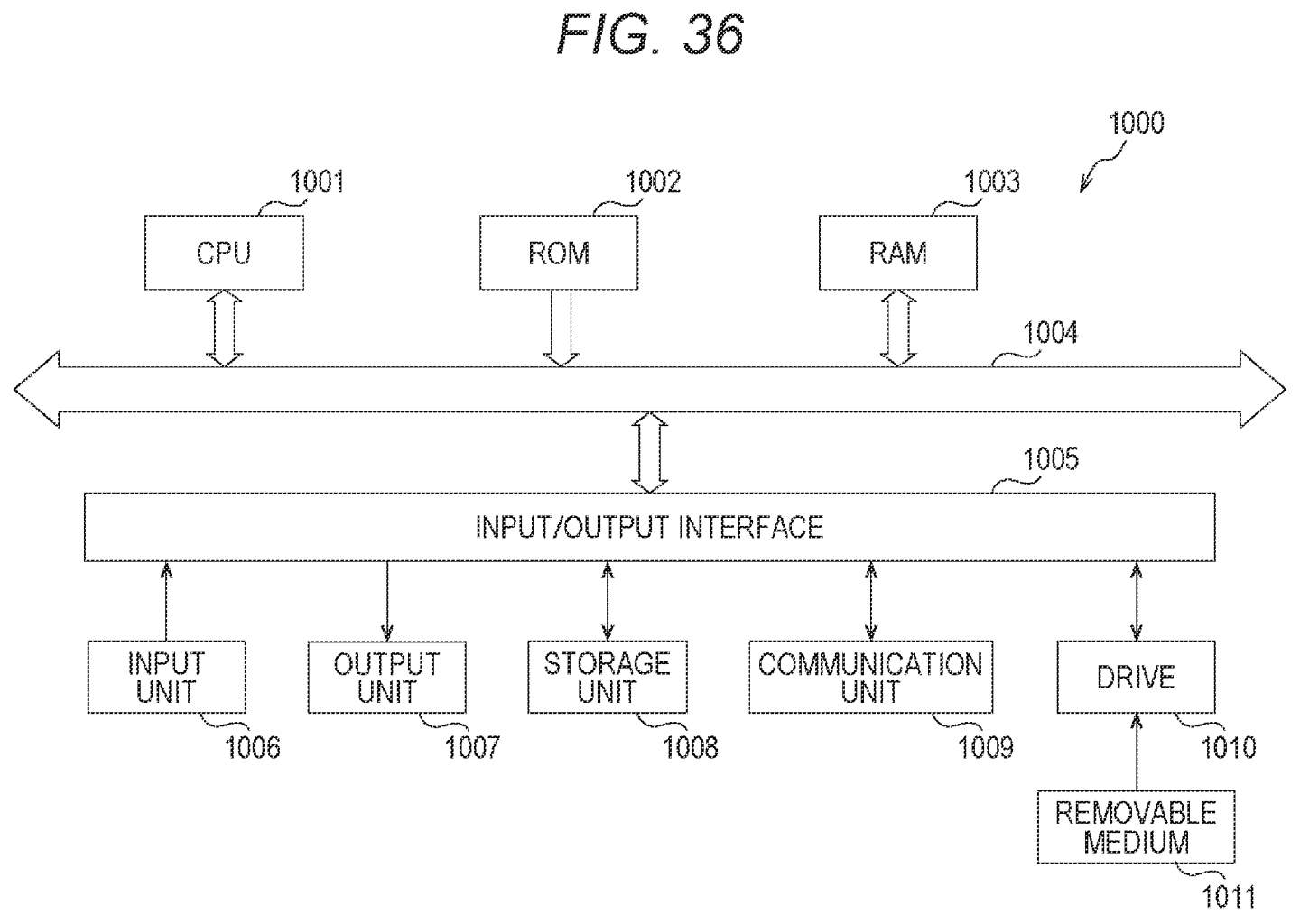

FIG. 36 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

An input/output interface 1005 is further connected to the bus 1004. An input unit 1006, an output unit 1007, a storage unit 1008, a communication unit 1009, and a drive 1010 are connected to the input/output interface 1005.

The input unit 1006 includes an input switch, a button, a microphone, an imaging element and the like. The output unit 1007 includes a display, a speaker and the like. The storage unit 1008 includes a hard disk, a non-volatile memory and the like. The communication unit 1009 includes a network interface and the like. The drive 1010 drives a removable medium 1011 such as a magnetic disk, an optical disc, a magneto-optical disk, or a semiconductor memory.

In the computer 1000 configured as described above, the series of processing described above is performed, for example, by the CPU 1001 loading a program stored in the storage unit 1008 into the RAM 1003 via the input/output interface 1005 and the bus 1004, and executing.

The program executed by the computer 1000 (CPU 1001) can be provided by being recorded in the removable medium 1011 as a package medium and the like, for example. Furthermore, the program can be provided via a wired or wireless transmission medium such as a local area network, the Internet, or digital satellite broadcasting.

In the computer 1000, by attaching the removable medium 1011 to the drive 1010, the program can be installed in the storage unit 1008 via the input/output interface 1005. Furthermore, the program can be received by the communication unit 1009 via a wired or wireless transmission medium, and installed in the storage unit 1008. In addition, the program can be installed in the ROM 1002 or the storage unit 1008 in advance.

Note that, the program executed by the computer may be a program that is processed in time series in the order described in the present specification, or a program that is processed in parallel or at a necessary timing such as when a call is made.

Furthermore, in the present specification, a system is intended to mean assembly of a plurality of components (devices, modules (parts) and the like) and it does not matter whether or not all the components are in the same housing. Therefore, a plurality of devices housed in separate housings and connected via a network and one device in which a plurality of modules is housed in one housing are both systems.

Moreover, the embodiments of the present technology are not limited to the above-described embodiments, and various modifications can be made without departing from the gist of the present technology.

For example, the present technology may be configured as cloud computing in which one function is shared by a plurality of devices over the network to process together.

Furthermore, each of the steps described in the flowcharts described above can be executed by one device or executed by a plurality of devices in a shared manner.

Moreover, in a case where a plurality of pieces of processing is included in one step, the plurality of pieces of processing included in one step can be executed by one device or by a plurality of devices in a shared manner.

<Combination Examples of Configurations>

The present technology may also have the following configurations.

(1)

An autonomous mobile body that autonomously moves, the autonomous mobile body including:

an operation control unit that controls an operation of the autonomous mobile body;

a recognition unit that recognizes a state of the autonomous mobile body in operation; and an audio control unit that generates or processes audio data corresponding to audio to be output in accordance with the operation of the autonomous mobile body on the basis of a recognition result of the state of the autonomous mobile body, and controls a characteristic and an output timing of the audio.

(2)

The autonomous mobile body according to (1) described above, in which the recognition unit detects a state variable representing the state of the autonomous mobile body, and the audio control unit controls the characteristic and the output timing of the audio on the basis of the state variable.

(3)

The autonomous mobile body according to (2) described above, in which the audio control unit calculates an audio parameter used for controlling the characteristic of the audio on the basis of the state variable, and generates or processes the audio data on the basis of the calculated audio parameter.

(4)

The autonomous mobile body according to (3) described above, in which the audio control unit calculates the audio parameter on the basis of data indicating a relationship between the state variable and the audio parameter.

(5)

The autonomous mobile body according to (3) described above, in which the audio control unit calculates the audio parameter using a function that converts the state variable to the audio parameter.

(6)

The autonomous mobile body according to any one of (3) to (5) described above, in which the audio parameter includes one or more of a frequency, a volume, a modulation degree, an overtone component, an application degree of a low-pass filter, or an application degree of an effector.

(7)

The autonomous mobile body according to any one of (2) to (6) described above, in which the recognition unit detects an opening angle, which is an angle at which a mouth of the autonomous mobile body is opened, and the audio control unit generates or processes, on the basis of the opening angle, the audio data corresponding to a cry to be output in accordance with a movement of the mouth of the autonomous mobile body, and controls a characteristic and an output timing of the cry.

(8)

The autonomous mobile body according to (7) described above, in which the audio control unit continues outputting the cry until a first time elapses while the autonomous mobile body opens the mouth, and stops outputting the cry or attenuates the cry after the first time elapses.

(9)

The autonomous mobile body according to (8) described above, in which the audio control unit outputs the cry again in a case where the autonomous mobile body continues opening the mouth after a second time elapses after the output of the cry is stopped.

(10)

The autonomous mobile body according to (9) described above, in which the audio control unit changes a characteristic of the cry to be output again from the characteristic of the previously output cry.

(11)

The autonomous mobile body according to any one of (2) to (10) described above, in which the recognition unit detects presence or absence of landing of the autonomous mobile body and magnitude of an impact at time of landing, and the audio control unit generates or processes, on the basis of a detection result of the presence or absence of the landing of the autonomous mobile body and the magnitude of the impact at the time of landing, the audio data corresponding to a footstep sound to be output in accordance with a movement of a leg of the autonomous mobile body, and controls a characteristic and an output timing of the footstep sound.

(12)

The autonomous mobile body according to any one of (2) to (11) described above, in which the recognition unit detects a position of center of gravity of the autonomous mobile body and an angle of a joint of a leg, and the audio control unit generates or processes, on the basis of a detection result of the position of center of gravity of the autonomous mobile body and the angle of the joint of the leg, the audio data corresponding to the audio representing exhale or breathing to be output in accordance with the movement of the autonomous mobile body, and controls the characteristic and the output timing of the audio.

(13)

The autonomous mobile body according to any one of (2) to (12) described above, in which the recognition unit detects an angle of a joint of a neck of the autonomous mobile body, and the audio control unit generates or processes, on the basis of a detection result of the angle of the joint of the neck of the autonomous mobile body, the audio data corresponding to the audio to be output in accordance with the movement of the neck of the autonomous mobile body, and controls the characteristic and the output timing of the audio.

(14)

The autonomous mobile body according to any one of (2) to (13) described above, in which the recognition unit detects presence or absence of an impact on the autonomous mobile body and magnitude of the impact, and the audio control unit generates or processes, on the basis of a detection result of the presence or absence of the impact on the autonomous mobile body and the magnitude of the impact, the audio data corresponding to the audio to be output in accordance with the impact, and controls the characteristic and the output timing of the audio.

(15)

The autonomous mobile body according to any one of (1) to (14) described above, in which the audio control unit further controls the characteristic and the output timing of the audio on the basis of a type of the operation.

(16)

The autonomous mobile body according to (15) described above, in which the audio control unit controls presence or absence of the output of the audio to a same state of the autonomous mobile body on the basis of the type of the operation.

(17)

The autonomous mobile body according to any one of (1) to (16) described above, in which the recognition unit recognizes an external state appearing outside the autonomous mobile body, and the audio control unit generates or processes, on the basis of the external state of the autonomous mobile body, the audio data, and controls the characteristic and the output timing of the audio.

(18)

The autonomous mobile body according to (1) described above, in which the operation of the autonomous mobile body is an operation or a performance of expressing an intention or a feeling of the autonomous mobile body.

(19)

An information processing method including:

controlling an operation of an autonomous mobile body;

recognizing a state of the autonomous mobile body in operation; and generating or processing audio data corresponding to audio to be output in accordance with the operation of the autonomous mobile body on the basis of a recognition result of the state of the autonomous mobile body, and controlling a characteristic and an output timing of the audio.

(20)

A program for causing a computer to execute processing of:

controlling an operation of an autonomous mobile body;

recognizing a state of the autonomous mobile body in operation; and generating or processing audio data corresponding to audio to be output in accordance with the operation of the autonomous mobile body on the basis of a recognition result of the state of the autonomous mobile body, and controlling a characteristic and an output timing of the audio.

Note that, the effects described in the present specification are merely examples and are not limited, and there may be other effects.

REFERENCE SIGNS LIST

1 Information processing system
11-1 to 11-$n$ Autonomous mobile body
12-1 to 12-$n$ Information processing terminal
13 Information processing server
101 Input unit
103 Information processing unit
104 Drive unit
105 Output unit
151 Recognition unit
152 Learning unit
153 Behavior control unit
161 Internal state control unit
162 Operation control unit
163 Audio control unit
171 Audio processing unit
172 Audio output control unit

The invention claimed is:

1. An autonomous mobile body, comprising:

a central processing unit (CPU) configured to:

recognize a state of the autonomous mobile body, wherein the autonomous mobile body is configured to move autonomously;

detect a position of center of gravity of the autonomous mobile body and an angle of a joint of a leg of the autonomous mobile body;

control an operation of the autonomous mobile body based on the recognized state;

generate, based on the controlled operation, the detected position of center of gravity, and the detected angle of the joint of the leg, first audio data corresponding to first audio that represents at least one of exhale or breathing, wherein the first audio that represents at least one of the exhale or the breathing is associated with a movement of the autonomous mobile body; and control, based on the generated first audio data, a characteristic of the first audio and an output timing of the first audio.

2. The autonomous mobile body according to claim 1, wherein the CPU is further configured to:

detect a state variable that represents the recognized state of the autonomous mobile body; and control, further based on the detected state variable, the characteristic of the first audio and the output timing of the first audio.

3. The autonomous mobile body according to claim 2, wherein the CPU is further configured to:

calculate, based on the detected state variable, a first audio parameter to control the characteristic of the first audio; and generate the first audio data further based on the calculated first audio parameter.

4. The autonomous mobile body according to claim 3, wherein the CPU is further configured to calculate the first audio parameter further based on data indicating a relationship between the state variable and a second audio parameter associated with a key frame of motion of the autonomous mobile body.

5. The autonomous mobile body according to claim 3, wherein the CPU is further configured to calculate the first audio parameter further based on a function that converts the state variable to the first audio parameter.

6. The autonomous mobile body according to claim 3, wherein the first audio parameter includes at least one of a frequency, a volume, a modulation degree, an overtone component, an application degree of a low-pass filter, or an application degree of an effector.

7. The autonomous mobile body according to claim 2, wherein the CPU is further configured to:

detect an opening angle of a mouth of the autonomous mobile body;

based on the detected opening angle, second audio data corresponding to a first crying sound, wherein the first crying sound is associated with a movement of the mouth of the autonomous mobile body; and control, based on generated second audio data, a characteristic of the first crying sound and an output timing of the first crying sound.

8. The autonomous mobile body according to claim 7, wherein the CPU is further configured to:

control a continuous output of the first crying sound for a first time period, wherein the autonomous mobile body is configured to open the mouth for the first time period; and at least one of stop or attenuate the continuous output of the first crying sound after the first time period elapses.

9. The autonomous mobile body according to claim 8, wherein the CPU is further configured to:

detect that the mouth of the autonomous mobile body is open for a second time period after the first time period elapses; and control, based on the detection that the mouth of the autonomous mobile body is open for the second time period after the first time period elapses, a speaker to output a second crying sound.

10. The autonomous mobile body according to claim 9, wherein the CPU is further configured to control a characteristic of the second crying sound different from the characteristic of the first crying sound.

11. The autonomous mobile body according to claim 2, wherein the CPU is further configured to:

detect one of a presence or an absence of a landing operation of the autonomous mobile body;

detect a magnitude of an impact on the autonomous mobile body in the landing operation;

generate, based on the detection of one of the presence or the absence of the landing operation of the autonomous mobile body and the detected magnitude of the impact, second audio data corresponding to a footstep sound associated with a movement of the leg of the autonomous mobile body; and control, based on the generated second audio data, a characteristic of the footstep sound and an output timing of the footstep sound.

12. The autonomous mobile body according to claim 2, wherein the CPU is further configured to:

detect an angle of a joint of a neck of the autonomous mobile body;

generate, based on the detected angle of the joint of the neck of the autonomous mobile body, second audio data corresponding to second audio associated with a movement of the neck of the autonomous mobile body; and control, based on the generated second audio data, a characteristic of the second audio and an output timing of the second audio.

13. The autonomous mobile body according to claim 2, wherein the CPU is further configured to:

detect one of a presence or an absence of an impact on the autonomous mobile body;

detect a magnitude of the impact of the autonomous mobile body;

generate, based on the detection of one of the presence or the absence of the impact and the detected magnitude of the impact, second audio data corresponding to second audio associated with the impact; and control, based on the generated second audio data, a characteristic of the second audio and an output timing of the second audio.

14. The autonomous mobile body according to claim 1, wherein the CPU is further configured to control, based on a type of the controlled operation, the characteristic of the first audio and the output timing of the first audio.

15. The autonomous mobile body according to claim 14, wherein the CPU is further configured to control, based on the type of the controlled operation, one of a presence or an absence of an output of the first audio to a same state of the autonomous mobile body.

16. The autonomous mobile body according to claim 1, wherein the CPU is further configured to:

recognize an external state of the autonomous mobile body;

generate, further based on the recognized external state of the autonomous mobile body, the first audio data; and control, based on the generated first audio data, the characteristic of the first audio and the output timing of the first audio.

17. The autonomous mobile body according to claim 1, wherein the operation of the autonomous mobile body is one of an operation or a performance to present the state of the autonomous mobile body.

18. An information processing method, comprising:

recognizing a state of an autonomous mobile body;

detecting a position of center of gravity of the autonomous mobile body and an angle of a joint of a leg of the autonomous mobile body;

controlling an operation of the autonomous mobile body based on the recognized state;

generating, based on the controlled operation, the detected position of center of gravity, and the detected angle of the joint of the leg, audio data corresponding to audio that represents at least one of exhale or breathing, wherein the audio that represents at least one of the exhale or the breathing is associated with a movement of the autonomous mobile body; and controlling, based on the generated audio data, a characteristic of the audio and an output timing of the audio.

19. A non-transitory computer-readable medium having stored thereon, computer-executable instructions which, when executed by a computer, cause the computer to execute operations, the operations comprising:

recognizing a state of an autonomous mobile body;

detecting a position of center of gravity of the autonomous mobile body and an angle of a joint of a leg of the autonomous mobile body;

controlling an operation of the autonomous mobile body based on the recognized state;

generating, based on the controlled operation, the detected position of center of gravity, and the detected angle of the joint of the leg, audio data corresponding to audio that represents at least one of exhale or breathing, wherein the audio that represents at least one of the exhale or the breathing is associated with a movement of the autonomous mobile body; and controlling, based on the generated audio data, a characteristic of the audio and an output timing of the audio.

* * * * *